(12) United States Patent
Yang et al.

(10) Patent No.: US 12,439,584 B2
(45) Date of Patent: Oct. 7, 2025

(54) DYNAMIC FLASH MEMORY (DFM) WITH RING-TYPE INSULATOR IN CHANNEL FOR IMPROVED RETENTION

(71) Applicant: Yangtze Memory Technologies Co., Ltd., Hubei (CN)

(72) Inventors: Yuancheng Yang, Hubei (CN); Dongxue Zhao, Hubei (CN); Tao Yang, Hubei (CN); Lei Liu, Hubei (CN); Di Wang, Hubei (CN); Kun Zhang, Hubei (CN); Wenxi Zhou, Hubei (CN); Zhiliang Xia, Hubei (CN); Zongliang Huo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 536 days.

(21) Appl. No.: 17/731,530

(22) Filed: Apr. 28, 2022

(65) Prior Publication Data
US 2023/0354579 A1 Nov. 2, 2023

(51) Int. Cl.
*H10B 12/00* (2023.01)
(52) U.S. Cl.
CPC .................................. *H10B 12/20* (2023.02)
(58) Field of Classification Search
CPC .... H10D 64/037; H10D 89/213; H10D 1/665; H10D 1/66; H10D 1/68; H10D 30/6728; H10D 30/6735; H10B 41/27; H10B 12/0385; H10B 43/10; H10B 41/10; H10B 12/09; H10B 43/27; H10B 12/038;
(Continued)

(56) References Cited

U.S. PATENT DOCUMENTS

| 10,867,678 B2 | 12/2020 | Chen et al. |
| 2008/0068876 A1* | 3/2008 | Sandhu ................ H10D 62/118 257/E21.654 |

(Continued)

FOREIGN PATENT DOCUMENTS

| EP | 0573921 | * 4/1993 | ............. H01L 29/16 |

OTHER PUBLICATIONS

Saito (paragraph numbers) (Year: 1993).*

(Continued)

*Primary Examiner* — Jessica S Manno
*Assistant Examiner* — Victor Joseph Lasasso
(74) *Attorney, Agent, or Firm* — Hanley, Flight & Zimmerman, LLC

(57) ABSTRACT

A three-dimensional (3D) memory device includes a memory cell, a top contact coupled to the memory cell, and a bottom contact coupled to the memory cell. The memory cell can include a pillar, an insulating layer surrounding the pillar, a first gate contact coupled to a word line, a second gate contact coupled to a plate line, and an annular dielectric layer within a portion of the pillar. The annular dielectric layer can increase a retention time of electrical charge in the pillar. The 3D memory device can utilize dynamic flash memory (DFM), increase retention times, decrease refresh rates, increase a floating body effect, decrease manufacturing defects, decrease leakage current, decrease junction current, decrease power consumption, increase an upper limit of charge density in the pillar, dynamically adjust a length of the plate line, and decrease parasitic resistance.

10 Claims, 24 Drawing Sheets

(58) Field of Classification Search
CPC ........ H10B 12/00; H10B 12/01; H10B 12/05; H10B 12/20; H10B 12/31; H10B 41/35; H10B 41/40; H10B 43/35; H10B 43/40; H10B 43/50; H10K 10/491; G11C 11/24; G11C 11/404; G11C 14/0018; G11C 14/0036

See application file for complete search history.

(56) References Cited

U.S. PATENT DOCUMENTS

| | | | | |
|---|---|---|---|---|
| 2016/0093745 | A1* | 3/2016 | Diaz | H10D 62/235 |
| | | | | 257/29 |
| 2016/0268498 | A1* | 9/2016 | Eckinger | H10N 52/01 |
| 2020/0286909 | A1* | 9/2020 | Yuda | H10B 43/35 |
| 2022/0319566 | A1* | 10/2022 | Sakui | G11C 11/4096 |

OTHER PUBLICATIONS

Saito (original document) (Year: 1993).*

Koji Sakui and Nozomu Harada, "Dynamic Flash Memory with Dual Gate Surrounding Gate Transistor (SGT)," 2021 IEEE International Memory Workshop (IMW), May 16, 2021, DOI: 10.1109/IMW51353.2021.9439614, 4 pages.

"Unisantis unveils Dynamic Flash Memory as DRAM alternative: Benefits in higher density, speed and cost savings," Unisantis Electronics, May 19, 2021, https://unisantis.com/wp-content/uploads/2021/05/Unisantis_DFM.pdf, 3 pages.

* cited by examiner

DYNAMIC FLASH MEMORY (DFM) WITH RING-TYPE INSULATOR IN CHANNEL FOR IMPROVED RETENTION

BACKGROUND

Field

The present disclosure relates to dynamic flash memory (DFM) apparatuses, systems, and methods, for example, retention DFM apparatuses, systems, and methods to increase retention times in a three-dimensional (3D) memory device.

Background

Dynamic random-access memory (DRAM) is a volatile memory that uses charge stored on a capacitor to represent information. DRAM stores each bit in a memory cell that includes a transistor and a capacitor (e.g., 1T1C). Charge levels greater than a certain threshold can represent a first logic level (e.g., 1 state) and charge levels less than another threshold amount can represent a second logic level (e.g., 0 state). Leakage currents and various parasitic effects limit the length of time a capacitor can hold charge and regular refresh cycles are needed. DRAM retention times can be as low as 32 ms during high temperature operations (e.g., above 85° C.) and can require refresh rates of about 31 Hz.

Flash memory (flash) is a non-volatile memory that uses charge stored on a floating gate to represent information. Flash stores each bit in a memory cell that includes a transistor with a floating gate. The amount of charge on the floating gate will determine whether the transistor will conduct when a fixed set of read bias conditions are applied. Flash can retain charge for a long period of time (e.g., about 10 years at 85° C.) since the floating gate is completely surrounded by insulators. Further, the act of reading the data can be performed non-destructively without loss of the information. In addition, flash can quickly erase entire blocks or pages of data simultaneously (e.g., NAND flash).

Current 1T1C DRAM is approaching a process limit. The manufacturing of 1T1C DRAM devices with small-node capacitors to retain charge is becoming more difficult due to increased current leakage, increased power consumption, degraded operating voltage margins, and decreased retention times. Further, current single transistor (1T) capacitor-free DRAM (e.g., ZRAM, TTRAM, ARAM, etc.) devices need further improvement and optimization for manufacturable integration and operation solutions.

SUMMARY

Accordingly, there is a need to, e.g., provide a capacitor-free dynamic random-access memory device to isolate a channel and a body of a memory cell. Further, there is a need to increase charge retention times and decrease refresh rates. Further, there is a need to provide different doping concentrations in a memory cell to increase a floating body effect. Further, there is a need to provide different materials in a memory cell (e.g., single crystal body, alternating epitaxial layers) to decrease manufacturing defects. Further, there is a need to decrease leakage current, decrease junction current, and decrease power consumption. Further, there is a need to increase an upper limit of charge density in a body of a memory cell. Further, there is a need to dynamically adjust a length of a gate contact in a memory cell. Further, there is a need to increase a distance between a gate contact and a source contact to decrease parasitic resistance.

In some aspects, a three-dimensional (3D) memory device can include a memory cell. In some aspects, the 3D memory device can include the memory cell, a top contact coupled to the memory cell, and a bottom contact coupled to the memory cell. In some aspects, the 3D memory device can increase retention times, decrease refresh rates, increase a floating body effect, decrease manufacturing defects, decrease leakage current, decrease junction current, decrease power consumption, increase an upper limit of charge density, dynamically adjust a length of a gate contact in the memory cell, and decrease parasitic resistance.

In some aspects, the memory cell can include a pillar, an insulating layer, a first gate contact, a second gate contact, and an annular dielectric layer. In some aspects, the pillar can be configured to store an electrical charge. In some aspects, the insulating layer can surround the pillar. In some aspects, a first gate contact can surround a first portion of the insulating layer. In some aspects, the first gate contact can be coupled to a word line configured to address and non-destructively read the pillar. In some aspects, the second gate contact can surround a second portion of the insulating layer. In some aspects, the second gate contact can be coupled to a plate line configured to program the pillar. In some aspects, the annular dielectric layer can be within a portion of the pillar and between the pillar and the insulating layer. In some aspects, the annular dielectric layer can be configured to increase a retention time in the pillar.

In some aspects, the top contact can be coupled to a bit line configured to flow electrical charge through and/or away from the memory cell. In some aspects, the bottom contact can be coupled to a source line configured to flow electrical charge through and/or away from the memory cell. In some aspects, different voltage combinations can be applied to the bit line, the word line, the plate line, and the source line to perform read (e.g., non-destructively), program (e.g., 1 state), and erase (e.g., 0 state) operations on the 3D memory device.

In some aspects, the retention time of storing the electrical charge in the pillar can be greater than about 100 ms. In some aspects, the retention time can be greater than about 100 ms for a temperature of at least about 85° C.

In some aspects, the 3D memory device can have a refresh rate of no greater than 10 Hz. In some aspects, the 3D memory device can have a refresh rate of no greater than 10 Hz during high temperature operation (e.g., greater than 85° C.).

In some aspects, the pillar can be a monolithic vertical pillar. In some aspects, the monolithic vertical pillar can be a single semiconductor material (e.g., silicon, doped silicon, monocrystalline silicon, etc.). In some aspects, the monolithic vertical pillar can decrease defect concentrations, increase charge conduction, decrease leakage current, and increase manufacturing efficiency.

In some aspects, the insulating layer can be a monolithic insulating layer. In some aspects, the monolithic insulating layer can be a single dielectric material (e.g., high-k dielectric, oxide, nitride, silicon oxide, silicon nitride, glass, spin-on-glass (SOG), etc.). In some aspects, the monolithic insulating layer can decrease defect concentrations, increase gate capacitance, decrease leakage current, and increase manufacturing efficiency.

In some aspects, the top contact can be n-type (e.g., n+), the memory cell can be p-type (e.g., p), and the bottom contact can be n-type (e.g., n+) so that the vertical 3D memory device forms p-type surrounding gate transistors (SGTs) with hole charge carriers. In some aspects, when activated (e.g., source line voltage applied) hole carriers flow through the memory cell from the bottom contact (e.g., source) to the top contact (e.g., drain).

In some aspects, the annular dielectric layer can include a high-k dielectric, an oxide, a nitride, or a combination thereof.

In some aspects, the annular dielectric layer can be between a body of the pillar and a channel of the pillar.

In some aspects, the body of the pillar and the channel of the pillar can have different doping concentrations to increase a floating body effect of the memory cell. In some aspects, the body of the pillar can have a doping concentration of about $5 \times 10^{18}$ cm$^{-3}$ and the channel of the pillar can have a doping concentration of about $1 \times 10^{16}$ cm$^{-3}$ to about $1 \times 10^{17}$ cm$^{-3}$.

In some aspects, the annular dielectric layer can isolate the body of the pillar thereby increasing a charge density in the body of the pillar. In some aspects, the charge density is greater than about $1 \times 10^{18}$ cm$^{-3}$.

In some aspects, the annular dielectric layer can have a thickness of about 1 nm to about 5 nm. In some aspects, the annular dielectric layer can have an outer diameter of about 25 nm to about 50 nm.

In some aspects, the annular dielectric layer can include an annulus extending axially along the pillar from a top end of the second gate contact to the bottom contact. In some aspects, the annulus can isolate a channel of the pillar from a body of the pillar thereby decreasing a leakage current of the memory cell. In some aspects, the leakage current can be no greater than about 1 pA.

In some aspects, pillar can be a monocrystalline material (e.g., silicon, germanium, Group IV semiconductor, Group III-V semiconductor, Group II-VI semiconductor, graphene, sapphire, etc.). In some aspects, a portion of the pillar can be a monocrystalline material (e.g., silicon, germanium, Group IV semiconductor, Group III-V semiconductor, Group II-VI semiconductor, graphene, sapphire, etc.). In some aspects, a channel of the pillar can be a monocrystalline material (e.g., silicon, germanium, Group IV semiconductor, Group III-V semiconductor, Group II-VI semiconductor, graphene, sapphire, etc.). In some aspects, a body of the pillar can be a monocrystalline material (e.g., silicon, germanium, Group IV semiconductor, Group III-V semiconductor, Group II-VI semiconductor, graphene, sapphire, etc.).

In some aspects, in a first logic state, the pillar of the memory cell can include the electrical charge. In some aspects, different voltage combinations can be applied to the bit line, the word line, the plate line, and the source line to perform a program (e.g., 1 state) operation on the memory cell to store the electrical charge on the pillar.

In some aspects, in the first logic state (e.g., 1 state), the top contact can have a voltage of about 0.8 V, the first gate contact can have a voltage of about 1.5 V, the second gate contact can have a voltage of about 0.8 V, and the bottom contact can have a voltage of about 0 V.

In some aspects, in a second logic state, the pillar of the memory cell can include substantially no electrical charge. In some aspects, different voltage combinations can be applied to the bit line, the word line, the plate line, and the source line to perform an erase (e.g., 0 state) operation on the memory cell to remove the electrical charge on the pillar.

In some aspects, in the second logic state (e.g., 0 state), the top contact can have a voltage of about 0 V, the first gate contact can have a voltage of about 0 V, the second gate contact can have a voltage of about 1 V, and the bottom contact can have a voltage of about −2 V.

In some aspects, the 3D memory device can perform a block erase operation. In some aspects, different voltage combinations can be applied to the bit line, the word line, the plate line, and the source line to perform a block erase (e.g., 0 state) operation on a plurality of 3D memory devices in a memory block simultaneously.

In some aspects, the 3D memory device can perform a refresh operation. In some aspects, different voltage combinations can be applied to the bit line, the word line, the plate line, and the source line to perform a refresh (e.g., "0 state" refresh, "1 state" refresh) operation on the memory cell.

In some aspects, the 3D memory device can perform a block refresh operation. In some aspects, different voltage combinations can be applied to the bit line, the word line, the plate line, and the source line to perform a block refresh (e.g., "0 state" refresh, "1 state" refresh) operation on a plurality of 3D memory devices in a memory block simultaneously.

In some aspects, the 3D memory device can include a dynamic flash memory (DFM) device. In some aspects, the top contact, the memory cell, and the bottom contact can form a DFM device. In some aspects, the DFM device can increase retention times, decrease refresh rates, increase a floating body effect, decrease manufacturing defects, decrease leakage current, decrease junction current, decrease power consumption, increase an upper limit of charge density, dynamically adjust a length of a gate contact in the memory cell, and decrease parasitic resistance.

In some aspects, the 3D memory device comprises a NAND DFM device. In some aspects, the 3D memory device can include floating-gate transistors (e.g., memory strings) connected in series that resemble a NAND gate.

In some aspects, a three-dimensional (3D) memory device can include a memory cell. In some aspects, the 3D memory device can include the memory cell, a top contact coupled to the memory cell, and a bottom contact coupled to the memory cell. In some aspects, the memory cell can include a pillar, an insulating layer, a first gate contact, a second gate contact, and a U-shaped dielectric layer. In some aspects, the pillar can be configured to store an electrical charge. In some aspects, the insulating layer can surround the pillar. In some aspects, the first gate contact can surround a first portion of the insulating layer. In some aspects, the first gate contact can be coupled to a word line configured to address and non-destructively read the pillar. In some aspects, the second gate contact can surround a second portion of the insulating layer. In some aspects, the second gate contact can be coupled to a plate line configured to program the pillar. In some aspects, the U-shaped dielectric layer can be within a portion of the pillar and between the pillar and the insulating layer. In some aspects, the U-shaped dielectric layer can be configured to increase a retention time in the pillar.

In some aspects, the top contact can be coupled to a bit line configured to flow electrical charge through and/or away from the memory cell. In some aspects, the bottom contact can be coupled to a source line configured to flow electrical charge through and/or away from the memory cell. In some aspects, different voltage combinations can be applied to the bit line, the word line, the plate line, and the source line to perform read (e.g., non-destructively), program (e.g., 1 state), and erase (e.g., 0 state) operations on the 3D memory device.

In some aspects, the U-shaped dielectric layer can extend axially along the pillar from a top end of the second gate contact to the bottom contact and along a portion of the bottom contact.

In some aspects, the U-shaped dielectric layer can isolate a channel of the pillar and a body of the pillar thereby decreasing a leakage current of the memory cell.

In some aspects, the U-shaped dielectric layer can isolate a body of the pillar from the bottom contact thereby decreasing a junction leakage of the memory cell.

In some aspects, the U-shaped dielectric layer can isolate a body of the pillar from the bottom contact thereby increasing an upper limit of charge density in the body of the pillar. In some aspects, the upper limit of charge density in the body of the pillar can be at least $1 \times 10^{18}$ cm$^{-3}$.

In some aspects, a method for forming a three-dimensional (3D) memory device can include forming an alternating dielectric stack atop a substrate. In some aspects, the method can further include forming a channel trench in the alternating dielectric stack. In some aspects, the method can further include forming a bottom contact in the channel trench. In some aspects, the method can further include forming an annular dielectric layer atop the bottom contact. In some aspects, the method can further include forming a pillar within the annular dielectric layer and atop the bottom contact. In some aspects, the method can further include forming a top contact atop the pillar. In some aspects, the method can further include forming a gate line trench in the alternating dielectric stack. In some aspects, the method can further include removing a portion of the alternating dielectric stack. In some aspects, the method can further include forming a conductive gate stack in the removed portion of the alternating dielectric stack to form a memory cell. In some aspects, the method can further include forming a high-k dielectric and conductive gate stack in the removed portion of the alternating dielectric stack to form a memory cell. In some aspects, the memory cell can include a first gate contact and a second gate contact. In some aspects, the method can further include forming a gate line slit in the gate line trench. In some aspects, the method can further include forming interconnects to the top contact, the first gate contact, the second gate contact, and the bottom contact.

In some aspects, the annular dielectric layer can include a high-k dielectric, an oxide, a nitride, or a combination thereof.

In some aspects, the forming the annular dielectric layer can include depositing a channel of the pillar and a dielectric layer atop the bottom contact. In some aspects, the forming the annular dielectric layer can include removing a portion of the channel of the pillar and the dielectric layer contacting the bottom contact.

In some aspects, the forming the pillar can include depositing a body of the pillar within the annular dielectric layer and atop the bottom contact.

In some aspects, the method can include forming a DFM device. In some aspects, forming the top contact, the memory cell, and the bottom contact can form a DFM device. In some aspects, the formed DFM device can increase retention times, decrease refresh rates, increase a floating body effect, decrease manufacturing defects, decrease leakage current, decrease junction current, decrease power consumption, increase an upper limit of charge density, dynamically adjust a length of a gate contact in the memory cell, and decrease parasitic resistance.

In some aspects, the method can include forming a NAND DFM device. In some aspects, forming the NAND DFM device can include forming floating-gate transistors (e.g., memory strings) connected in series that resemble a NAND gate.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and exemplary aspects of the aspects, as well as the structure and operation of various aspects, are described in detail below with reference to the accompanying drawings. It is noted that the aspects are not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the aspects and, together with the description, further serve to explain the principles of the aspects and to enable a person skilled in the relevant art(s) to make and use the aspects.

Figure 1:
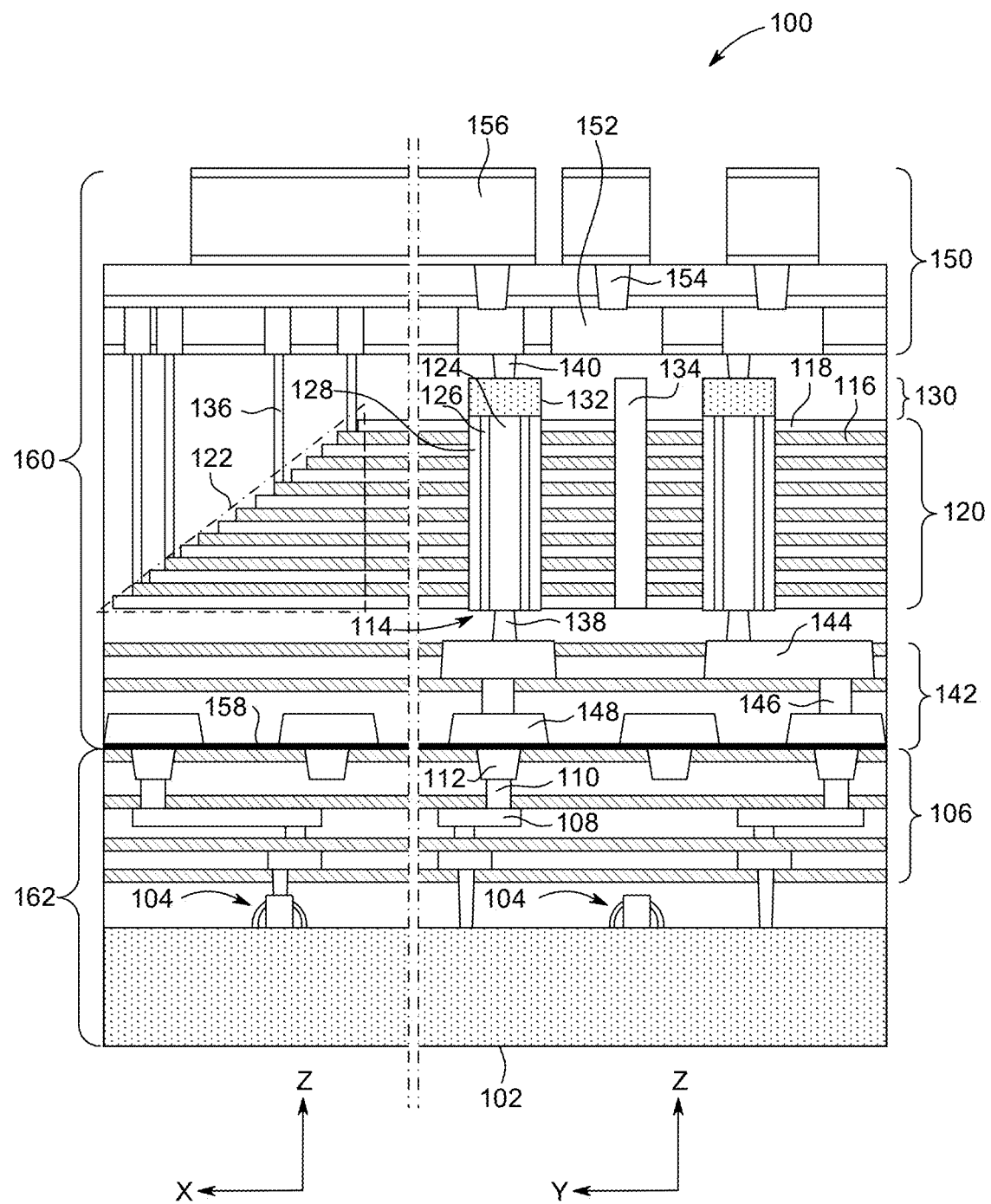
FIG. 1 is a schematic cross-sectional illustration of a 3D memory device, according to an exemplary aspect.

The features and exemplary aspects of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more aspects that incorporate the features of this present invention. The disclosed aspect(s) merely exemplify the present invention. The scope of the invention is not limited to the disclosed aspect(s). The present invention is defined by the claims appended hereto.

The aspect(s) described, and references in the specification to "one aspect," "an aspect," "an example aspect," "an exemplary aspect," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is understood that it is within the knowledge of one skilled in the art to effect such feature, structure, or characteristic in connection with other aspects whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

The term "dynamic random-access memory" or "DRAM" as used herein indicates a volatile memory that uses charge stored on a capacitor to represent information. DRAM stores each bit in a memory cell that includes a transistor and a capacitor (e.g., 1T1C). The 1T1C design can be based on metal-oxide-semiconductor (MOS) technology. Charge levels greater than a certain threshold can represent a first logic level (e.g., 1 state) and charge levels less than another threshold amount can represent a second logic level (e.g., 0 state). Leakage currents and various parasitic effects limit the length of time a capacitor can hold charge. Each time data is read, it must be rewritten to ensure retention and regular data refresh cycles must be performed. DRAM retention times can be as low as 32 ms during high temperature operations (e.g., greater than 85° C.) and can require refresh rates of about 31 Hz.

The term "flash memory" or "flash" as used herein indicates a non-volatile memory that uses charge stored on a floating gate to represent information. Flash stores each bit in a memory cell that includes a transistor with a floating gate. The amount of charge on the floating gate will determine whether the transistor will conduct when a fixed set of read bias conditions are applied. Flash can retain charge for a long period of time (e.g., about 10 years at 85° C.) since the floating gate is completely surrounded by insulators. Further, the act of reading the data can be performed non-destructively without loss of the information. In addition, flash can quickly erase data and entire blocks or pages of data can be erased simultaneously.

The term "NAND" as used herein indicates memory designs or architectures that resemble NAND logic gates (e.g., an inverted AND gate) and connect to memory cells in series (e.g., memory strings). In NAND flash, the relationship between a bit line and a word line resembles a NAND logic gate and can be used for fast writes and high-density arrays. NAND flash can access data sequentially since the transistors in the array are connected in series (e.g., memory strings). NAND flash can be read, programmed (written), and erased in blocks or pages. NAND flash can have a smaller cell size than DRAM but can require additional circuitry to implement.

The term "surrounding gate transistor" or "SGT" as used herein indicates a memory device that has a gate surrounding a channel region of a transistor on all sides.

The term "dynamic flash memory" or "DFM" as used herein indicates a volatile memory that uses a dual gate SGT. The dual gates of the dual gate SGT can include a word line (WL) gate and a plate line (PL) gate. DFM can be capacitor-free and can store charge on a channel region of a transistor. DFM can still requires a refresh cycle but can offer longer retention times, faster operation speeds, and higher density than compared to DRAM or other types of volatile memory. Further, similar to flash, DFM can offer block refresh and block erase operations.

The term "bit line" or "BL" as used herein indicates an array connection to address a particular memory cell in a memory array. A bit line can be connected to a drain of a transistor (e.g., DFM device). A bit line can be connected to two or more serially connected memory cells (e.g., memory strings). Different voltage combinations applied to the bit line can define read, program (write), and erase operations in the memory cell.

The term "source line" or "SL" as used herein indicates an array connection to address a particular memory cell in a memory array. A source line can be connected to a source of a transistor (e.g., DFM device). A source line can be connected to two or more serially connected memory cells (e.g., memory strings). Different voltage combinations applied to the source line can define read, program (write), and erase operations in the memory cell.

The term "word line" or "WL" as used herein indicates an array connection to provide a voltage to a particular memory cell in a memory array to select which row of bits is to be read, programmed, or erased. A word line can act as a top select gate (TSG). A word line can be connected to a portion of a channel or a portion of a body of a transistor (e.g., DFM device). Different voltage combinations applied to the word line can define read, program (write), and erase operations in the memory cell. When the word line is activated, current flows only if charge is already on the memory cell. If there is charge on the channel or body of the memory cell, the read operation recharges the memory cell and is non-destructive. If there is no charge on the channel or body of the memory cell, no current flows and the read is also non-destructive.

The term "plate line" or "PL" as used herein indicates an array connection to provide a voltage to a particular memory cell in a memory array to read, program, or erase charge on the memory cell. A plate line can be connected to a portion of a channel or a portion of a body of a transistor (e.g., DFM device). Different voltage combinations applied to the plate line can define read, program (write), and erase operations in the memory cell. When the plate line is activated, charge flows from the source line (source) to the bit line (drain).

When the plate line is deactivated, any remaining charge is stored in the channel or body of the memory cell.

The term "substrate" as used herein indicates a planar wafer on which subsequent layers can be deposited, formed, or grown. A substrate can be formed of a single element (e.g., Si) or a compound material (e.g., GaAs), and may be doped or undoped. For example, a substrate can include silicon (Si), germanium (Ge), silicon-germanium (SiGe), gallium arsenide (GaAs), gallium nitride (GaN), gallium phosphide (GaP), gallium antimonide (GaSb), indium phosphide (InP), indium antimonide (InSb), a Group IV semiconductor, a Group III-V semiconductor, a Group II-VI semiconductor, graphene, sapphire, and/or any other semiconductor material. A substrate can be a monocrystalline material (e.g., monocrystalline Si).

The term "Group III-V semiconductor" as used herein indicates comprising one or more materials from Group III of the periodic table (e.g., group 13 elements: boron (B), aluminum (Al), gallium (Ga), indium (In), thallium (Tl)) with one or more materials from Group V of the periodic table (e.g., group 15 elements: nitrogen (N), phosphorus (P), arsenic (As), antimony (Sb), bismuth (Bi)). The compounds have a 1:1 combination of Group III and Group V regardless of the number of elements from each group. Subscripts in chemical symbols of compounds refer to the proportion of that element within that group. For example, $Al_{0.25}GaAs$ means the Group III part comprises 25% Al, and thus 75% Ga, while the Group V part comprises 100% As.

The term "Group IV semiconductor" as used herein indicates comprising two or more materials from Group IV of the periodic table (e.g., group 14 elements: carbon (C), silicon (Si), germanium (Ge), tin (Sn), lead (Pb)). Subscripts in chemical symbols of compounds refer to the proportion of that element. For example, $Si_{0.25}Ge_{0.75}$ means the Group IV part comprises 25% Si, and thus 75% Ge.

The term "Group II-VI semiconductor" as used herein indicates comprising one or more materials from Group II of the periodic table (e.g., group 12 elements: zinc (Zn), cadmium (Cd), mercury (Hg)) with one or more materials from Group VI of the periodic table (e.g., group 16 elements: oxygen (O), sulfur(S), selenium (Se), tellurium (Te)). The compounds have a 1:1 combination of Group II and Group VI regardless of the number of elements from each group. Subscripts in chemical symbols of compounds refer to the proportion of that element within that group.

The term "doping" or "doped" as used herein indicates that a layer or material contains a small impurity concentration of another element (dopant) which donates (donor) or extracts (acceptor) charge carriers from the parent material and therefore alters the conductivity. Charge carriers may be electrons or holes. A doped material with extra electrons is called n-type while a doped material with extra holes (fewer electrons) is called p-type.

The term "floating body effect" as used herein indicates the dependence of a body potential of a memory cell to accumulate charge (e.g., holes) due to a capacitor formed from the memory cell's body (e.g., pillar), a surrounding insulating layer, and a gate contact. The memory cell's body is electrically floating and not tied to a fixed voltage. Historical biasing and carrier recombination (e.g., also known as the history effect) affect the floating body since the memory cell (e.g., transistor) retains some charge after each cycle, similar to a capacitor. Charge (e.g., holes) can be stored and removed from the memory cell's body, similar to a conventional DRAM capacitor cell. Charge retention times can be adjusted (e.g., tuned) based on the structure of the memory cell (e.g., insulating layer thickness, pillar diameter, etc.).

The term "parasitic resistance" or "parasitic effects" or "parasitic structures" as used herein indicates resistive, capacitive, and/or inductive coupling between one or more elements in a circuit that produces unwanted or undesired results due to, for example, the proximity of the elements relative to each other or smaller electrical junctions that belong to two or more intended devices or functions. Parasitic effects can cause deviation from normal operation and can include non-linear effects.

The term "crystalline" as used herein indicates a material or layer with a single crystal orientation. In epitaxial growth or deposition, subsequent layers with the same or similar lattice constant follow the registry of the previous crystalline layer and therefore grow with the same crystal orientation or crystallinity.

The term "monocrystalline" as used herein indicates a material or layer having a continuous crystal lattice throughout the material or layer. Monocrystalline can indicate a single crystal or monocrystal (e.g., Si, Ge, GaAs, etc.).

The term "monolithic" as used herein indicates a layer, element, or substrate comprising bulk (e.g., single) material throughout. A monolithic element (e.g., a pillar) can be formed from a single bulk material (e.g., Si).

The term "deposit" or "deposition" as used herein indicates the depositing or growth of a layer on another layer or substrate. Deposition can encompass vacuum deposition, thermal evaporation, arc vaporization, ion beam deposition, e-beam deposition, sputtering, laser ablation, pulsed laser deposition (PLD), physical vapor deposition (PVD), atomic layer deposition (ALD), chemical vapor deposition (CVD), plasma-enhanced CVD (PECVD), low pressure CVD (LPCVD), metal-organic chemical vapor deposition (MOCVD), liquid source misted chemical deposition, spin-coating, epitaxy, vapor-phase epitaxy (VPE), liquid-phase epitaxy (LPE), solid-phase epitaxy (SPE), MBE, atomic layer epitaxy (ALE), molecular-beam epitaxy (MBE), powder bed deposition, and/or other known techniques to deposit material in a layer.

The term "dielectric" as used herein indicates an electrically insulating layer. Dielectric can encompass oxide, nitride, oxynitride, ceramic, glass, spin-on-glass (SOG), polymer, plastic, thermoplastic, resin, laminate, high-k dielectric, and/or any other electrically insulating material.

The term "high-k dielectric" as used herein indicates a material with a high dielectric constant k or K (kappa), for example, relative to the dielectric constant of silicon dioxide ($SiO_2$). High-k dielectrics can be used as a gate dielectric or as another dielectric layer in an electronic device.

The term "high-k metal gate" or "high-k dielectric and conductive gate" or "HKMG" as used herein indicates a process of forming a high-k dielectric layer and a conductive (metal) layer stack in a memory device. HKMG technology can reduce gate leakage, increase transistor capacitance, and provide low power consumption for devices. Two process flows to pattern the HKMG stack are gate-first and gate-last.

The term "epitaxy" or "epitaxial" or "epitaxially" as used herein indicates crystalline growth of material, for example, via high temperature deposition.

The term "selective epitaxial growth" or "SEG" as used herein indicates local growth of an epitaxial layer through a pattern mask on a substrate or a layer. SEG provides epitaxial growth only on the exposed substrate or layer and other regions are masked by a dielectric film or other material that is not reactive to epitaxy.

The term "alternating dielectric stack" as used herein indicates a stack of different alternating dielectric layers in succession. For example, the first dielectric layer can be an oxide (e.g., silicon oxide) and the second dielectric layer can be a nitride (e.g., silicon nitride). The alternating dielectric stack can be arranged in a staircase pattern.

The term "gate line trench" as used herein indicates a trench or hole extending through an alternating dielectric stack of a memory device. The gate line trench can be used to form a gate line slit in the memory device.

The term "gate line slit" or "GLS" as used herein indicates a conductive pathway through an alternating dielectric stack, for example, between adjacent memory blocks or adjacent memory cells. The GLS can provide connection to a HKMG stack in a memory device. The GLS can extend vertically through the alternating dielectric stack and extend horizontally between two adjacent arrays of memory blocks or memory cells.

Aspects of the disclosure may be implemented in hardware, firmware, software, or any combination thereof. Aspects of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; dynamic flash memory (DFM) devices, electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Before describing such aspects in more detail, however, it is instructive to present example environments in which aspects of the present disclosure may be implemented.

Exemplary 3D Memory Device

FIG. 1 is a schematic cross-sectional illustration of 3D memory device 100, according to an exemplary aspect. 3D memory device 100 can be configured to increase storage density and incorporate a memory array and peripheral devices for controlling signals to and from the memory array. Although 3D memory device 100 is shown in FIG. 1 as a stand-alone apparatus and/or system, the aspects of this disclosure can be used with other apparatuses, systems, and/or methods, such as, but not limited to, dual gate SGT device 200, DFM device 300, retention DFM device 500, retention DFM device 500', manufacturing method 700, manufacturing method 1000, flow diagram 1100 and/or flow diagram 1200.

As shown in FIG. 1, 3D memory device 100 can include substrate 102, memory array 160, and peripheral device 162. Memory array 160 can include memory stack 120, semiconductor layer 130, array interconnect layer 142, and back-end-of-line (BEOL) interconnect layer 150. Peripheral device 162 can include substrate 102, plurality of transistors 104, and interconnect layer 106. 3D memory device 100 represents an example of a non-monolithic 3D memory device, in which components of the 3D memory device 100 (e.g., peripheral devices and memory arrays) can be formed separately on different substrates and then joined to from 3D memory device 100. This is described in further detail in U.S. Pat. No. 10,867,678, which is incorporated by reference herein in its entirety.

3D memory device 100 can include substrate 102, for example, silicon (e.g., single crystalline silicon), silicon-germanium (SiGe), gallium arsenide (GaAs), germanium (Ge), silicon on insulator (SOI), or any other suitable materials. 3D memory device 100 can include peripheral device 162 on substrate 102. Peripheral device 162 can be formed "on" substrate 102, where the entirety or part of peripheral device 162 is formed in substrate 102 (e.g., below the top surface of substrate 102) and/or directly on substrate 102. Peripheral device 162 can include transistors 104 formed on substrate 102. Isolation regions (e.g., shallow trench isolations (STIs)) and doped regions (e.g., source regions and drain regions of transistors 104) can be formed in substrate 102 as well. In some aspects, peripheral device 162 can be formed on substrate 102 using complementary metal-oxide-semiconductor (CMOS) technology.

3D memory device 100 can include interconnect layer 106 above transistors 104 to transfer electrical signals to and from transistors 104. Interconnect layer 106 can include a plurality of interconnects (also referred to herein as "contacts"), including interconnect lines 108 and vertical interconnect access (via) contacts 110. As used herein, the term "interconnects" can broadly include any suitable types of interconnects, such as front-end-of-line (FEOL) interconnects, middle-end-of-line (MEOL) interconnects, and/or BEOL interconnects.

Interconnect layer 106 can further include one or more interlayer dielectric (ILD) layers (also known as "intermetal dielectric (IMD) layers") in which interconnect lines 108 and via contacts 110 can form. That is, interconnect layer 106 can include interconnect lines 108 and via contacts 110 in multiple ILD layers. Interconnect lines 108 and via contacts 110 in interconnect layer 106 can include conductive materials including, but not limited to, tungsten (W), cobalt (Co), copper (Cu), aluminum (Al), silicides, or any combination thereof. The ILD layers in interconnect layer 106 can include dielectric materials including, but not limited to, silicon oxide, silicon nitride, silicon oxynitride, low dielectric constant (low-k) dielectrics, or any combination thereof.

In some aspects, interconnect layer 106 can further include bonding contacts 112 at the top surface of interconnect layer 106. Bonding contacts 112 can include conductive materials including, but not limited to, W, Co, Cu, Al, silicides, or any combination thereof. The remaining areas at the top surface of interconnect layer 106 can be formed with dielectric materials including, but not limited to, silicon oxide, silicon nitride, silicon oxynitride, low-k dielectrics, or any combination thereof. Conductive materials (e.g., of bonding contacts 112) and dielectric materials at the top surface of interconnect layer 106 can be used for hybrid bonding as described below in detail.

3D memory device 100 can include memory array 160 above peripheral device 162. It is noted that X, Y, and Z axes are shown in FIG. 1 to further illustrate the spatial relationship of the components in 3D memory device 100. Substrate 102 includes two lateral surfaces (e.g., a top surface and a bottom surface) extending laterally in the X- and Y-directions (i.e., the lateral or width directions). As used herein, whether one component (e.g., a layer or a device) is "on," "above," or "below" another component (e.g., a layer or a device) of a semiconductor device (e.g., 3D memory device 100) is determined relative to the substrate of the semiconductor device (e.g., substrate 102) in the Z-direction (i.e., the vertical or thickness direction) when the substrate is positioned in the lowest plane of the semiconductor device in the Z-direction. The same notion for describing spatial relationship is applied throughout the present disclosure.

In some aspects, 3D memory device 100 is a NAND flash memory device in which memory cells are provided in the form of an array of NAND memory strings 114 each extending vertically above peripheral device 162 (e.g., transistors 104) and substrate 102. Memory array 160 can include NAND memory strings 114 that extend vertically through a plurality of alternating conductive/dielectric layer pairs, each including conductor layer 116 and dielectric layer 118. The stacked conductor/dielectric layer pairs are also referred to herein as memory stack 120. Conductor layers 116 and dielectric layers 118 in memory stack 120 alternate in the vertical direction. In other words, except at the top or bottom of memory stack 120, each conductor layer 116 can be adjoined by two dielectric layers 118 on both sides, and each dielectric layer 118 can be adjoined by two conductor layers 116 on both sides. Conductor layers 116 can each have the same thickness or different thicknesses. Similarly, dielectric layers 118 can each have the same thickness or different thicknesses. Conductor layers 116 can include conductive materials including, but not limited to, W, Co, Cu, Al, doped silicon, silicides, or any combination thereof. Dielectric layers 118 can include dielectric materials including, but not limited to, silicon oxide, silicon nitride, silicon oxynitride, or any combination thereof.

Memory stack 120 can include an inner region (also known as a "core array region") and an outer region (also known as a "staircase region"). In some aspects, the inner region is the center region of memory stack 120 where NAND memory strings 114 are formed, and the outer region is the remaining region of memory stack 120 surrounding the inner region (including the sides and edges). As shown in FIG. 1, at least on one lateral side, the outer region of memory stack 120 can include staircase structure 122. The edges of the conductor/dielectric layer pairs in staircase structure 122 of memory stack 120 along the vertical direction away from substrate 102 (the positive Z-direction) are staggered laterally toward NAND memory strings 114. In other words, the edges of memory stack 120 in staircase structure 122 can be tilted toward the inner region as moving away from substrate 102 (from bottom to top). The slope of staircase structure 122 can face away from substrate 102. In some aspects, the length of each conductor/dielectric layer pair of memory stack 120 increases from the top to the bottom.

In some aspects, each two adjacent conductor/dielectric layer pairs in staircase structure 122 are offset by a nominally same distance in the vertical direction (Z-direction) and a nominally same distance in the lateral direction (X-direction). Each offset thus can form a "landing area" for word line fan-out in the vertical direction. Some conductor layers 116 in the conductor/dielectric layer pairs can function as word lines of 3D memory device 100 and extend laterally into staircase structure 122 for interconnection. As shown in FIG. 1, the offset of the edges of each adjacent conductor/dielectric layer pairs in staircase structure 122 is nominally the same, according to some aspects.

As shown in FIG. 1, each NAND memory string 114 can extend vertically through the inner region of memory stack 120 and include semiconductor channel 124 and a dielectric layer (also known as a "memory film"). In some aspects, semiconductor channel 124 includes silicon, such as amorphous silicon, polysilicon, or single crystalline silicon. In some aspects, the memory film is a composite layer including tunneling layer 126, storage layer 128 (also known as a "charge trap/storage layer"), and a blocking layer. Each NAND memory string 114 can have a cylindrical shape (e.g., a pillar shape). Semiconductor channel 124, tunneling layer 126, storage layer 128, and a blocking layer are arranged radially from the center toward the outer surface of the pillar in this order, according to some aspects. Tunneling layer 126 can include silicon oxide, silicon oxynitride, or any combination thereof. Storage layer 128 can include silicon nitride, silicon oxynitride, silicon, or any combination thereof. The blocking layer can include silicon oxide, silicon oxynitride, high dielectric constant (high-k) dielectrics, or any combination thereof.

In some aspects, NAND memory strings 114 further include a plurality of control gates (each being part of a word line). Each conductor layer 116 in memory stack 120 can act as a control gate for each memory cell of NAND memory string 114. Each NAND memory string 114 can include a source select gate at its upper end and a drain select gate at its lower end. As used herein, the "upper end" of a component (e.g., NAND memory string 114) is the end farther away from substrate 102 in the Z-direction, and the "lower end" of the component (e.g., NAND memory string 114) is the end closer to substrate 102 in the Z-direction. For each NAND memory string 114, the drain select gate can be disposed below the source select gate in 3D memory device 100.

In some aspects, 3D memory device 100 further includes semiconductor layer 130 disposed above and in contact with NAND memory strings 114, for example, on the upper end of each NAND memory string 114. Memory stack 120 can be disposed below semiconductor layer 130. Semiconductor layer 130 can be a thinned substrate on which memory stack 120 is formed. In some aspects, semiconductor layer 130 includes semiconductor plugs 132 electrically separated by isolation regions (e.g., STIs). In some aspects, each semiconductor plug 132 is disposed at the upper end of corresponding NAND memory string 114 and functions as the source of corresponding NAND memory string 114 and thus, can be considered as part of corresponding NAND memory string 114. Semiconductor plug 132 can include single crystalline silicon. Semiconductor plug 132 can be undoped, partially doped (in the thickness direction and/or the width direction), or fully doped by p-type or n-type dopants. In some aspects, semiconductor plug 132 can include SiGe, GaAs, Ge, or any other suitable materials.

In some aspects, 3D memory device 100 can further include gate line slit (GLS) 134 that extends vertically in the Z-direction through memory stack 120. GLS 134 can extend along the X-direction which is parallel to staircase structure 122 extending along the X-direction. FIG. 1 shows a cross-sectional view of GLS 134 along the YZ-plane and a separate (orthogonal) cross-sectional view of staircase structure 122 along the XZ-plane. GLS 134 can be used to form the conductor/dielectric layer pairs in memory stack 120 by a gate replacement process. In some aspects, GLS 134 is first filled with dielectric materials, for example, silicon oxide, silicon nitride, or any combination thereof, for separating NAND memory strings 114 into different regions (e.g., memory fingers and/or memory blocks). Then, GLS 134 can be filled with conductive and/or semiconductor materials, for example, W, Co, polysilicon, or any combination thereof, for electrically controlling an array common source (ACS), according to some aspects.

In some aspects, 3D memory device 100 can include local interconnects that are formed in one or more ILD layers and in contact with components in memory stack 120, such as the word lines (e.g., conductor layers 116) and NAND memory strings 114. The interconnects are referred to herein as "local interconnects" as they are in contact with the components in memory stack 120 directly for fan-out. The local interconnects can include word line contacts 136, bit line contacts 138, and source line contacts 140. Each local interconnect can include an opening (e.g., a via hole or a trench) filled with conductive materials including, but not limited to, W, Co, Cu, Al, silicides, or any combination thereof.

Word line contacts 136 can extend vertically through one or more ILD layers. Each word line contact 136 can have its lower end in contact with corresponding conductor layer 116 (e.g., at the landing area) in staircase structure 122 of memory stack 120 to individually address a corresponding word line of 3D memory device 100. In some aspects, each word line contact 136 is disposed above corresponding conductor layer 116. Each bit line contact 138 can be disposed below memory stack 120 and have its upper end in contact with the lower end (e.g., the drain end) of corresponding NAND memory string 114 to individually address corresponding NAND memory string 114. Multiple bit line contacts 138 are disposed below and in contact with multiple NAND memory strings 114, respectively, according to some aspects. As shown in FIG. 1, word line contacts 136 and bit line contacts 138 fan-out the corresponding memory stack components toward opposite vertical directions (the positive and negative Z-directions). Source line contacts 140 can extend vertically through one or more ILD layers. Each source line contact 140 can have its lower end in contact with corresponding semiconductor plug 132 (e.g., the source) of NAND memory string 114. In some aspects, each source line contact 140 is disposed above corresponding NAND memory string 114.

Similar to peripheral device 162, memory array 160 of 3D memory device 100 can also include interconnect layers for transferring electrical signals to and from NAND memory strings 114. As shown in FIG. 1, 3D memory device 100 can include array interconnect layer 142 below NAND memory strings 114. Array interconnect layer 142 can include a plurality of interconnects, including array interconnect lines 144 and array via contacts 146 in one or more ILD layers. In some aspects, array interconnect layer 142 includes array bonding contacts 148 at its bottom surface. Array interconnect lines 144, array via contacts 146, and array bonding contacts 148 can include conductive materials including, but not limited to, W, Co, Cu, Al, silicides, or any combination thereof. The remaining areas at the bottom surface of array interconnect layer 142 can be formed with dielectric materials including, but not limited to, silicon oxide, silicon nitride, silicon oxynitride, low-k dielectrics, or any combination thereof. Conductive materials (of array bonding contacts 148) and dielectric materials at the bottom surface of array interconnect layer 142 can be used for hybrid bonding as described below in detail.

As shown in FIG. 1, BEOL interconnect layer 150 can be disposed above NAND memory strings 114 and semiconductor layer 130 and can include interconnects, such as BEOL interconnect lines 152 and BEOL via contacts 154 in one or more ILD layers. BEOL interconnect layer 150 can further include BEOL contact pads 156 and a redistribution layer at the top surface of 3D memory device 100 for wire bonding and/or bonding with an interposer. BEOL interconnect layer 150 and array interconnect layer 142 can be formed at opposite sides of NAND memory strings 114. In some aspects, BEOL interconnect lines 152, BEOL via contacts 154, and BEOL contact pads 156 in BEOL interconnect layer 150 can transfer electrical signals between 3D memory device 100 and external circuits. BEOL interconnect layer 150 can be electrically connected to memory stack 120 by the local interconnects. As shown in FIG. 1, each word line contact 136 can have its upper end in contact with BEOL interconnect layer 150. Similarly, each source line contact 140 can have its upper end in contact with BEOL interconnect layer 150. The arrangement and configuration of staircase structure 122 and semiconductor layer 130 allow direct fan-out of the word lines (e.g., conductor layers 116) and the sources of NAND memory strings 114 through the local interconnects (e.g., word line contacts 136 and source line contacts 140) and BEOL interconnect layer 150 without detouring through array interconnect layer 142.

In some aspects, 3D memory device 100 further includes one or more through array contacts (TACs) that extend vertically through memory stack 120. Each TAC can extend through the entirety of memory stack 120, (e.g., all the conductor/dielectric layer pairs therein) and have its upper end in contact with BEOL interconnect layer 150 and its lower end in contact with array interconnect layer 142. TACs can thus make electrical connections between interconnect layer 106 and BEOL interconnect layer 150 and carry electrical signals from peripheral device 162 to BEOL interconnect layer 150 of 3D memory device 100.

Bonding interface 158 can be formed between interconnect layer 106 and array interconnect layer 142. Bonding contacts 112 and be bonded with array bonding contacts 148 at bonding interface 158. As shown in FIG. 1, peripheral device 162 (e.g., transistors 104) can be disposed below memory array 160 (e.g., NAND memory strings 114) in 3D memory device 100 after bonding. In 3D memory device 100, bonding interface 158 is disposed between memory array 160 (e.g., NAND memory strings 114) and peripheral device 162 (e.g., transistors 104), according to some aspects. Interconnect layer 106 can be between bonding interface 158 and peripheral device 162 (e.g., transistors 104), and array interconnect layer 142 can be between bonding interface 158 and memory array 160 (e.g., NAND memory strings 114).

In some aspects, a first semiconductor structure (e.g., memory array 160), including NAND memory strings 114, semiconductor layer 130 (e.g., a thinned substrate), array interconnect layer 142, BEOL interconnect layer 150, and word line contacts 136, can be bonded to a second semiconductor structure (e.g., peripheral device 162), including substrate 102, transistors 104, and interconnect layer 106, in a face-to-face manner at bonding interface 158. Array interconnect layer 142 can contact interconnect layer 106 at bonding interface 158. Peripheral device 162 and memory array 160 can be bonded using hybrid bonding (also known as "metal/dielectric hybrid bonding"), which is a direct bonding technology (e.g., forming bonding between surfaces without using intermediate layers, such as solder or adhesives) and can obtain metal-metal bonding and dielectric-dielectric bonding simultaneously. The metal-metal bonding can be formed between array bonding contacts 148 and bonding contacts 112, and the dielectric-dielectric bonding can be formed between the dielectric materials at the remaining areas at bonding interface 158.

Exemplary Dual Gate Surrounding Gate Transistor (SGT) Device

Figure 2:
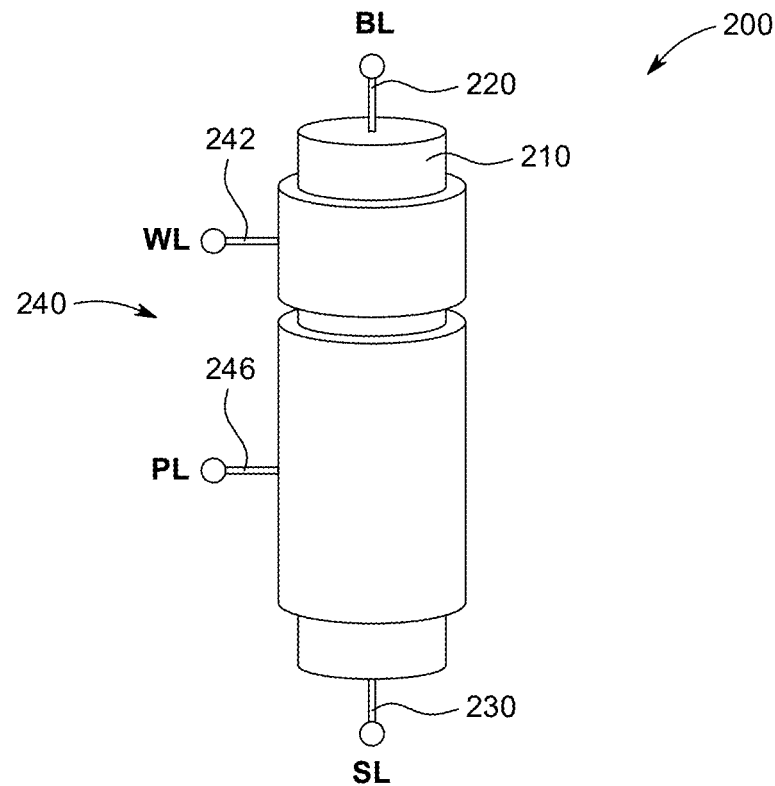
FIG. 2 is a schematic perspective illustration of a dual gate SGT device, according to an exemplary aspect.

FIG. 2 is a schematic perspective illustration of dual gate SGT device 200, according to an exemplary aspect. Dual gate SGT device 200 can be configured to provide two gates (e.g., word line 242 and plate line 246) surrounding a channel region (e.g., pillar 210) on all sides. Dual gate SGT device 200 can be further configured to operate as a volatile capacitor-free 3D memory device. Although dual gate SGT device 200 is shown in FIG. 2 as a stand-alone apparatus and/or system, the aspects of this disclosure can be used with other apparatuses, systems, and/or methods, such as, but not limited to, 3D memory device 100, DFM device 300, retention DFM device 500, retention DFM device 500', manufacturing method 700, manufacturing method 1000, flow diagram 1100 and/or flow diagram 1200.

As shown in FIG. 2, dual gate SGT device 200 can include pillar 210, bit line (BL) 220, source line (SL) 230, and SGT cell 240. Pillar 210 can be configured to store charge (e.g., holes). BL 220 can be configured to address pillar 210 in dual gate SGT device 200 and act as a drain connection to pillar 210. SL 230 can be configured to address pillar 210 in dual gate SGT device 200 and act as a source connection to pillar 210. SGT cell 240 can be configured to address pillar 210 in dual gate SGT device 200 and act as a gate connection to pillar 210. In some aspects, different voltage combinations applied to BL 220, SL 230, and SGT cell 240 can define read, program (write), and erase operations in dual gate SGT device 200.

SGT cell 240 can include word line (WL) 242 and plate line (PL) 246. WL 242 can be configured to address pillar 210 in dual gate SGT device 200 and act as a first gate connection to pillar 210. In some aspects, WL 242 can act as a top select gate connection. In some aspects, WL 242 can provide a voltage to read, program, or erase charge on pillar 210. PL 246 can be configured to address pillar 210 in dual gate SGT device 200 and act as a second gate connection of pillar 210. In some aspects, PL 246 can act as a traditional current-valve gate (e.g., similar to a metal-oxide-semiconductor field-effect transistor (MOSFET) gate) for pillar 210 and cover a majority of a length of pillar 210. In some aspects, PL 246 can provide a voltage to read, program, or erase charge on pillar 210. In some aspects, dual gate SGT device 200 can form part of DFM device 300 shown in FIG. 3.

Exemplary Dynamic Flash Memory (DFM) Device

Figure 3:
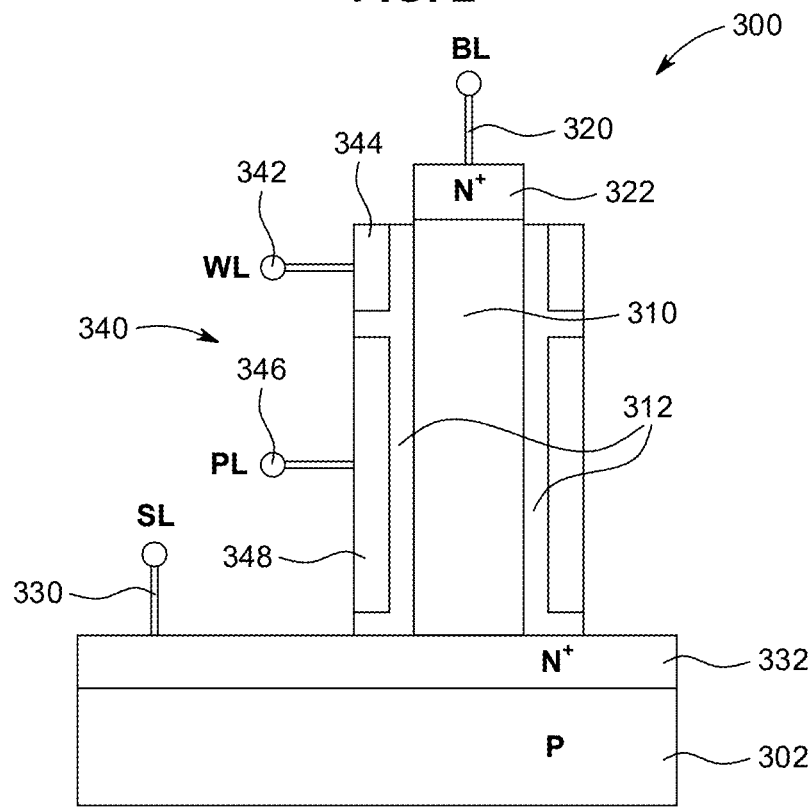
FIG. 3 is a schematic cross-sectional illustration of a DFM device, according to an exemplary aspect.
Figure 4:
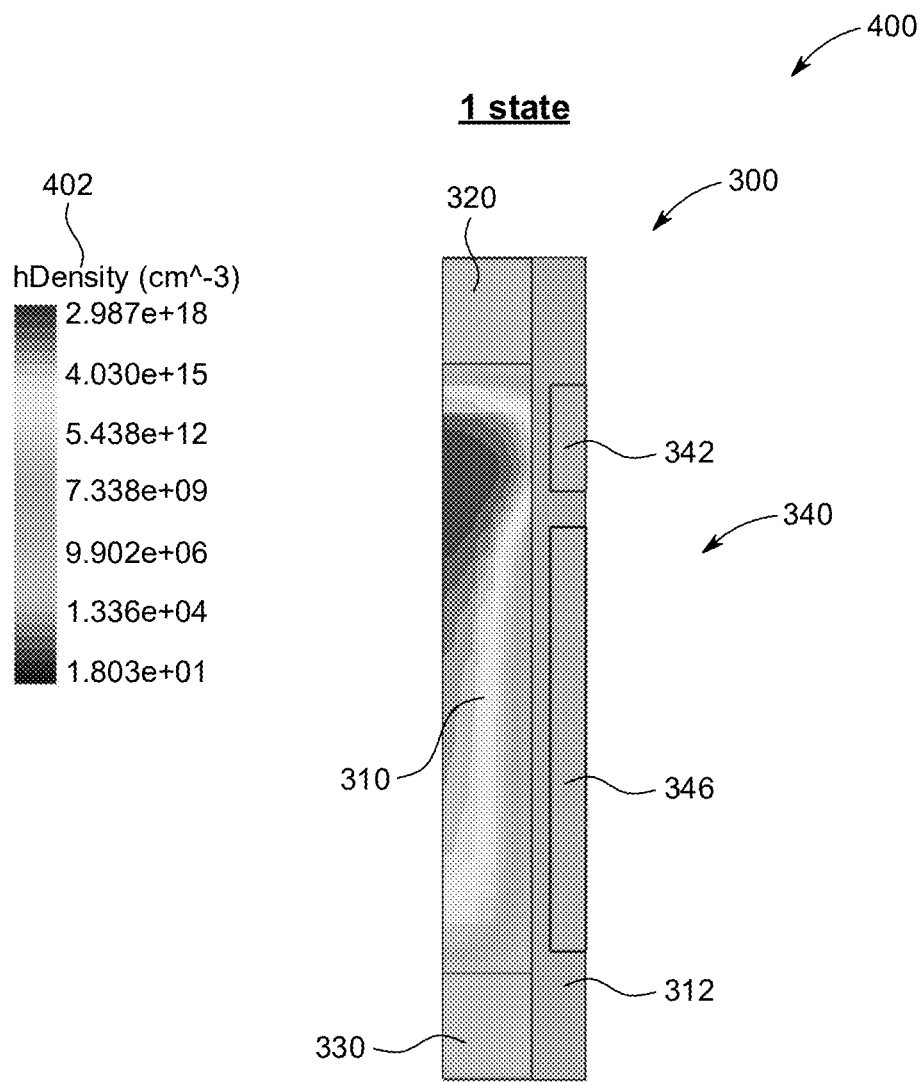
FIG. 4 is a schematic cross-sectional illustration of a charge density distribution of the DFM device shown in FIG. 3 for a program state, according to an exemplary aspect.

FIGS. 3 and 4 illustrate DFM device 300, according to exemplary aspects. FIG. 3 is a schematic cross-sectional illustration of DFM device 300, according to an exemplary aspect. FIG. 4 is a schematic cross-sectional illustration of charge density distribution 400 of DFM device 300 shown in FIG. 3 for a program state (1 state), according to an exemplary aspect. DFM device 300 can be configured to include dual gate SGT device 200 in a vertical arrangement on substrate 302 and operate as a volatile capacitor-free 3D memory device. DFM device 300 can be further configured to provide faster operation speeds and higher density than DRAM or other types of volatile memory. DFM device 300 can be further configured to provide block refresh and block erase operations similar to flash memory functionality. Although DFM device 300 is shown in FIGS. 3 and 4 as a stand-alone apparatus and/or system, the aspects of this disclosure can be used with other apparatuses, systems, and/or methods, such as, but not limited to, 3D memory device 100, dual gate SGT device 200, retention DFM device 500, retention DFM device 500', manufacturing method 700, manufacturing method 1000, flow diagram 1100 and/or flow diagram 1200.

As shown in FIG. 3, DFM device 300 can include substrate 302, pillar 310, dielectric 312, bit line (BL) 320, BL contact 322, source line (SL) 330, SL contact 332, and DFM cell 340. Substrate 302 can be configured to support pillar 310, dielectric 312, BL contact 322, SL contact 332, and DFM cell 340. Substrate 302 can be coupled to SL contact 332. In some aspects, substrate 302 can be a p-type semiconductor (e.g., p), for example, doped silicon. Pillar 310 can be configured to store charge (e.g., holes). Pillar 310 can be between BL contact 322 and SL contact 332. Dielectric 312 can surround pillar 310 and be configured to provide electrical insulation between pillar 310 and DFM cell 340 (e.g., word line contact 344 and plate line contact 346). In some aspects, dielectric 312 can be a high-k dielectric configured to increase a gate capacitance and decrease a leakage current in pillar 310.

BL 320 can be configured to address pillar 310 in DFM device 300 and be coupled to BL contact 322. BL contact 322 can be configured to act as a drain connection to pillar 310. In some aspects, BL contact 322 can be n-type (e.g., n+) and pillar 310 can be p-type (e.g., p). SL 330 can be configured to address pillar 310 in DFM device 300 and be coupled to SL contact 332. SL contact 332 can be configured to act as a source connection to pillar 310. In some aspects, SL contact 332 can be n-type (e.g., n+) and pillar 310 can be p-type (e.g., p). DFM cell 340 can be configured to address pillar 310 in DFM device 300 and act as a gate connection to pillar 310. In some aspects, different voltage combinations applied to BL 320, SL 330, and DFM cell 340 can define read, program (write), and erase operations in DFM device 300.

DFM cell 340 can include word line (WL) 342, WL contact 344, plate line (PL) 346, and PL contact 348. WL 342 can be configured to address pillar 310 in DFM device 300 and be coupled to WL contact 344. WL contact 344 can be configured to act as a first gate connection to pillar 310. WL contact 344 can surround dielectric 312 which surrounds pillar 310 thereby forming a first concentric transistor. In some aspects, WL contact 344 can include a conductive material (e.g., metal, polysilicon, tungsten, etc.). In some aspects, WL 342 can act as a top select gate connection. In some aspects, WL 342 can provide voltage to WL contact 344, thereby inducing an electric field within pillar 310, to read, program, or erase charge on pillar 310.

PL 346 can be configured to address pillar 310 in DFM device 300 and be coupled to PL contact 348. PL contact 348 can be configured to act as a second gate connection to pillar 310. PL contact 348 can surround dielectric 312 which surrounds pillar 310 thereby forming a second concentric transistor. In some aspects, PL contact 348 can include a conductive material (e.g., metal, polysilicon, tungsten, etc.). In some aspects, PL 346 can act as a traditional current-valve gate (e.g., similar to a MOSFET gate) for pillar 310 and cover a majority of a length of pillar 310. In some aspects, PL 346 can provide voltage to PL contact 348, thereby inducing an electric field within pillar 310, to read, program, or erase charge on pillar 310.

As shown in FIG. 4, charge density distribution 400 shows charge (e.g., hole) density 402 within DFM device 300 for a program state (1 state) after 100 ms at an operating temperature of 85° C. Charge density distribution 400 can include charge (e.g., hole) density 402, which can range from about $1.8 \times 10^1$ cm$^{-3}$ to about $3 \times 10^{18}$ cm$^{-3}$. The program state (1 state) represents a program (write) operation on DFM device 300, whereby different voltage combinations applied to BL 320, SL 330, WL 342, and PL 346 form charge (e.g., holes) on pillar 310 of DFM device 300. In some aspects, as shown in FIG. 4, in the 1 state, only a small portion of pillar 310 retains charge of at least $1 \times 10^{17}$ cm$^{-3}$ after 100 ms at an operating temperature of 85° C. For example, a portion of pillar 310 adjacent PL contact 346 retains charge no greater than $1 \times 10^{17}$ cm$^{-3}$.

Exemplary Retention DFM Devices

As discussed above, DRAM is a volatile memory that uses charge stored on a capacitor to represent information. DRAM stores each bit in a memory cell that includes a transistor and a capacitor (e.g., 1T1C). Charge levels greater than a certain threshold can represent a first logic level (e.g., 1 state) and charge levels less than another threshold amount can represent a second logic level (e.g., 0 state). Leakage currents and various parasitic effects limit the length of time a capacitor can hold charge. Each time data is read, it must be rewritten to ensure retention and regular data refresh cycles must be performed. DRAM retention times can be as low as 32 ms during high temperature operations (e.g., greater than 85° C.) and can require refresh rates of about 31 Hz.

Flash is a non-volatile memory that uses charge stored on a floating gate to represent information. Flash stores each bit in a memory cell that includes a transistor with a floating gate. The amount of charge on the floating gate will determine whether the transistor will conduct when a fixed set of read bias conditions are applied. Flash can retain charge for a long period of time since the floating gate is completely surrounded by insulators. Further, the act of reading the data can be performed non-destructively without loss of the information. In addition, flash can quickly erase entire blocks or pages of data simultaneously (e.g., NAND flash).

Current 1T1C DRAM is approaching a process limit. The manufacturing of 1T1C DRAM devices with small-node capacitors to retain charge is becoming more difficult due to increased current leakage, increased power consumption, degraded operating voltage margins, and decreased retention times. Further, current single transistor (1T) capacitor-free DRAM (e.g., ZRAM, TTRAM, ARAM, etc.) devices need further improvement and optimization for manufacturable integration and operation solutions. Current 1T DRAM devices have serious problems due to junction leakage and large capacitive coupling between word lines and the transistor floating body. In addition, current 1T DRAM devices have extremely narrow operational voltage margins between first and second logic levels (e.g., 1 state and 0 state).

Aspects of retention DFM apparatuses, systems, and methods as discussed below can provide a capacitor-free dynamic random-access memory device to increase retention times, decrease refresh rates, increase a floating body effect, decrease manufacturing defects, decrease leakage current, decrease junction current, decrease power consumption, increase an upper limit of charge density, dynamically adjust a length of a gate contact in the memory cell, and decrease parasitic resistance.

Figure 5A:
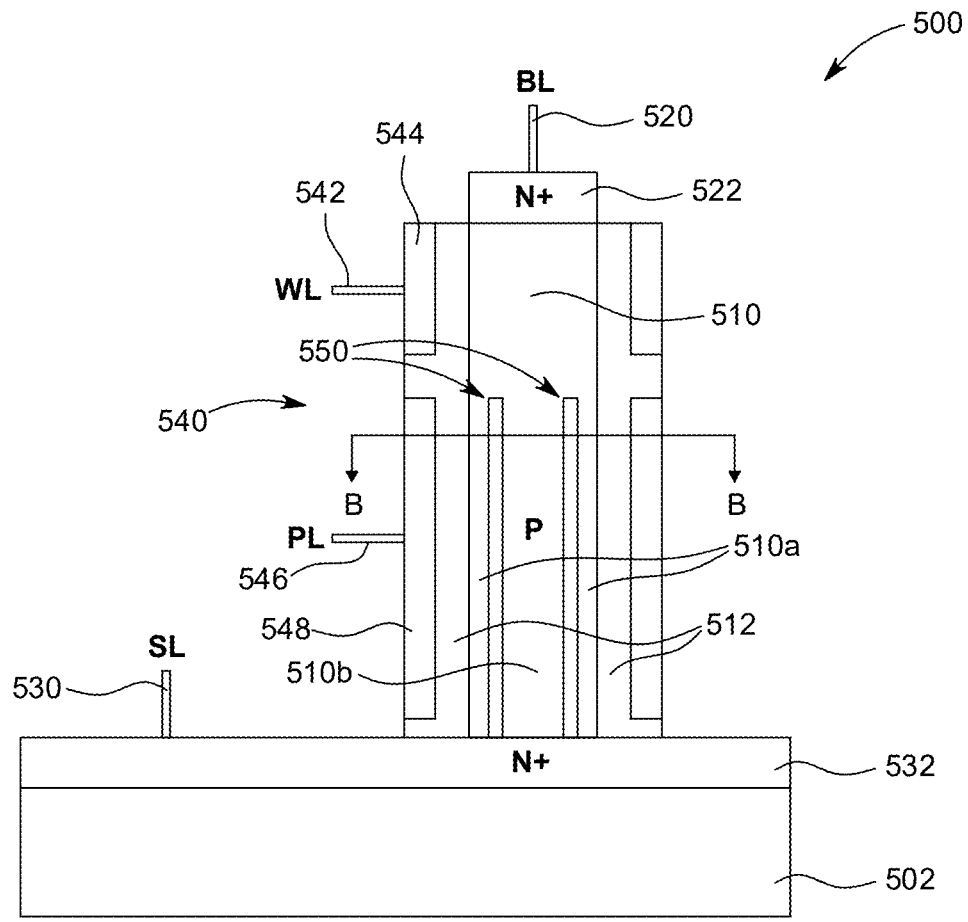
FIGS. 5A and 5B are schematic cross-sectional illustrations of a retention DFM device, according to an exemplary aspect.
Figure 5B:
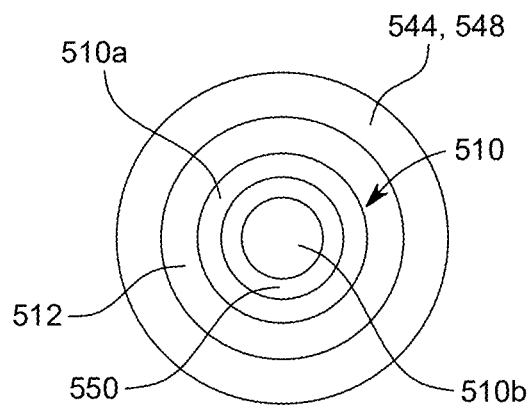
Figure 6:
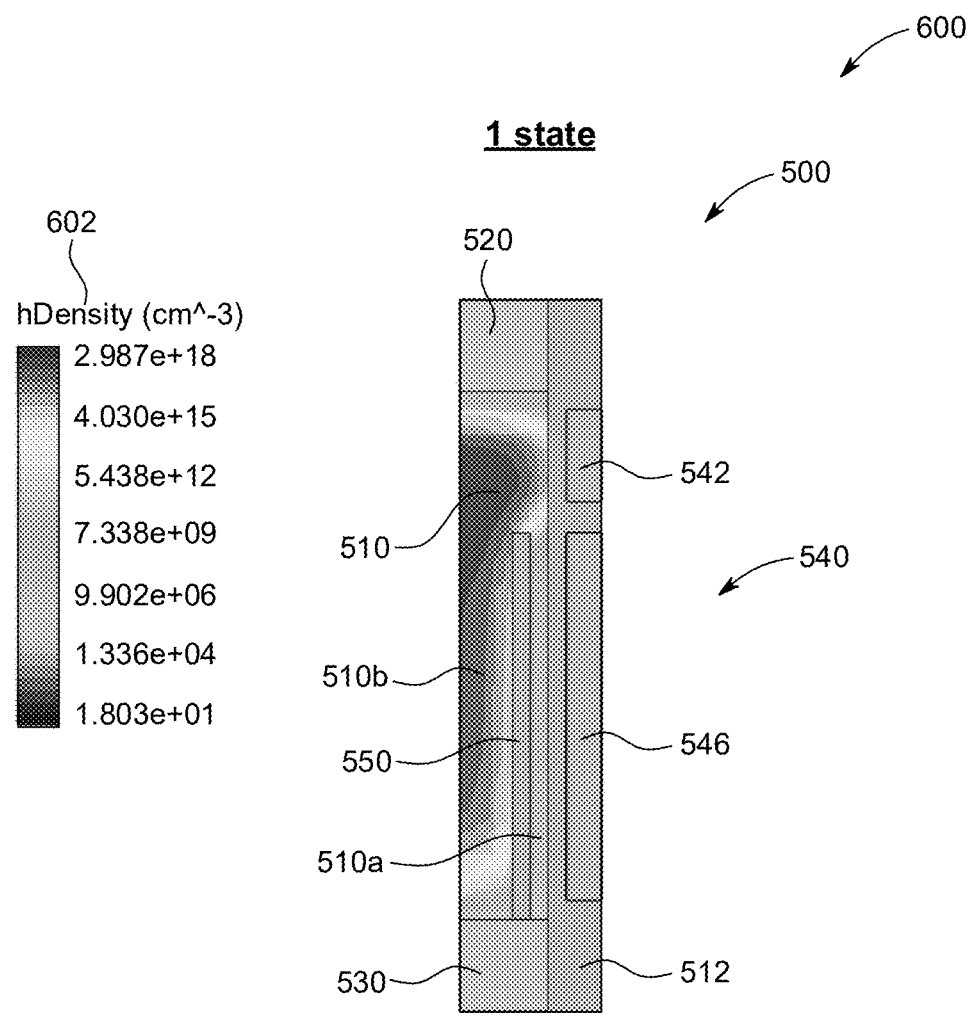
FIG. 6 is a schematic cross-sectional illustration of a charge density distribution of the retention DFM device shown in FIG. 5A for a program state, according to an exemplary aspect.

FIGS. 5A-6 illustrate retention DFM device 500, according to exemplary aspects. FIGS. 5A and 5B are schematic cross-sectional illustrations of retention DFM device 500, according to an exemplary aspect. FIG. 6 is a schematic cross-sectional illustration of charge density distribution 600 of retention DFM device 500 shown in FIG. 5A for a program state (1 state), according to an exemplary aspect.

Retention DFM device 500 can be configured to operate as a volatile capacitor-free dynamic random-access 3D memory device. Retention DFM device 500 can be further configured to isolate a channel and a body of a memory cell. Retention DFM device 500 can be further configured to increase charge retention times (e.g., greater than 100 ms at 85° C. operating temperature) and decrease refresh rates (e.g., less than 10 Hz). Retention DFM device 500 can be further configured to provide different doping concentrations in a memory cell (e.g., in a channel and a body). Retention DFM device 500 can be further configured to increase a floating body effect in a memory cell. Retention DFM device 500 can be further configured to provide different materials in a memory cell (e.g., single crystal body, alternating epitaxial layers, NPN pillar).

Retention DFM device 500 can be further configured to decrease manufacturing defects (e.g., lattice defects, vacancy defects, dislocation defects, pipeline defects, stress defects, strain defects, etc.). Retention DFM device 500 can be further configured to decrease leakage current, decrease junction current, and decrease power consumption. Retention DFM device 500 can be further configured to increase an upper limit of charge density in a body of a memory cell. Retention DFM device 500 can be further configured to dynamically adjust a length of a gate contact (e.g., plate line contact) in a memory cell. Retention DFM device 500 can be further configured to increase a distance between a gate contact (e.g., plate line contact) and a source contact (e.g., source line contact) to decrease parasitic effects (e.g., parasitic resistance, parasitic structures, etc.).

Retention DFM device 500 can be further configured to provide faster operation speeds and higher density than DRAM or other types of volatile memory. Retention DFM device 500 can be further configured to provide block refresh and block erase operations similar to flash memory functionality. Although retention DFM device 500 is shown in FIGS. 5A-6 as a stand-alone apparatus and/or system, the aspects of this disclosure can be used with other apparatuses, systems, and/or methods, such as, but not limited to, 3D memory device 100, dual gate SGT device 200, DFM device 300, retention DFM device 500', manufacturing method 700, manufacturing method 1000, flow diagram 1100 and/or flow diagram 1200.

As shown in FIG. 5A, retention DFM device 500 can include substrate 502, pillar 510, dielectric 512, bit line (BL) 520, BL contact 522, source line (SL) 530, SL contact 532, and DFM cell 540. In some aspects, retention DFM device 500 can be a vertical 3D memory device. In some aspects, retention DFM device 500 can be part of a memory array, for example, memory array 160 of 3D memory device 100 shown in FIG. 1.

Substrate 502 can be configured to support pillar 510, dielectric 512, BL contact 522, SL contact 532, and DFM cell 540. Substrate 502 can be coupled to SL contact 532. In some aspects, substrate 502 can be a p-type semiconductor (e.g., p), for example, doped silicon. In some aspects, substrate 502 can include any planar wafer material, for example, Si, Ge, SiGe, GaAs, Group IV semiconductor, Group III-V semiconductor, Group II-VI semiconductor, graphene, sapphire, and/or any other semiconductor.

Pillar 510 can be configured to store electrical charge (e.g., holes). Pillar 510 can be between BL contact 522 and SL contact 532. In some aspects, pillar 510 can include a semiconductor material, for example, Si, doped Si, Ge, SiGe, GaAs, Group IV semiconductor, Group III-V semiconductor, Group II-VI semiconductor, graphene, sapphire, and/or any other semiconductor. In some aspects, pillar 510 can be doped (e.g., p-type). In some aspects, pillar 510 can have a doping concentration of about $1\times10^{16}$ cm$^{-3}$ to about $5\times10^{18}$ cm$^{-3}$. For example, pillar 510 can have a doping concentration of about $1\times10^{18}$ cm$^{-3}$. In some aspects, pillar 510 can have a diameter of about 1 nm to about 100 nm. For example, pillar 510 can have a diameter of about 50 nm. In some aspects, pillar 510 can be monolithic. For example, pillar 510 can be a single monolithic vertical pillar. In some aspects, pillar 510 can be formed from the same material as substrate 502.

As shown in FIG. 5A, pillar 510 can include channel 510a, body 510b, and annular dielectric 550. In some aspects, pillar 510 can be radially separated (e.g., by annular dielectric 550) into channel 510a and body 510b. Channel 510a can be configured to form an inversion layer in pillar 510. Body 510b can be configured to store electrical charge (e.g., holes) in pillar 510. In some aspects, a gate voltage (e.g., electric field) applied to pillar 510, surrounded by dielectric 512, can form an inversion layer (e.g., majority carriers changed to minority carriers) in channel 510a. The formed inversion layer in channel 510a (e.g., along interface with annular dielectric 550) can thereby increase charge accumulated in body 510b due to the floating body effect.

In some aspects, channel 510a can have a radial thickness of about 1 nm to about 10 nm. For example, channel 510a can have a radial thickness of about 3 nm. In some aspects, body 510b can have a diameter of about 1 nm to about 60 nm. For example, body 510b can have a diameter of about 35 nm. In some aspects, annular dielectric 550 can be between channel 510a and body 510b to separate the different conduction regions and increase a floating body effect.

In some aspects, channel 510a and body 510b can have different doping concentrations to increase a floating body effect in DFM cell 540. For example, channel 510a can have a doping concentration of about $1 \times 10^{16}$ cm$^{-3}$ to about $1 \times 10^{17}$ cm$^{-3}$ and body 510b can have a doping concentration of about $5 \times 10^{18}$ cm$^{-3}$. In some aspects, channel 510a and body 510b can include different materials to increase a floating body effect and/or decrease manufacturing defects in DFM cell 540. For example, channel 510a can include a doped semiconductor (e.g., doped Si) and body 510b can include a monocrystalline material (e.g., monocrystalline Si and/or any other single crystal material). For example, channel 510a and body 510b can form alternating epitaxial doped layers (e.g., NPN, PNP) to further enhance the floating body effect in DFM cell 540.

Dielectric 512 can be configured to provide electrical insulation between pillar 510 and DFM cell. Dielectric 512 can surround pillar 510. In some aspects, dielectric 512 can include a dielectric material, for example, oxide, nitride, oxynitride, ceramic, glass, SOG, polymer, plastic, thermoplastic, resin, laminate, high-k dielectric, a combination thereof, and/or any other electrically insulating material. In some aspects, dielectric 312 can be a high-k dielectric configured to increase a gate capacitance and decrease a leakage current in pillar 510. In some aspects, dielectric 512 can have a radial thickness of about 1 nm to about 30 nm. For example, dielectric 512 can have a radial thickness of about 3 nm.

BL 520 can be configured to address pillar 510 in retention DFM device 500. BL 520 can be further configured to flow electrical charge through DFM cell. BL 520 can be coupled to BL contact 522. BL contact 522 can be configured to act as a drain connection to pillar 510. BL contact 522 can be coupled to DFM cell 540. In some aspects, BL contact 522 can be n-type (e.g., n+) and pillar 510 can be p-type (e.g., p). In some aspects, BL contact 522 can include a conductive material, for example, a metal, a doped semiconductor, polysilicon, tungsten, and/or any other suitable conductor.

SL 530 can be configured to address pillar 510 in retention DFM device 500. SL 530 can be further configured to flow electrical charge through DFM cell 540. SL 530 can be coupled to SL contact 532. SL contact 532 can be configured to act as a source connection to pillar 510. SL contact 532 can be coupled to DFM cell 540. In some aspects, SL contact 532 can be n-type (e.g., n+) and pillar 510 can be p-type (e.g., p). In some aspects, SL contact 532 can include a conductive material, for example, a metal, a doped semiconductor, polysilicon, tungsten, and/or any other suitable conductor. In some aspects, different voltage combinations applied to BL 520, SL 530, and DFM cell 540 can define read, program (write), and erase operations in retention DFM device 500.

DFM cell 540 can be configured to read, program, and erase electrical charge on pillar 510, for example, body 510b. DFM cell 540 can be coupled to BL contact 522 and SL contact 532. DFM cell 540 can include word line (WL) 542, WL contact 544, plate line (PL) 546, PL contact 548, and annular dielectric 550 (e.g., within pillar 510). WL 542 can be configured to address pillar 510 in retention DFM device 500. WL 542 can be further configured to address and non-destructively read electrical charge on pillar 510, for example, body 510b. In some aspects, WL 542 can act as a top select gate connection. WL 542 can be coupled to WL contact 544. WL contact 544 can be configured to act as a first gate connection to pillar 510. WL contact 544 can surround a first portion of dielectric 512 which surrounds a first portion of pillar 510 thereby forming a first concentric transistor in DFM cell 540. In some aspects, WL contact 544 can include a conductive material (e.g., metal, polysilicon, tungsten, etc.). In some aspects, WL 542 can provide voltage to WL contact 544, thereby inducing an electric field within pillar 510, to read, program, or erase charge on pillar 510. In some aspects, as shown in FIG. 5A, WL contact 544 can be between BL contact 522 and PL contact 548.

PL 546 can be configured to address pillar 510 in retention DFM device 500. PL 546 can be further configured to program (e.g., write) pillar 510, for example, body 510b. In some aspects, PL 546 can act as a traditional current-valve gate (e.g., similar to a MOSFET gate) for pillar 510 and cover a majority of a length of pillar 510. PL 546 can be coupled to PL contact 548. PL contact 548 can be configured to act as a second gate connection to pillar 510. PL contact 548 can surround a second portion of dielectric 512 which surrounds a second portion of pillar 510 thereby forming a second concentric transistor in DFM cell 540. In some aspects, PL contact 548 can include a conductive material (e.g., metal, polysilicon, tungsten, etc.). In some aspects, PL 546 can provide voltage to PL contact 548, thereby inducing an electric field within pillar 510 (e.g., body 510b), to read, program, or erase charge on pillar 510 (e.g., body 510b). In some aspects, DFM cell 540 can form a DFM device, for example, DFM device 300 shown in FIG. 3.

In some aspects, a length of PL contact 548 can be dynamically adjusted in DFM cell 540 for further control options (e.g., increasing the floating body effect, enhancing an electric field within body 510b). For example, as shown in FIG. 7N, one or more PL contacts 548 of retention DFM device 500 can be activated (e.g., voltage applied) by PL 546 to adjust a vertical length of PL contact 548 axially along channel 510a. In some aspects, a distance between PL contact 548 and SL contact 532 can be increased to decrease parasitic effects (e.g., parasitic resistance, parasitic structures, etc.) in DFM cell 540. For example, as shown in FIGS. 5A, 7A, 7C, and 7L, dielectric 512 (bottom isolation layer 712 shown in FIG. 7A) can include a region between a top end of SL contact 532 (bottom contact 730 shown in FIG. 7C) and a bottom end of PL contact 548 (conductor layer 706' shown in FIG. 7L) to further decouple and/or spatially separate PL contact 548 from SL contact 532.

Annular dielectric 550 can be configured to increase a charge retention in DFM cell 540. Annular dielectric 550 can be further configured to separate channel 510a and body 510b in pillar 510. Annular dielectric 550 can be further configured to form a capacitor within pillar 510 to increase electrical charge retention (e.g., storage) on body 510b due to, for example, the floating body effect. As shown in FIGS. 5A and 5B, annular dielectric 550 can be within a portion of pillar 510, for example, adjacent PL contact 548. Annular dielectric 550 can surround body 510b and thereby separate channel 510a from body 510b.

In some aspects, annular dielectric 550 can include a dielectric material, for example, oxide, nitride, oxynitride, ceramic, glass, SOG, polymer, plastic, thermoplastic, resin, laminate, high-k dielectric, a combination thereof, and/or any other electrically insulating material. In some aspects, annular dielectric 550 can be a high-k dielectric configured to increase a gate capacitance and decrease a leakage current in pillar 510. In some aspects, annular dielectric 550 can have a radial thickness of about 1 nm to about 30 nm. For example, annular dielectric 550 can have a radial thickness of about 3 nm. In some aspects, annular dielectric 550 can have an outer diameter of about 20 nm to about 60 nm. For example, annular dielectric 550 can have an outer diameter of about 35 nm.

In some aspects, annular dielectric 550 can increase a retention time and decrease a refresh rate in pillar 510 by enhancing the amount of charge density (e.g., increased floating body effect) and/or induced electrical field within body 510b. For example, as shown in FIG. 6, annular dielectric 550 can increase the retention time in body 510b to at least 100 ms during high temperature operation (e.g., greater than 85° C.). For example, annular dielectric 550 can decrease the refresh rate to no greater than 10 Hz during high temperature operation (e.g., greater than 85° C.). In some aspects, annular dielectric 550 can increase an upper limit of charge density in body 510b by isolating channel 510a from body 510b. For example, as shown in FIG. 6, annular dielectric 550 can increase the charge density of body 510b to at least $1 \times 10^{18}$ $cm^{-3}$.

In some aspects, as shown in FIG. 5A, annular dielectric 550 can include an annulus extending axially along pillar 510 from a top end of PL contact 548 to SL contact 532. In some aspects, annular dielectric 550 can decrease a leakage current in DFM cell 540 by isolating channel 510a from body 510b. For example, annular dielectric can decrease the leakage current to no greater than about 1 pA.

As shown in FIG. 6, charge density distribution 600 shows charge (e.g., hole) density 602 within retention DFM device 500 for a program state (1 state) after 100 ms at an operating temperature of 85° C. In some aspects, as shown in FIG. 6, in the program state (1 state), pillar 510 of DFM cell 540 can include electrical charge (e.g., holes). Charge density distribution 600 can include charge (e.g., hole) density 602, which can range from about $1.8 \times 10^1$ $cm^{-3}$ to about $3 \times 10^{18}$ $cm^{-3}$. The program state (1 state) represents a program (write) operation on retention DFM device 500, whereby different voltage combinations applied to BL 520, SL 530, WL 542, and PL 546 form charge (e.g., holes) on pillar 510 of retention DFM device 500. In some aspects, as shown in FIG. 6, in the program state (1 state), a majority of pillar 510 retains charge of at least $1 \times 10^{17}$ $cm^{-3}$ after 100 ms at an operating temperature of 85° C. For example, body 510b adjacent PL contact 548 retains charge of at least $1 \times 10^{18}$ $cm^{-3}$.

Figure 8A:
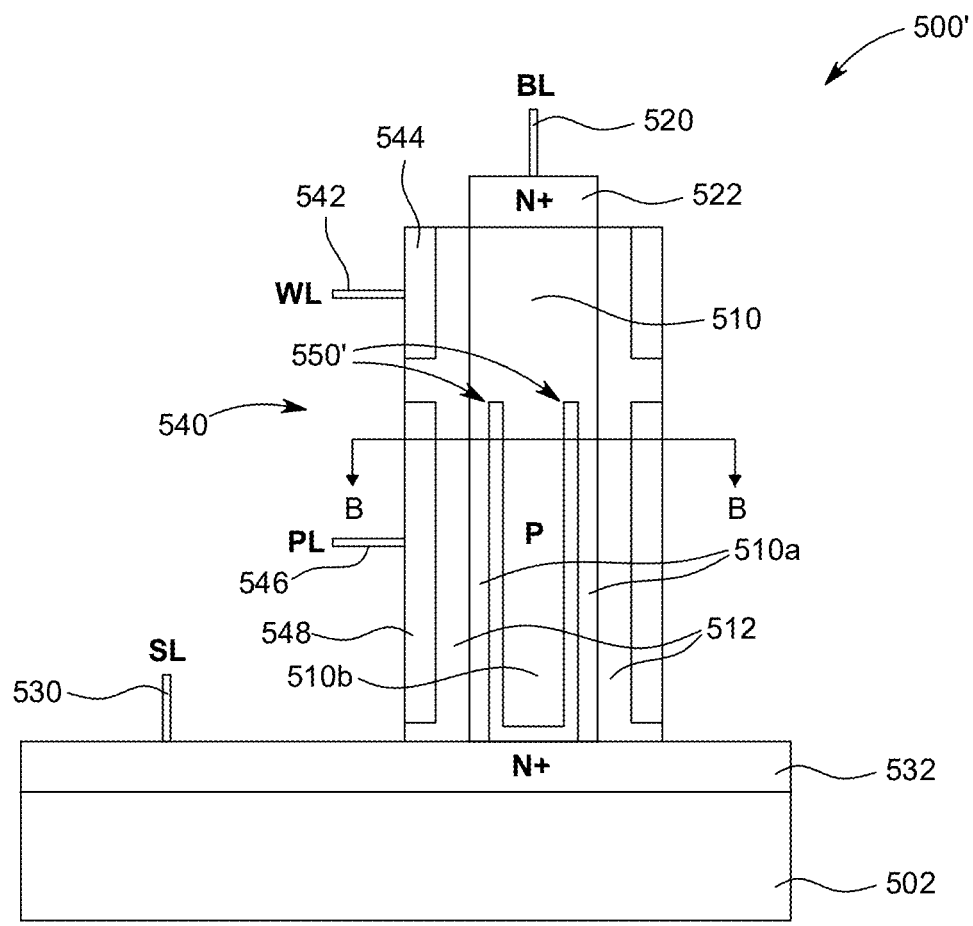
FIGS. 8A and 8B are schematic cross-sectional illustrations of a retention DFM device, according to an exemplary aspect.
Figure 8B:
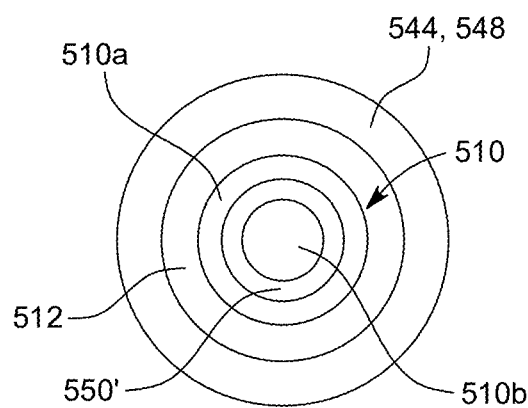
Figure 9:
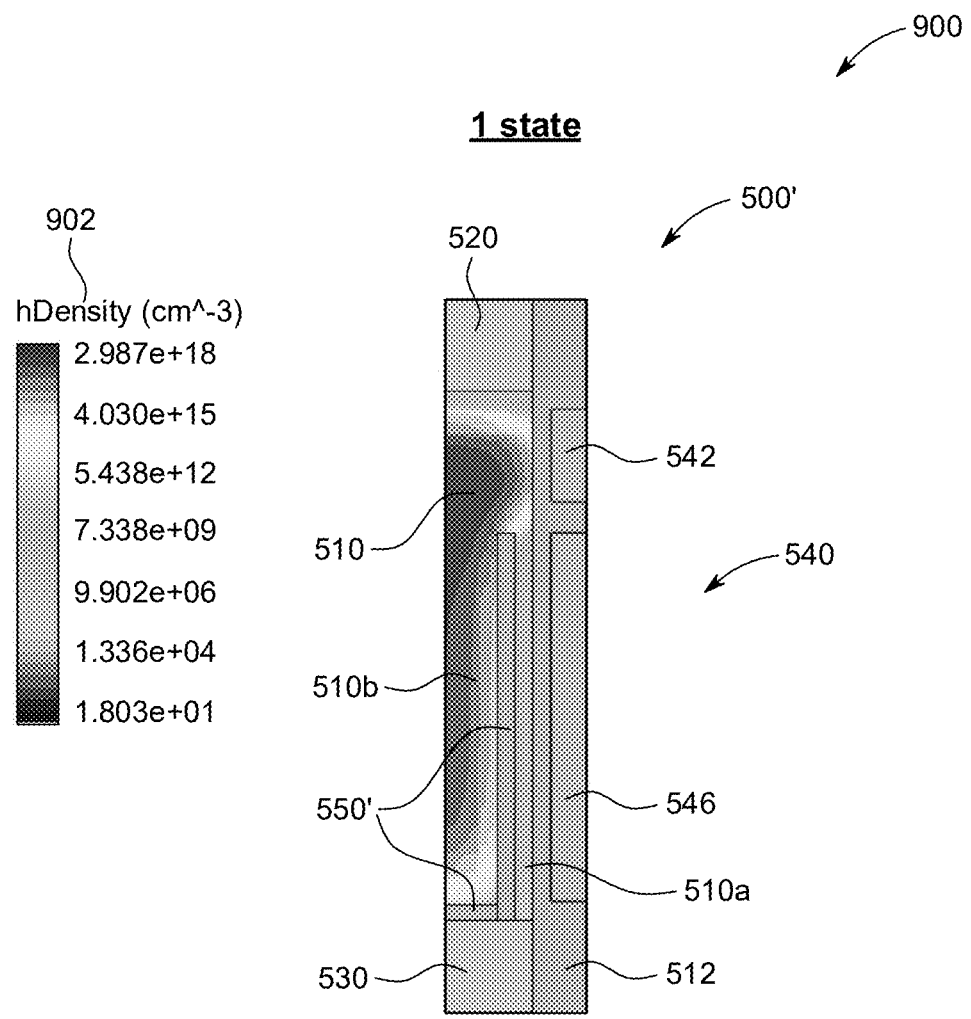
FIG. 9 is a schematic cross-sectional illustration of a charge density distribution of the retention DFM device shown in FIG. 8A for a program state, according to an exemplary aspect.

FIGS. 8A-9 illustrate retention DFM device 500', according to exemplary aspects. FIGS. 8A and 8B are schematic cross-sectional illustrations of retention DFM device 500', according to an exemplary aspect. FIG. 9 is a schematic cross-sectional illustration of charge density distribution 900 of retention DFM device 500' shown in FIG. 8A for a program state (1 state), according to an exemplary aspect. Although retention DFM device 500' is shown in FIGS. 8A-9 as a stand-alone apparatus and/or system, the aspects of this disclosure can be used with other apparatuses, systems, and/or methods, such as, but not limited to, 3D memory device 100, dual gate SGT device 200, DFM device 300, retention DFM device 500, manufacturing method 700, manufacturing method 1000, flow diagram 1100 and/or flow diagram 1200.

The aspects of retention DFM device 500 shown in FIG. 5A, for example, and the aspects of retention DFM device 500' shown in FIG. 8A may be similar. Similar reference numbers are used to indicate features of the aspects of retention DFM device 500 shown in FIG. 5A and the similar features of the aspects of retention DFM device 500' shown in FIG. 8A. Retention DFM device 500' includes U-shaped dielectric 550' rather than annular dielectric 550 of retention DFM device 500 shown in FIG. 5A.

As shown in FIG. 8A, retention DFM device 500' can include substrate 502, pillar 510, dielectric 512, BL 520, BL contact 522, SL 530, SL contact 532, and DFM cell 540. DFM cell 540 of retention DFM device 500' can include WL 542, WL contact 544, PL 546, PL contact 548, and U-shaped dielectric 550' (e.g., within pillar 510). In some aspects, retention DFM device 500' can be a vertical 3D memory device. In some aspects, retention DFM device 500' can be part of a memory array, for example, memory array 160 of 3D memory device 100 shown in FIG. 1.

Pillar 510 of retention DFM device 500' can include channel 510a, body 510b, and U-shaped dielectric 550'. In some aspects, pillar 510 can be radially separated (e.g., by U-shaped dielectric 550') into channel 510a and body 510b. Further, body 510b can be separated from SL contact 532 by a bottom end of U-shaped dielectric 550'. Channel 510a can be configured to form an inversion layer in pillar 510. Body 510b can be configured to store electrical charge (e.g., holes) in pillar 510. In some aspects, a gate voltage (e.g., electric field) applied to pillar 510, surrounded by dielectric 512, can form an inversion layer (e.g., majority carriers changed to minority carriers) in channel 510a. The formed inversion layer in channel 510a (e.g., along interface with U-shaped dielectric 550') can thereby increase charge accumulated in body 510b due to the floating body effect.

U-shaped dielectric 550' can be configured to increase a charge retention in DFM cell 540. U-shaped dielectric 550' can be further configured to separate channel 510a and body 510b in pillar 510. U-shaped dielectric 550' can be further configured to separate body 510b and SL contact 532. U-shaped dielectric 550' can be further configured to form a capacitor within pillar 510 to increase electrical charge retention (e.g., storage) on body 510b due to, for example, the floating body effect. As shown in FIGS. 8A and 8B, U-shaped dielectric 550' can be within a portion of pillar 510, for example, adjacent PL contact 548. U-shaped dielectric 550' can surround body 510b and thereby separate channel 510a from body 510b.

In some aspects, U-shaped dielectric 550' can include a dielectric material, for example, oxide, nitride, oxynitride, ceramic, glass, SOG, polymer, plastic, thermoplastic, resin, laminate, high-k dielectric, a combination thereof, and/or any other electrically insulating material. In some aspects, U-shaped dielectric 550' can be a high-k dielectric configured to increase a gate capacitance and decrease a leakage current in pillar 510. In some aspects, U-shaped dielectric 550' can have a radial thickness of about 1 nm to about 30 nm. For example, U-shaped dielectric 550' can have a radial thickness of about 3 nm. In some aspects, U-shaped dielectric 550' can have an outer diameter of about 20 nm to about 60 nm. For example, U-shaped dielectric 550' can have an outer diameter of about 35 nm.

In some aspects, U-shaped dielectric 550' can increase a retention time and decrease a refresh rate in pillar 510 by enhancing the amount of charge density (e.g., increased floating body effect) and/or induced electrical field within body 510b. For example, as shown in FIG. 9, U-shaped dielectric 550' can increase the retention time in body 510b to at least 100 ms during high temperature operation (e.g., greater than 85° C.). For example, U-shaped dielectric 550' can decrease the refresh rate to no greater than 10 Hz during high temperature operation (e.g., greater than 85° C.). In some aspects, U-shaped dielectric 550' can increase an upper limit of charge density in body 510b by isolating channel 510a from body 510b. For example, as shown in FIG. 9, U-shaped dielectric 550' can increase the charge density of body 510b to at least $1 \times 10^{18}$ cm$^{-3}$.

In some aspects, as shown in FIG. 8A, U-shaped dielectric 550' can include an annulus extending axially along pillar 510 from a top end of PL contact 548 to a bottom end of PL contact 548 and a solid disc connected to the annulus (e.g., U-shape) and connected to SL contact 532. In some aspects, U-shaped dielectric 550' can decrease a leakage current in DFM cell 540 by isolating channel 510a from body 510b. For example, U-shaped dielectric 550' can decrease the leakage current to no greater than about 1 pA. In some aspects, U-shaped dielectric 550' can decrease a junction current in DFM cell 540 by isolating body 510b from SL contact 532. For example, U-shaped dielectric 550' can decrease the junction current to no greater than about 10 pA. In some aspects, U-shaped dielectric 550' can increase an upper limit of charge density in body 510b by isolating body 510b from SL contact 532. For example, the charge density in body 510b can be at least $1 \times 10^{18}$ cm$^{-3}$.

As shown in FIG. 9, charge density distribution 900 shows charge (e.g., hole) density 902 within retention DFM device 500' for a program state (1 state) after 100 ms at an operating temperature of 85° C. In some aspects, as shown in FIG. 9, in the program state (1 state), pillar 510 of DFM cell 540 can include electrical charge (e.g., holes). Charge density distribution 900 can include charge (e.g., hole) density 902, which can range from about $1.8 \times 10^1$ cm$^{-3}$ to about $3 \times 10^{18}$ cm$^{-3}$. The program state (1 state) represents a program (write) operation on retention DFM device 500', whereby different voltage combinations applied to BL 520, SL 530, WL 542, and PL 546 form charge (e.g., holes) on pillar 510 of retention DFM device 500'. In some aspects, as shown in FIG. 9, in the program state (1 state), a majority of pillar 510 retains charge of at least $1 \times 10^{17}$ cm$^{-3}$ after 100 ms at an operating temperature of 85° C. For example, body 510b adjacent PL contact 548 retains charge of at least $1 \times 10^{18}$ cm$^{-3}$.

Exemplary Manufacturing Methods

Figure 7A:
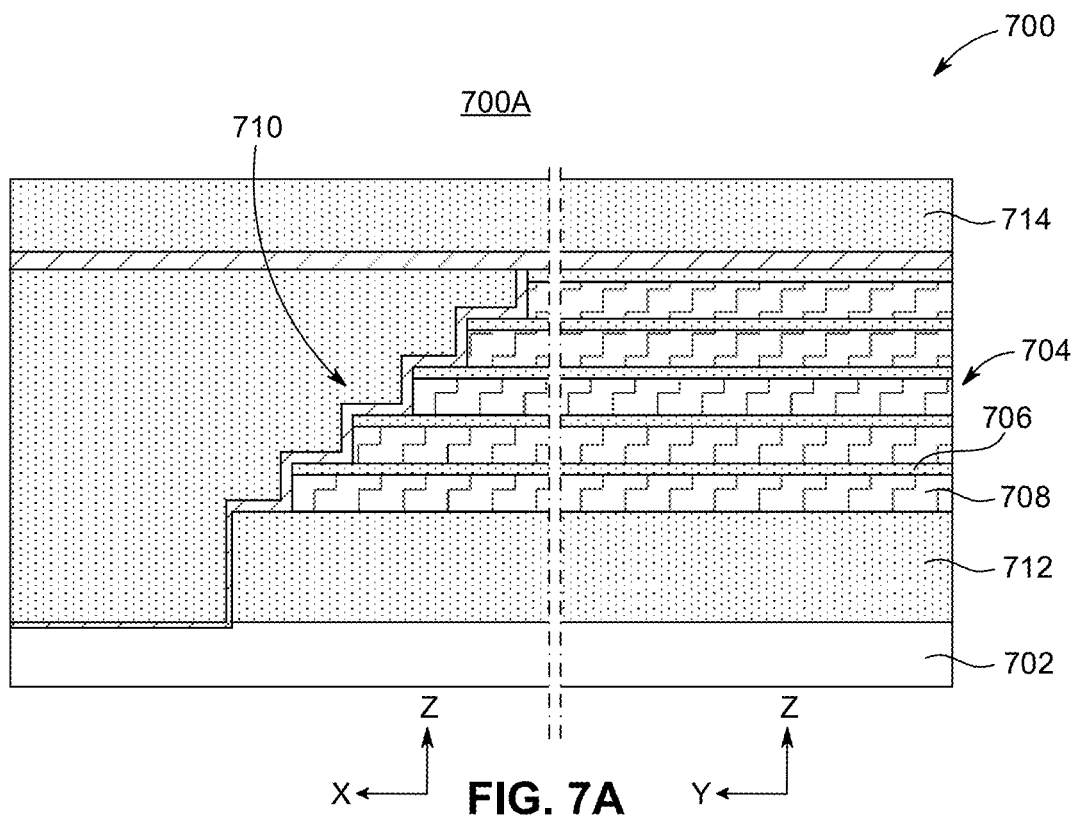
FIGS. 7A through 7N illustrate a manufacturing method for forming the retention DFM device shown in FIG. 5A, according to exemplary aspects.
Figure 7B:
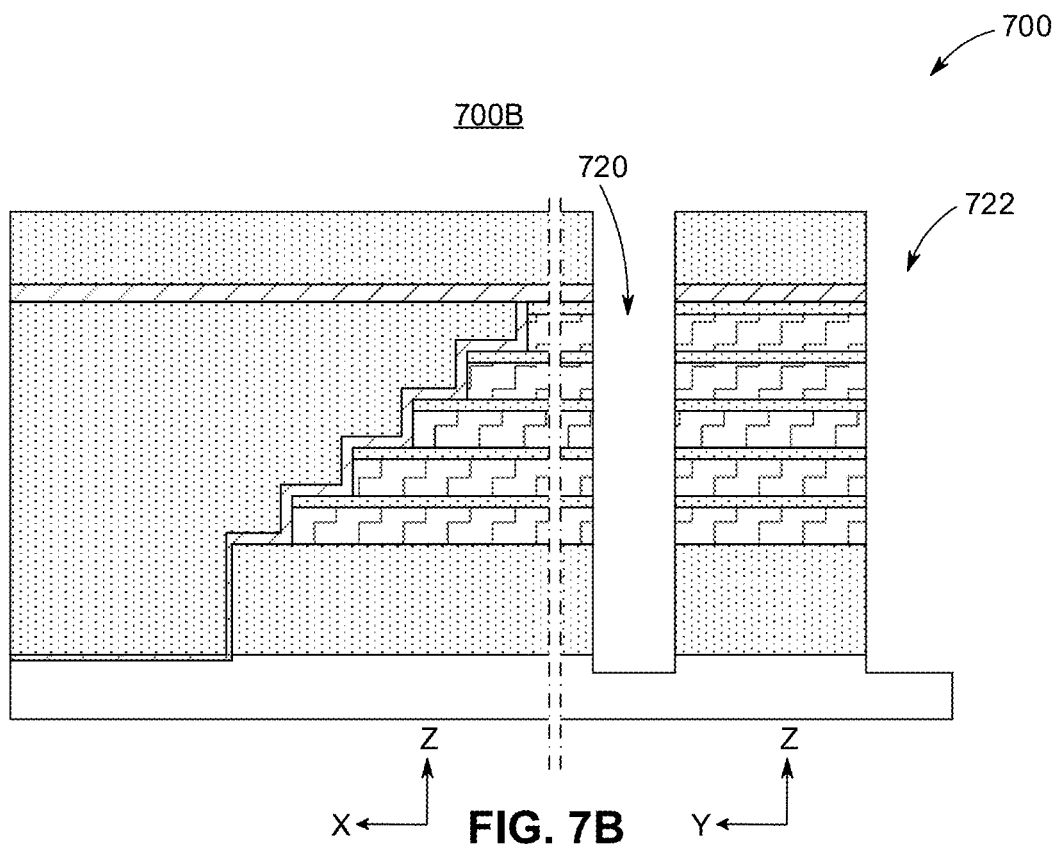
Figure 7C:
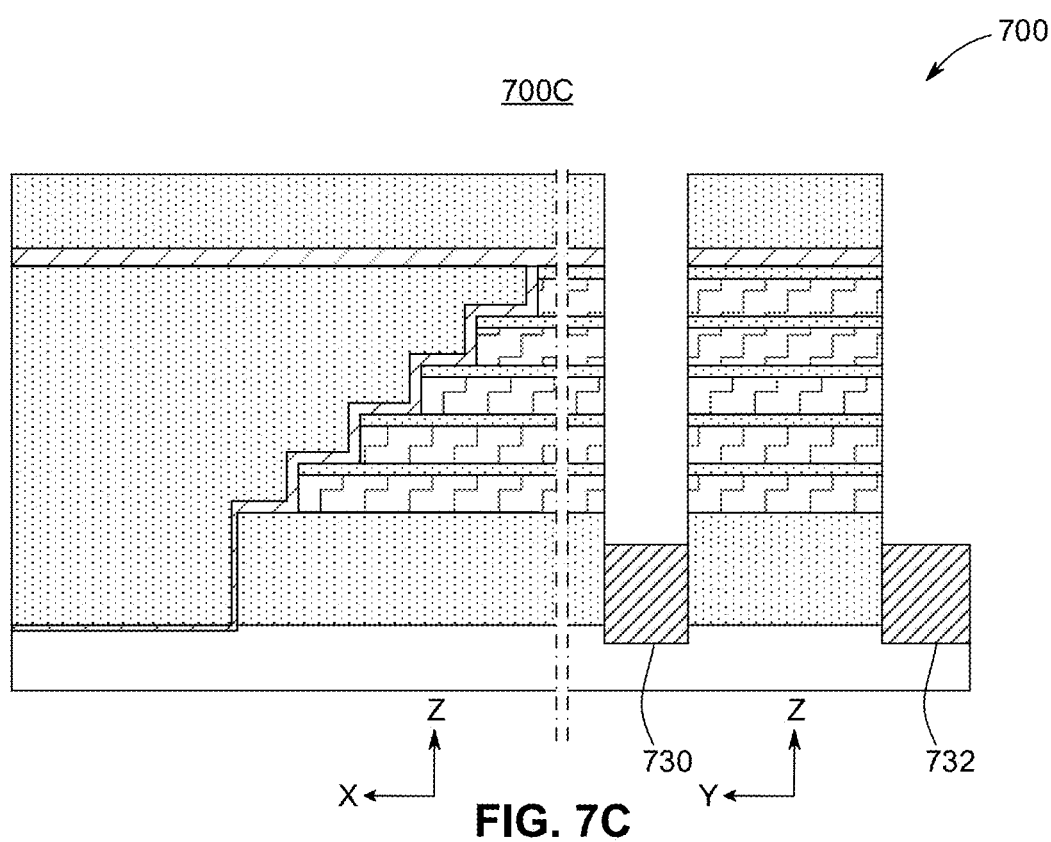
Figure 7D:
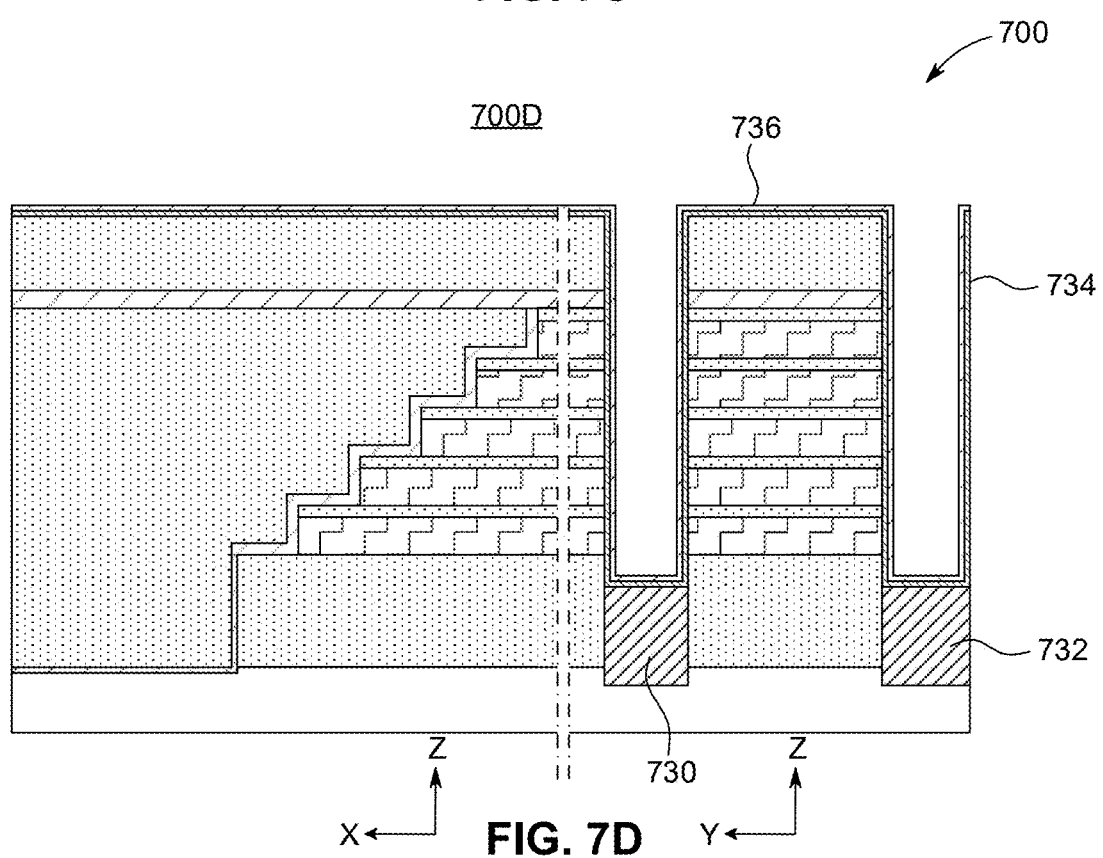
Figure 7E:
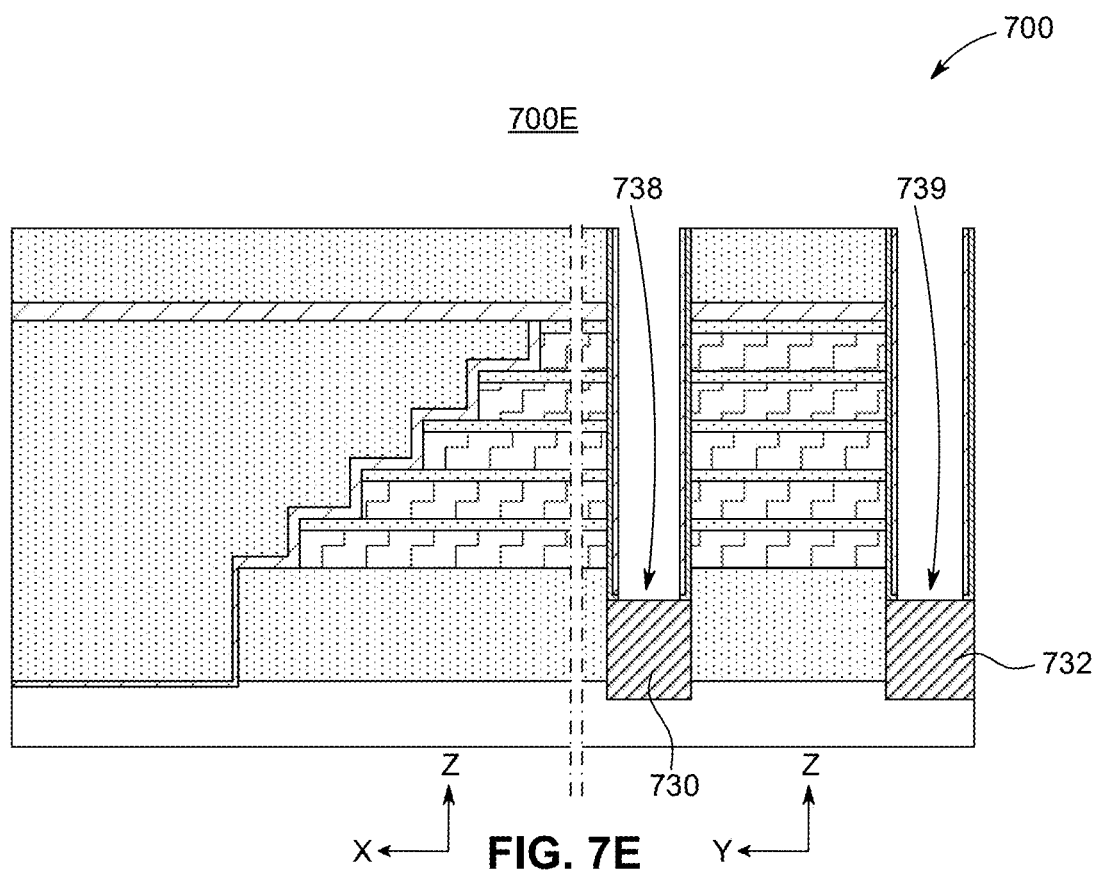
Figure 7F:
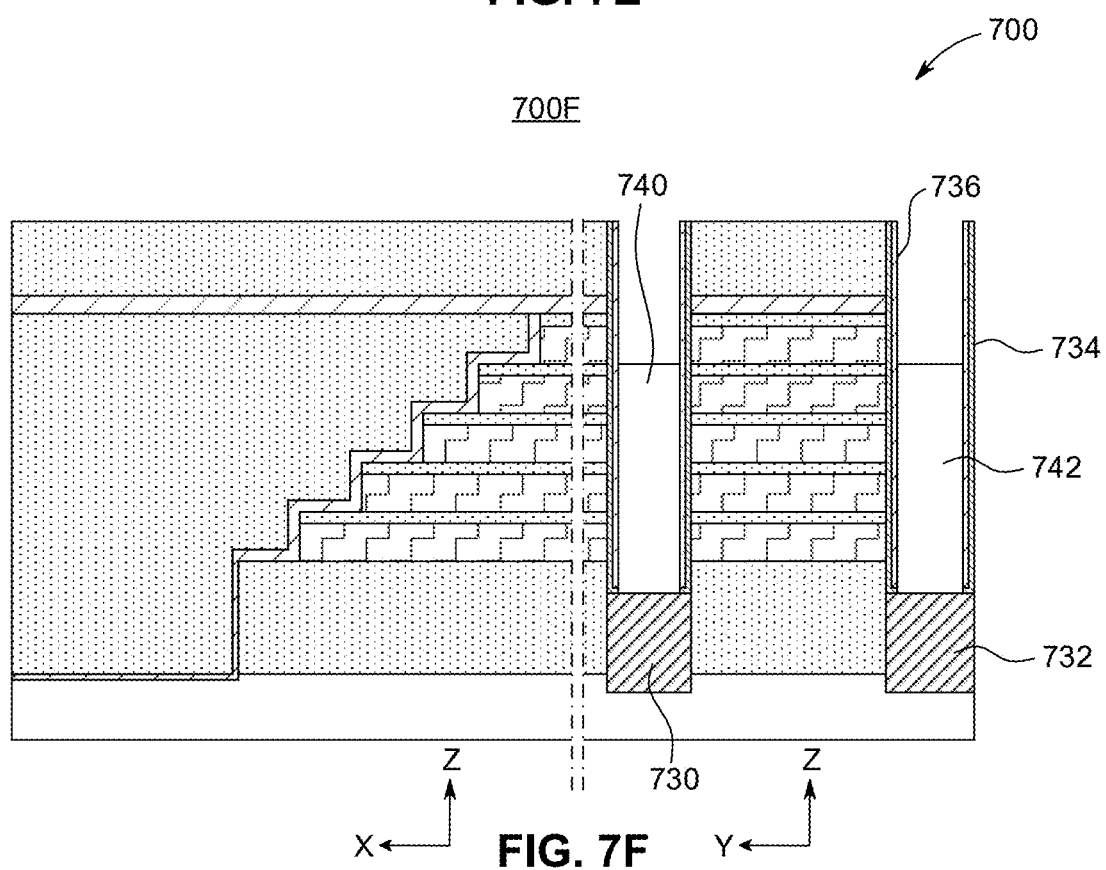
Figure 7G:
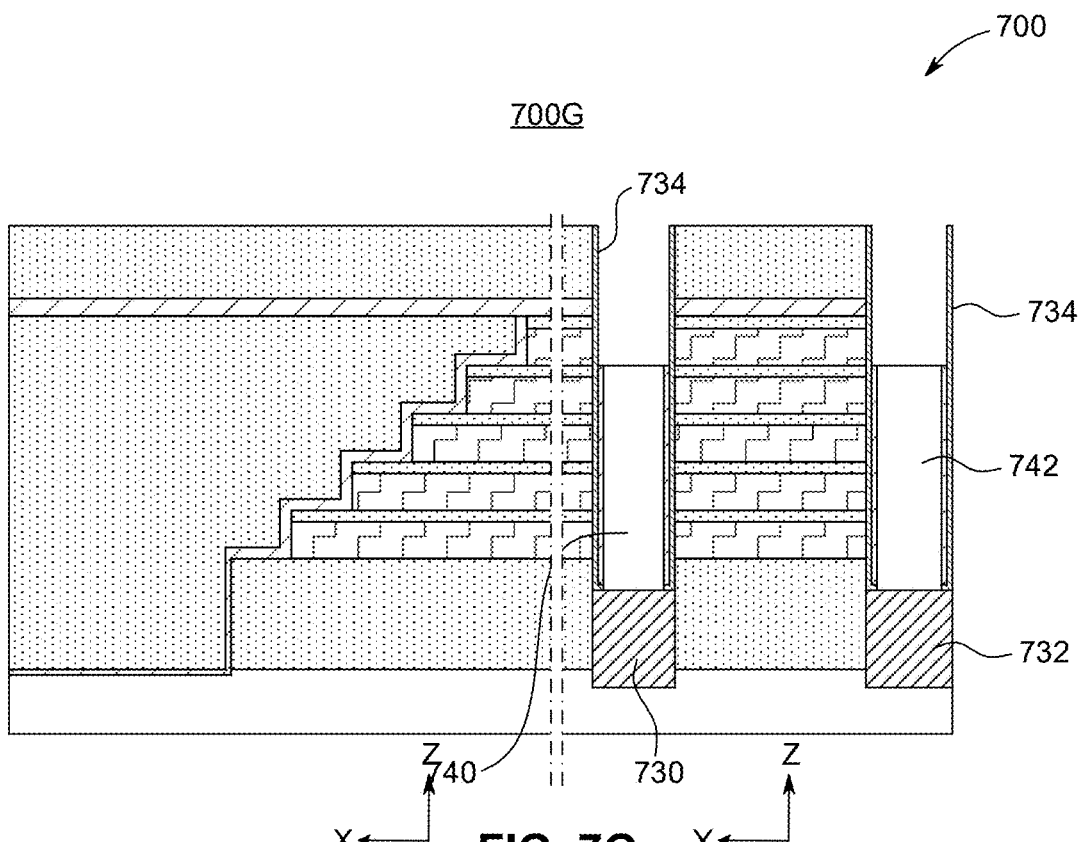
Figure 7H:
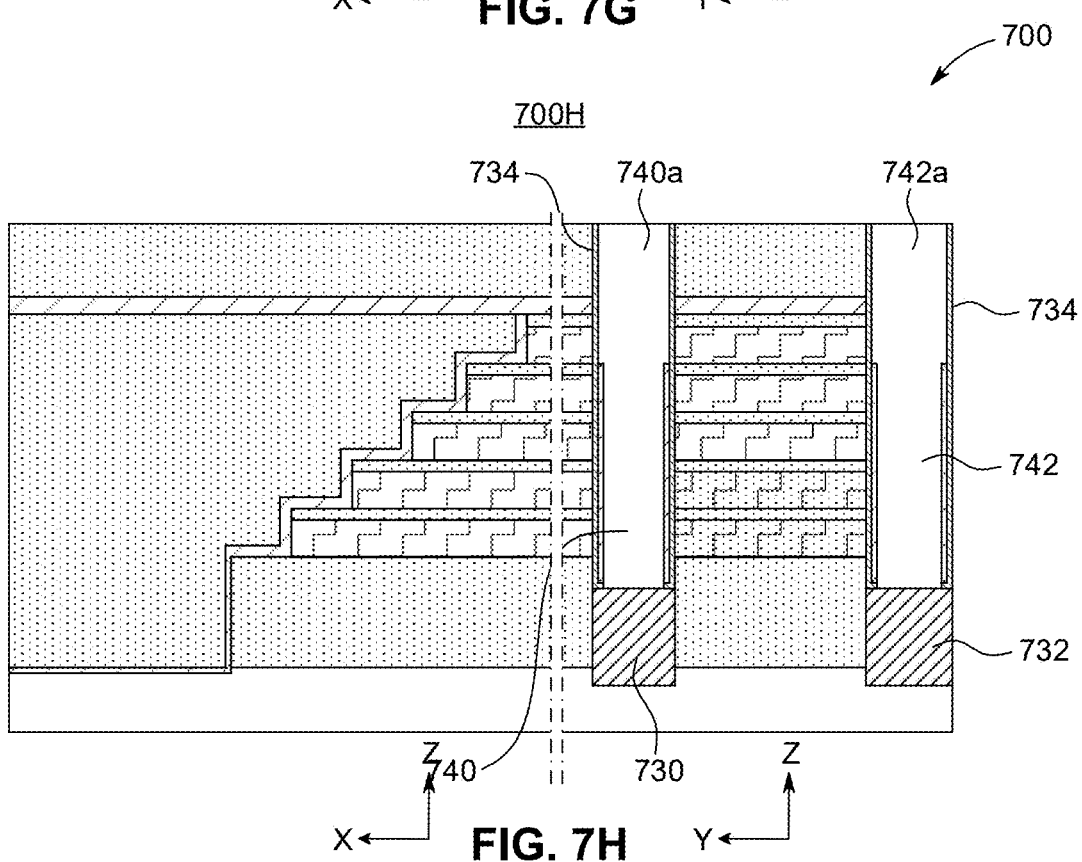
Figure 7I:
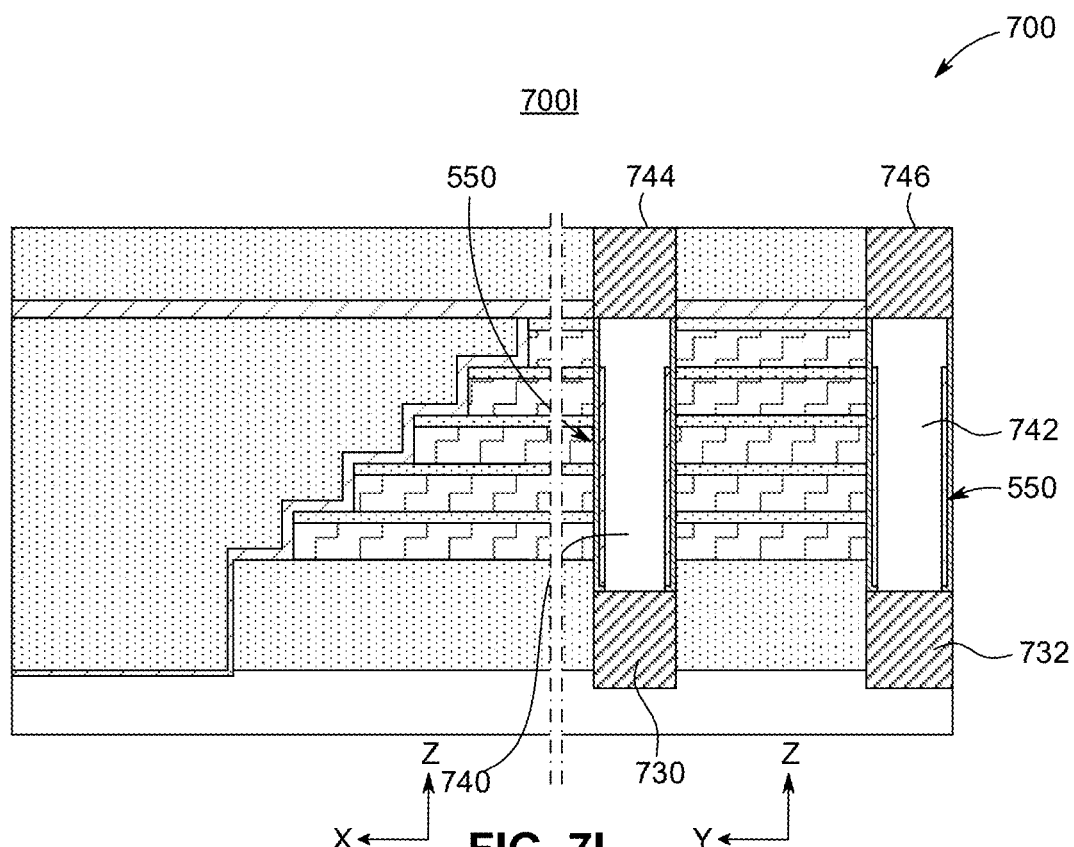
Figure 7J:
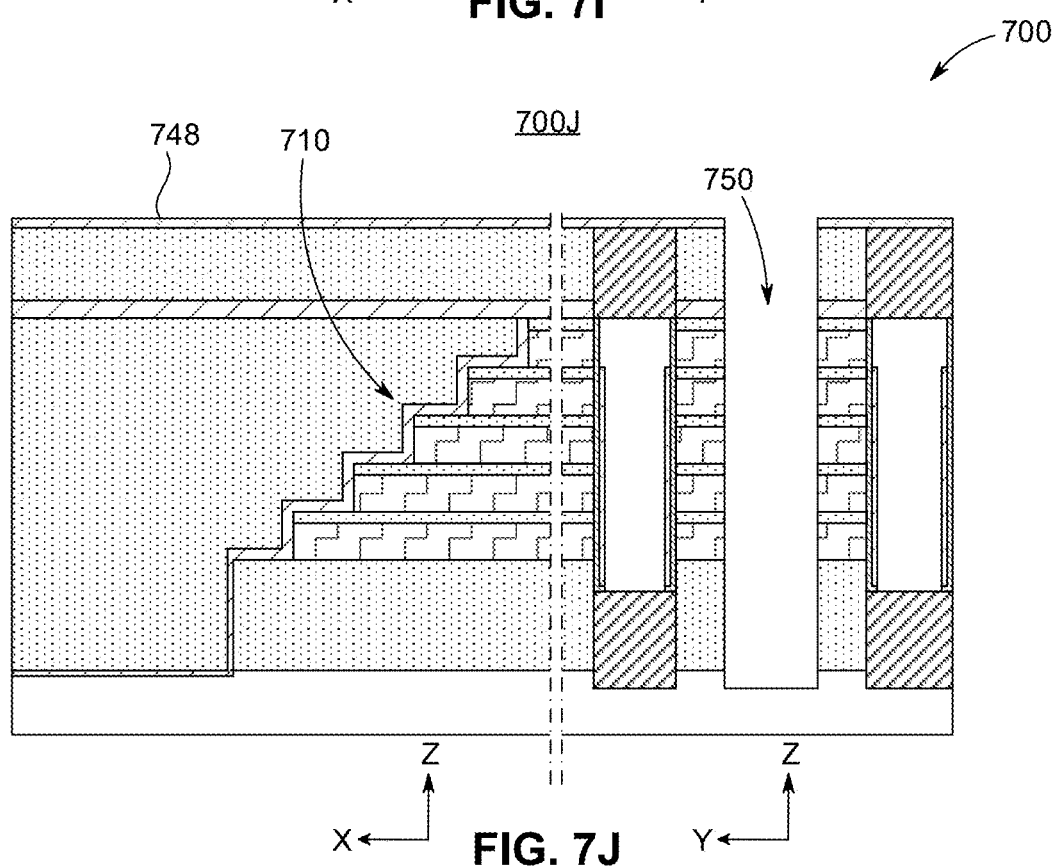
Figure 7K:
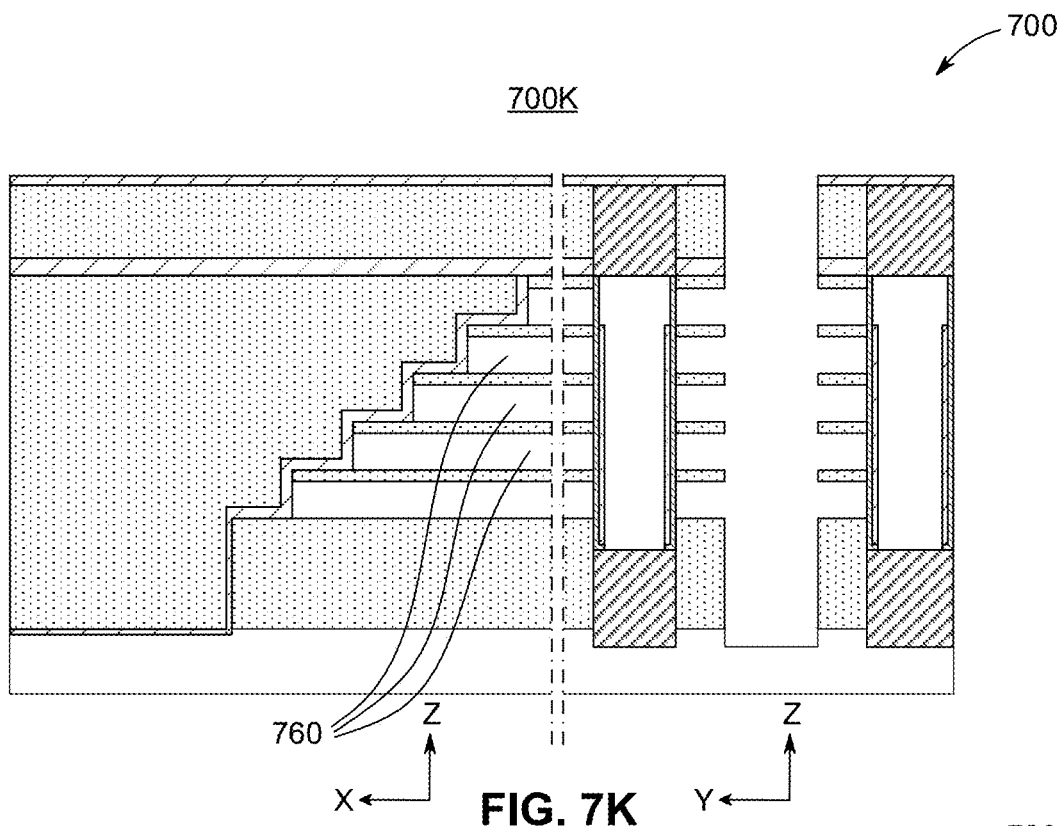
Figure 7L:
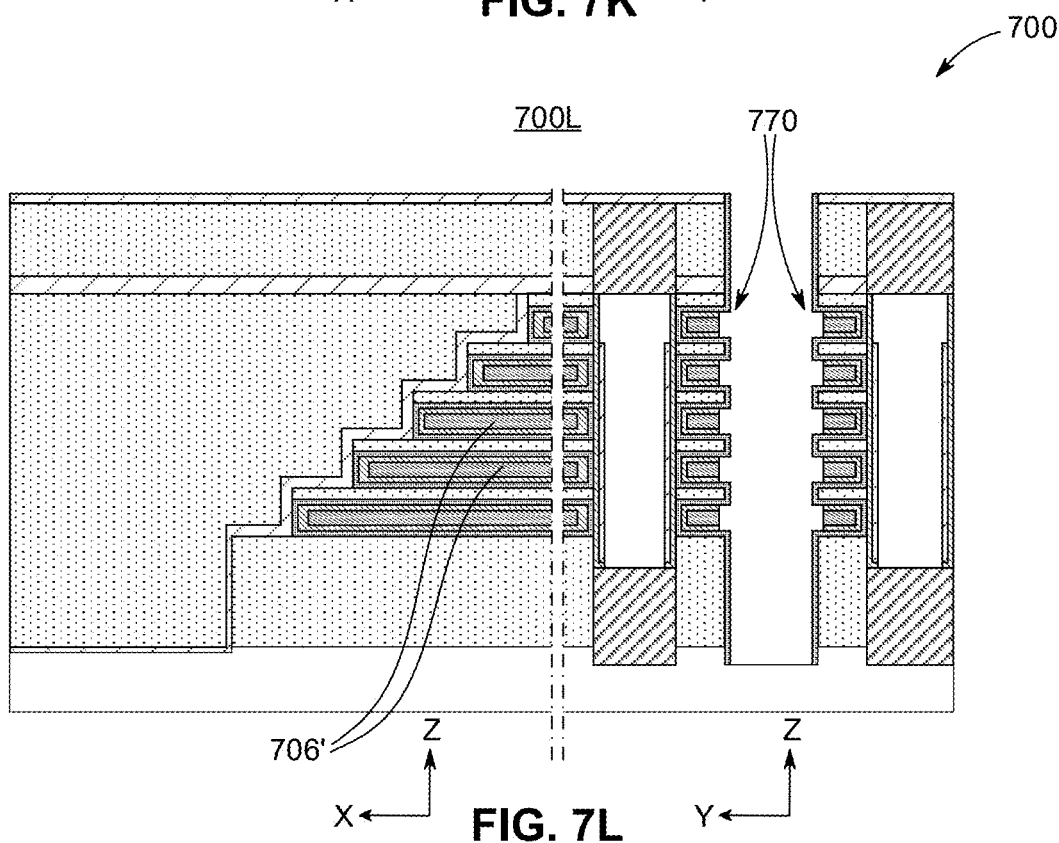
Figure 7M:
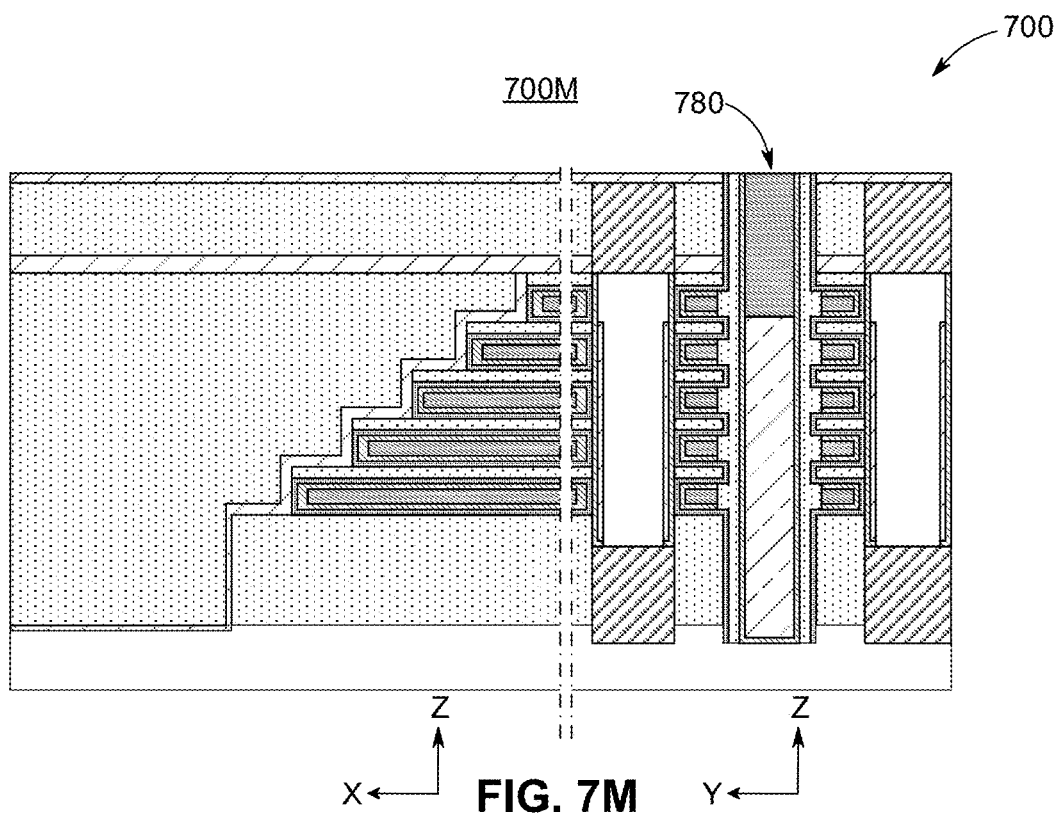
Figure 7N:
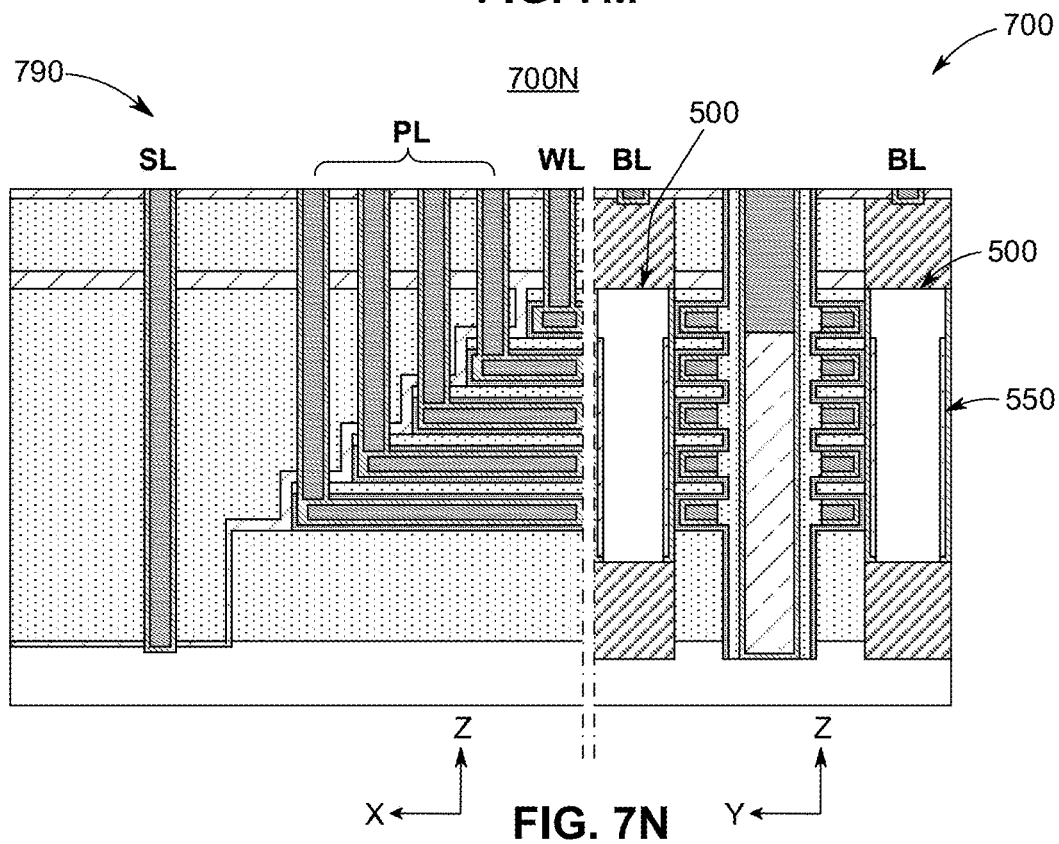

FIGS. 7A through 7N illustrate manufacturing method 700 for forming retention DFM device 500 shown in FIG. 5A, according to exemplary aspects. It is to be appreciated that not all steps in FIGS. 7A through 7N are needed to perform the disclosure provided herein. Further, some of the steps may be performed simultaneously, sequentially, and/or in a different order than shown in FIGS. 7A through 7N. Manufacturing method 700 shall be described with reference to FIGS. 7A through 7N. However, manufacturing method 700 is not limited to those example aspects.

In step 700A, as shown in the example of FIG. 7A, stack 704 with staircase structure 710 including first dielectric layer 706 (e.g., silicon oxide), second dielectric layer 708 (e.g., silicon nitride), bottom isolation layer 712, and top isolation layer 714 are formed as an alternating dielectric stack atop substrate 702.

In step 700B, as shown in the example of FIG. 7B, first channel trench 720 and second channel trench 722 are formed in the alternating dielectric stack (e.g., stack 704). In some aspects, first and second channel trenches 720, 722 can be formed by etching in alternating dielectric stack, for example, anisotropic etching.

In step 700C, as shown in the example of FIG. 7C, first bottom contact 730 and second bottom contact 732 are formed in first and second channel trenches 720, 722, respectively. In some aspects, forming first and second bottom contacts 730, 732 can include epitaxially growing first and second bottom contacts 730, 732, for example, by selective epitaxial growth (SEG).

In step 700D, as shown in the example of FIG. 7D, channel 734 is formed in first and second channel trenches 720, 722 atop first and second bottom contacts 730, 732, respectively. Further, annular dielectric 736 is formed in first and second channel trenches 720, 722 atop channel 734.

In some aspects, channel 734 can include a semiconductor material, for example, Si, doped Si, Ge, SiGe, GaAs, Group IV semiconductor, Group III-V semiconductor, Group II-VI semiconductor, graphene, sapphire, and/or any other semiconductor. In some aspects, channel 734 can include a monocrystalline material (e.g., monocrystalline Si and/or any other single crystal material). In some aspects, channel 734 can be doped (e.g., p-type). In some aspects, channel 734 can have a doping concentration of about $1 \times 10^{16}$ cm$^{-3}$ to about $5 \times 10^{18}$ cm$^{-3}$. In some aspects, channel 734 can have a radial thickness of about 1 nm to about 10 nm. For example, channel 734 can have a radial thickness of about 3 nm.

In some aspects, annular dielectric 736 can include a dielectric material, for example, oxide, nitride, oxynitride, ceramic, glass, SOG, polymer, plastic, thermoplastic, resin, laminate, high-k dielectric, a combination thereof, and/or any other electrically insulating material. For example, annular dielectric 736 can be a high-k dielectric. In some aspects, annular dielectric 736 can have a radial thickness of about 1 nm to about 30 nm. For example, annular dielectric 736 can have a radial thickness of about 3 nm.

In step 700E, as shown in the example of FIG. 7E, first dielectric trench 738 and second dielectric trench 739 are formed in annular dielectric 736 and channel 734. In some aspects, first and second dielectric trenches 738, 739 can be formed by etching a central bottom portion of annular dielectric 736 and channel 734 to expose first and second bottom contacts 730, 732, for example, anisotropic etching.

In step 700F, as shown in the example of FIG. 7F, first body 740 and second body 742 are formed atop first and second bottom contacts 730, 732, respectively, within annular dielectric 736. In some aspects, forming first and second bodies 740, 742 can include epitaxially growing first and second bodies 740, 742 atop first and second bottom contacts 730, 732 within annular dielectric 736, for example, by SEG.

In step 700G, as shown in the example of FIG. 7G, upper portions of annular dielectric 736 in first and second channel trenches 720, 722 above first and second bodies 740, 742 are removed to expose channel 734. In some aspects, upper portions of annular dielectric 736 can be removed by etching, for example, isotropic etching.

In step 700H, as shown in the example of FIG. 7H, first additional body 740a and second additional body 742a are formed atop first and second bodies 740, 742, respectively, within upper portions of channel 734 in first and second channel trenches 720, 722. In some aspects, forming first and second additional bodies 740a, 742a can include epitaxially growing first and second additional bodies 740a, 742a atop first and second bodies 740, 742, for example, by SEG.

In step 700I, as shown in the example of FIG. 7I, first top contact 744 and second top contact 746 are formed atop first and second additional bodies 740a, 742a, respectively. In some aspects, forming first and second top contacts 744, 746 can include doping upper portions of first and second additional bodies 740a, 742a to form first and second top contacts 744, 746, for example, by ion implanting.

In some aspects, channel 734, annular dielectric 736, first and second bodies 740, 742, and first and second additional bodies 740a, 742a can form a DFM cell, for example, DFM cell 540 shown in FIG. 5A. In some aspects, channel 734, first and second bodies 740, 742, and first and second additional bodies 740a, 742a can form first and second pillars, for example, pillar 510 shown in FIG. 5A. In some aspects, annular dielectric 736 can form an annular dielectric to increase charge retention in a DFM cell, for example, annular dielectric 550 of DFM cell 540 shown in FIG. 5A.

In step 700J, as shown in the example of FIG. 7J, gate line trench 750 is formed in the alternating dielectric stack (e.g., stack 704). FIG. 7J shows a cross-sectional view of gate line trench 750 along the YZ-plane and a separate (orthogonal) cross-sectional view of staircase structure 710 along the XZ-plane. Further, capping layer 748 can be formed (e.g., deposited) atop top isolation layer 714 to electrically isolate first and second top contacts 744, 746.

In step 700K, as shown in the example of FIG. 7K, second dielectric layer 708 (e.g., silicon nitride) of stack 704 is removed to form dielectric layer void 760. In some aspects, second dielectric layer 708 can be removed by etching from a lateral edge of stack 704, for example, isotropic etching.

In step 700L, as shown in the example of FIGS. 7K and 7L, high-k metal gate (HKMG) stack 770 is formed with conductive layers 706' in dielectric layer void 760.

In step 700M, as shown in the example of FIGS. 7J and 7M, gate line slit (GLS) 780 is formed in gate line trench 750.

In step 700N, as shown in the example of FIGS. 5A, 7I, and 7N, interconnects 790 are formed to first and second top contacts 744, 746 (e.g., BL 520 shown in FIG. 5A), first and second pillars (e.g., pillar 510 and DFM cell 540 shown in FIG. 5A), and first and second bottom contacts 730, 732 (e.g., SL 530 shown in FIG. 5A), respectively, to form one or more retention DFM devices 500 shown in FIG. 5A. In some aspects, manufacturing method 700 can include forming a DFM device, for example, retention DFM device 500 shown in FIG. 5A. In some aspects, manufacturing method 700 can include forming a NAND DFM device.

Figure 10A:
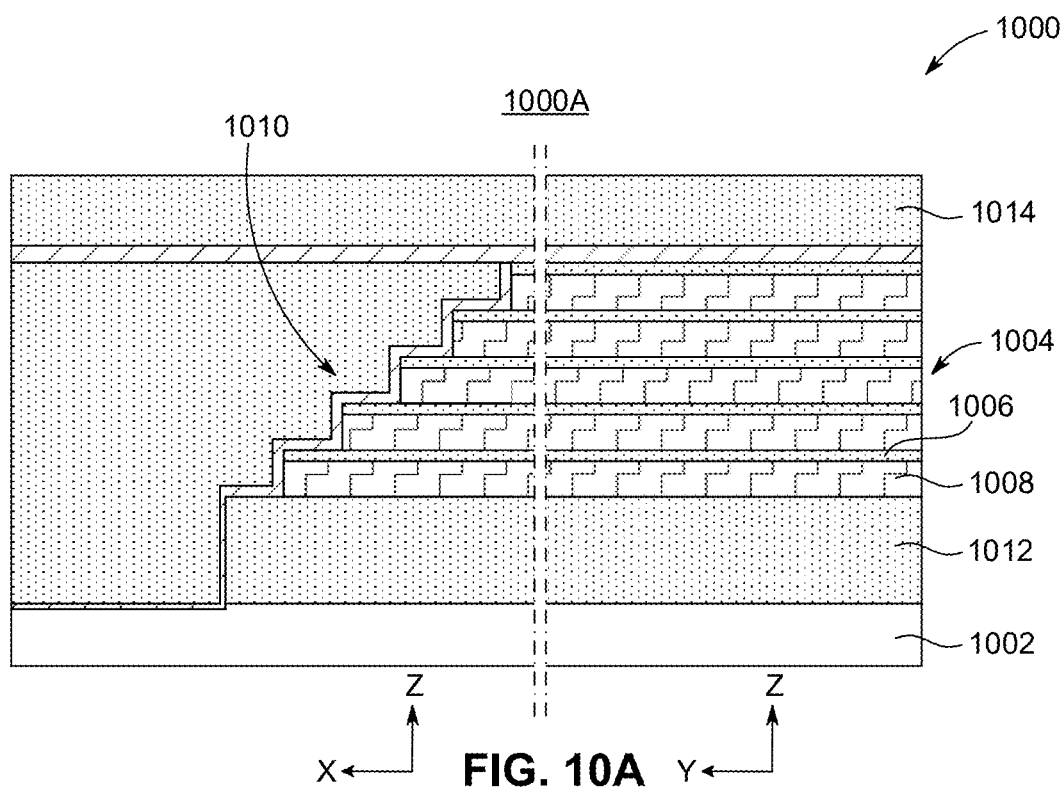
FIGS. 10A through 10P illustrate a manufacturing method for forming the retention DFM device shown in FIG. 8A, according to exemplary aspects.
Figure 10B:
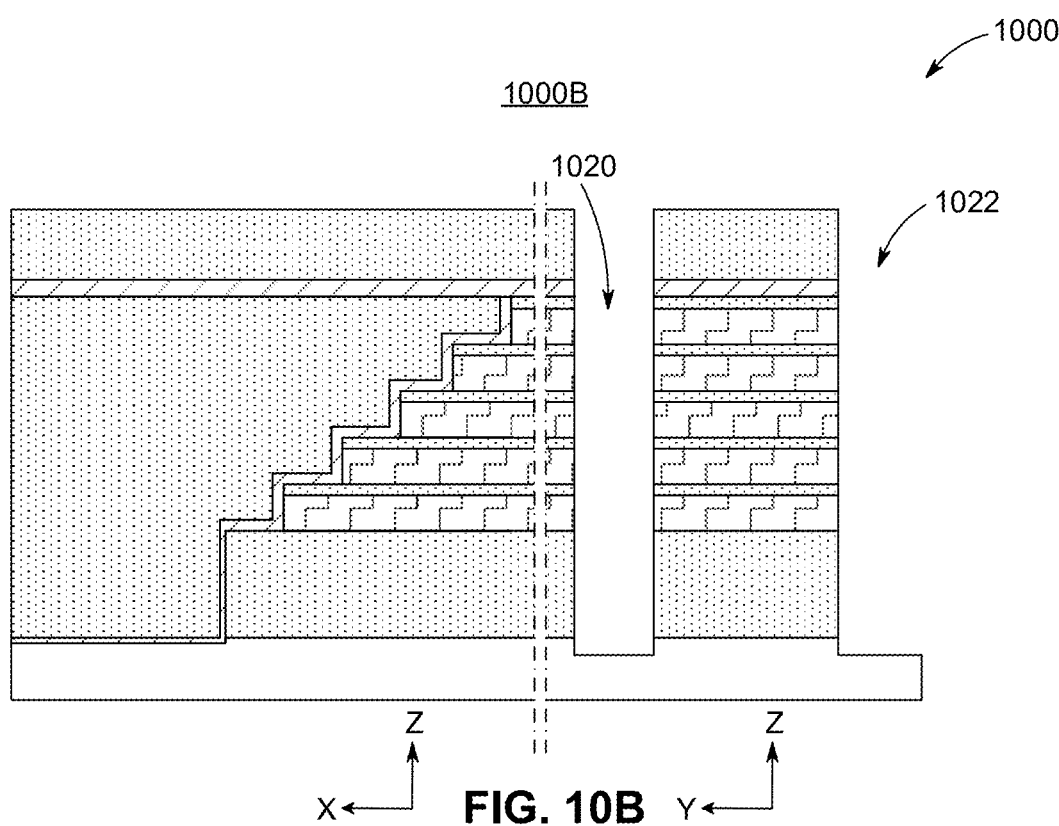
Figure 10C:
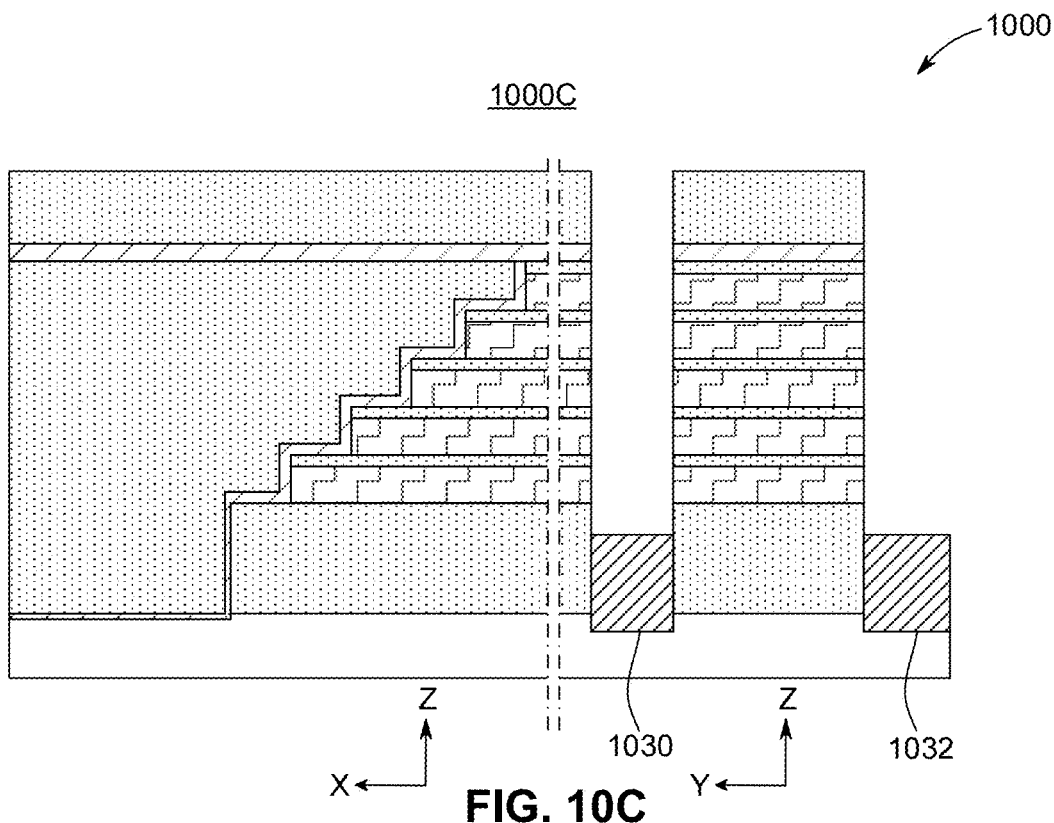
Figure 10D:
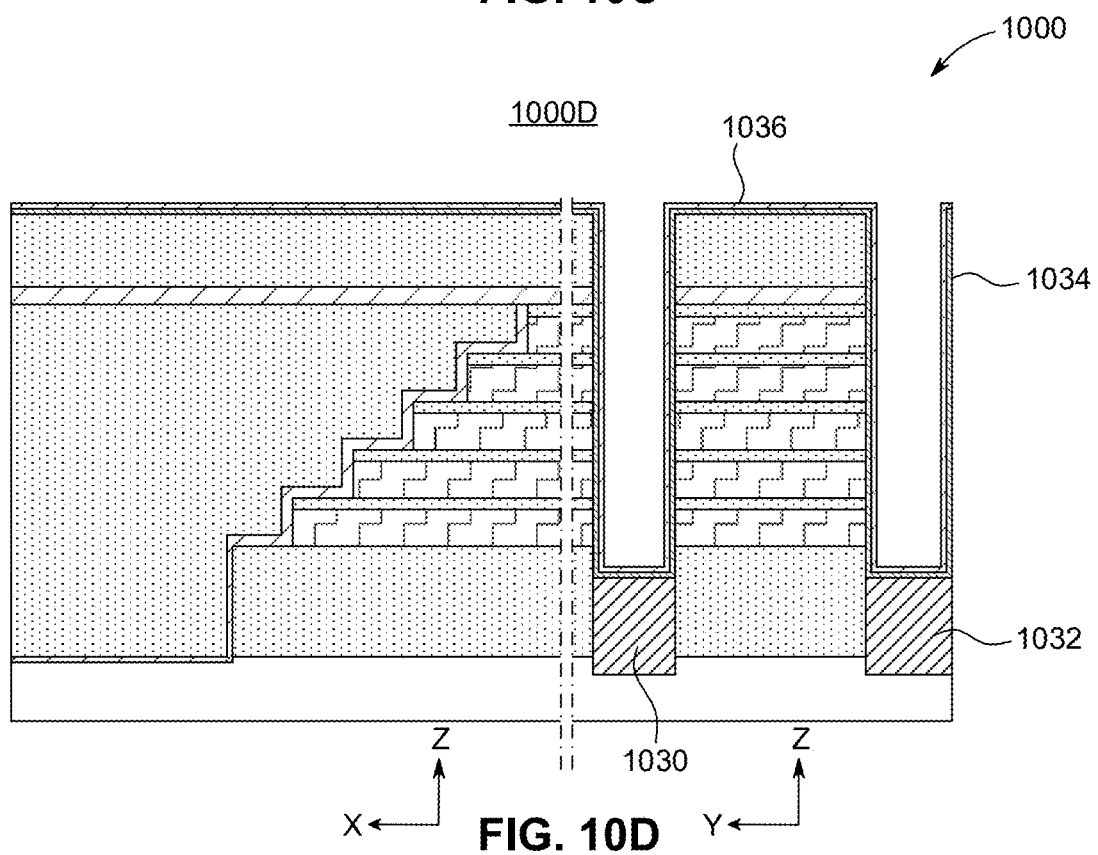
Figure 10E:
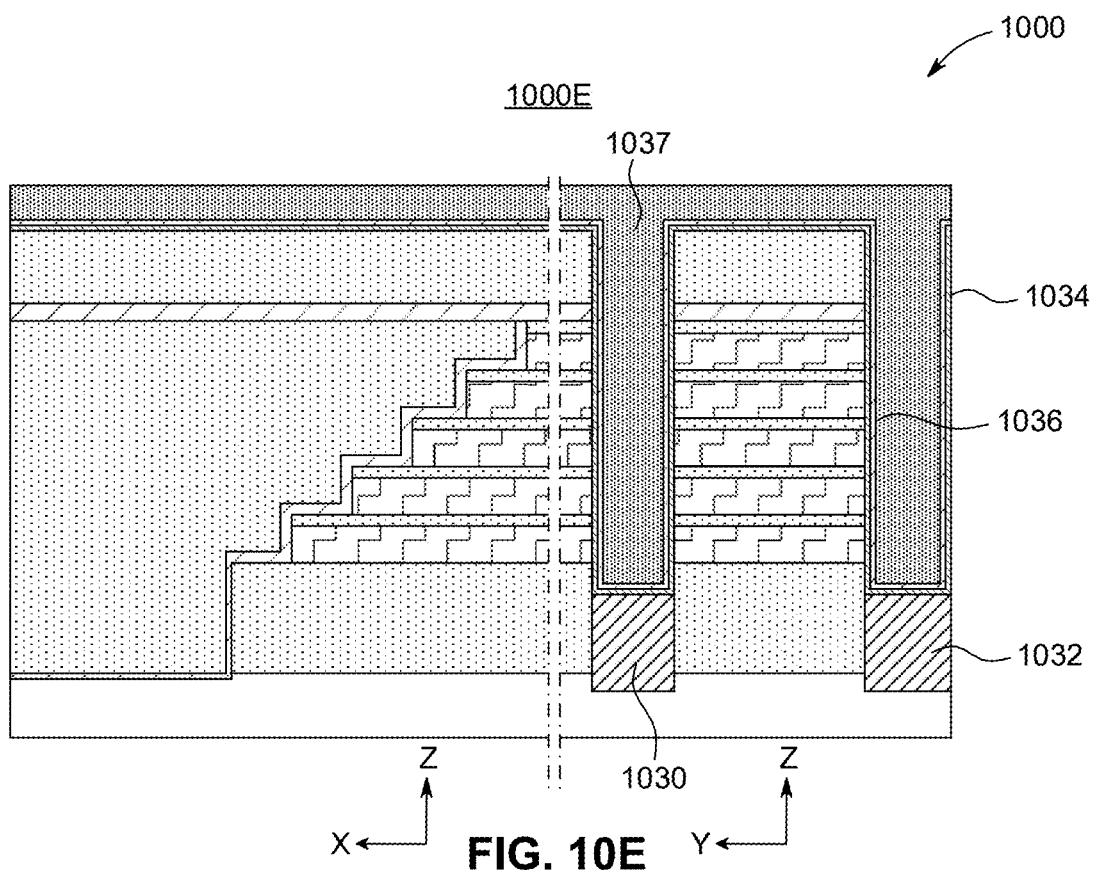
Figure 10F:
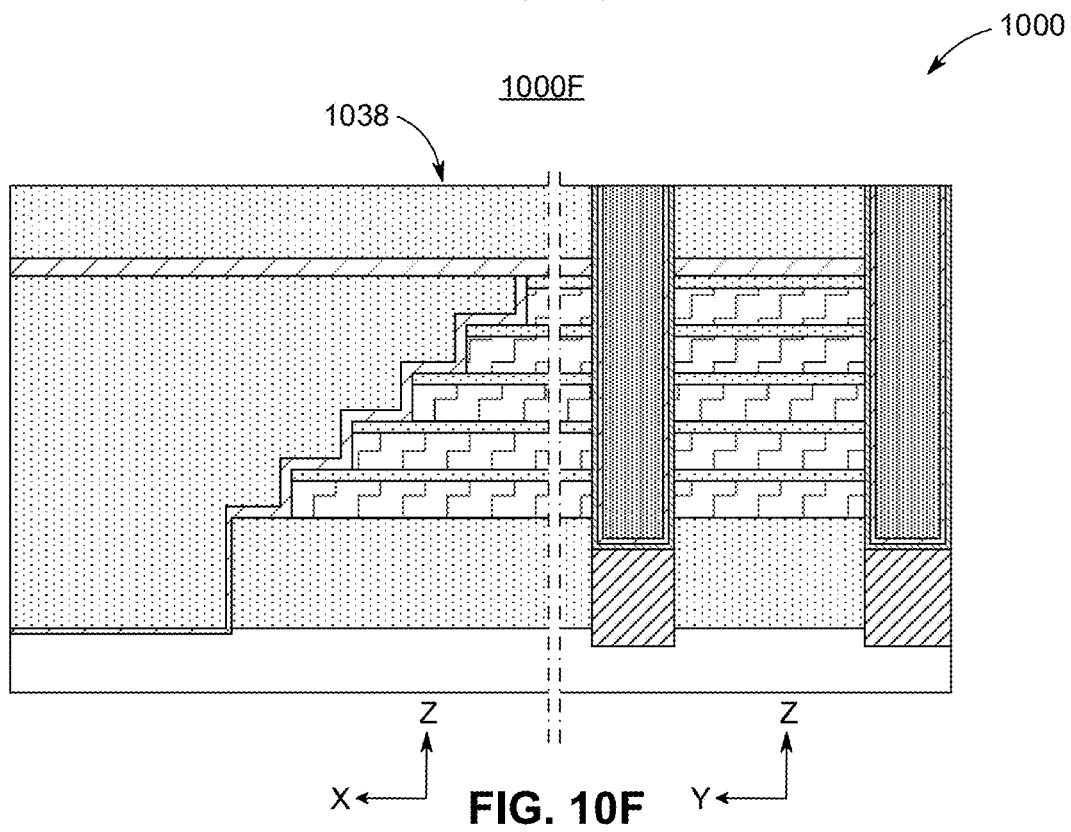
Figure 10G:
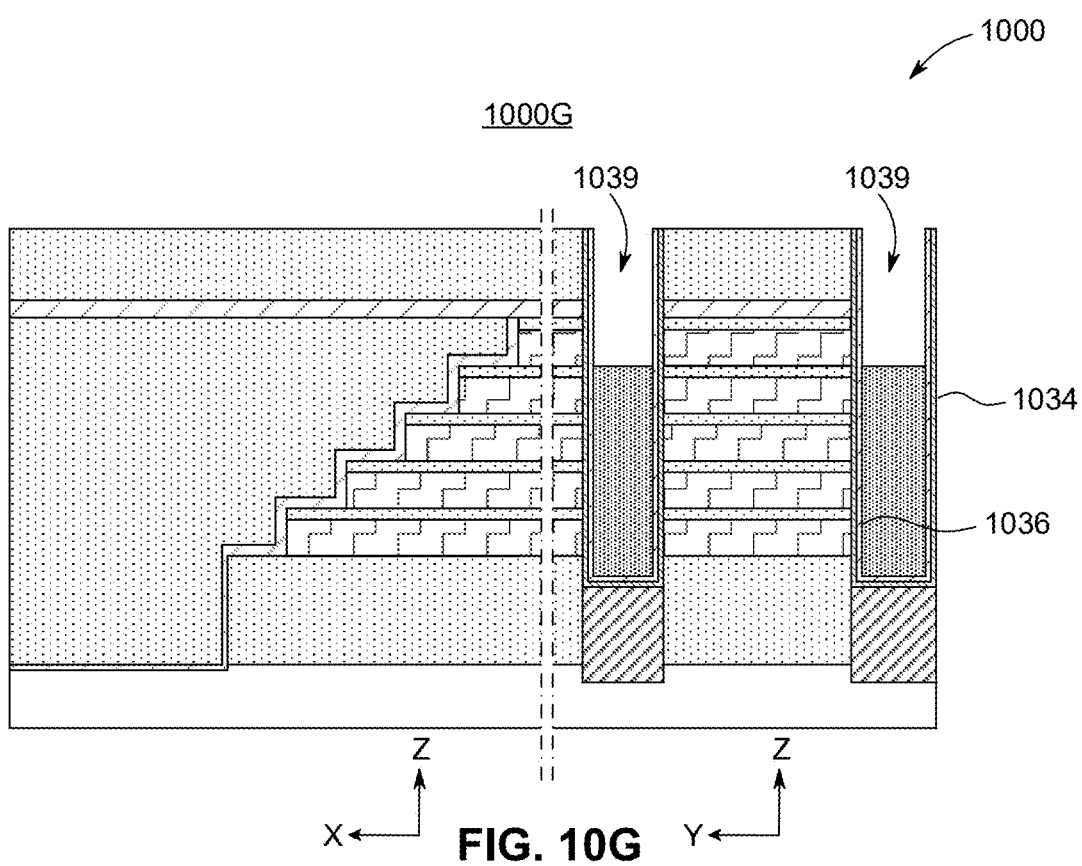
Figure 10H:
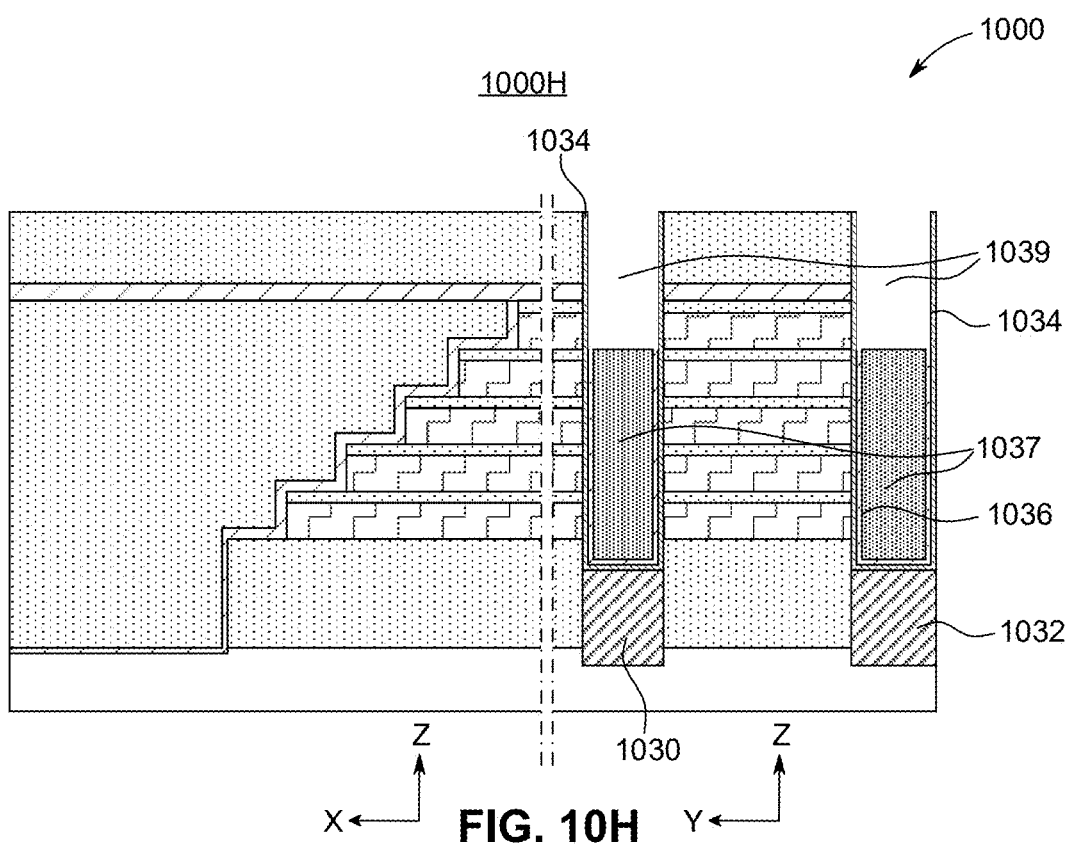
Figure 10I:
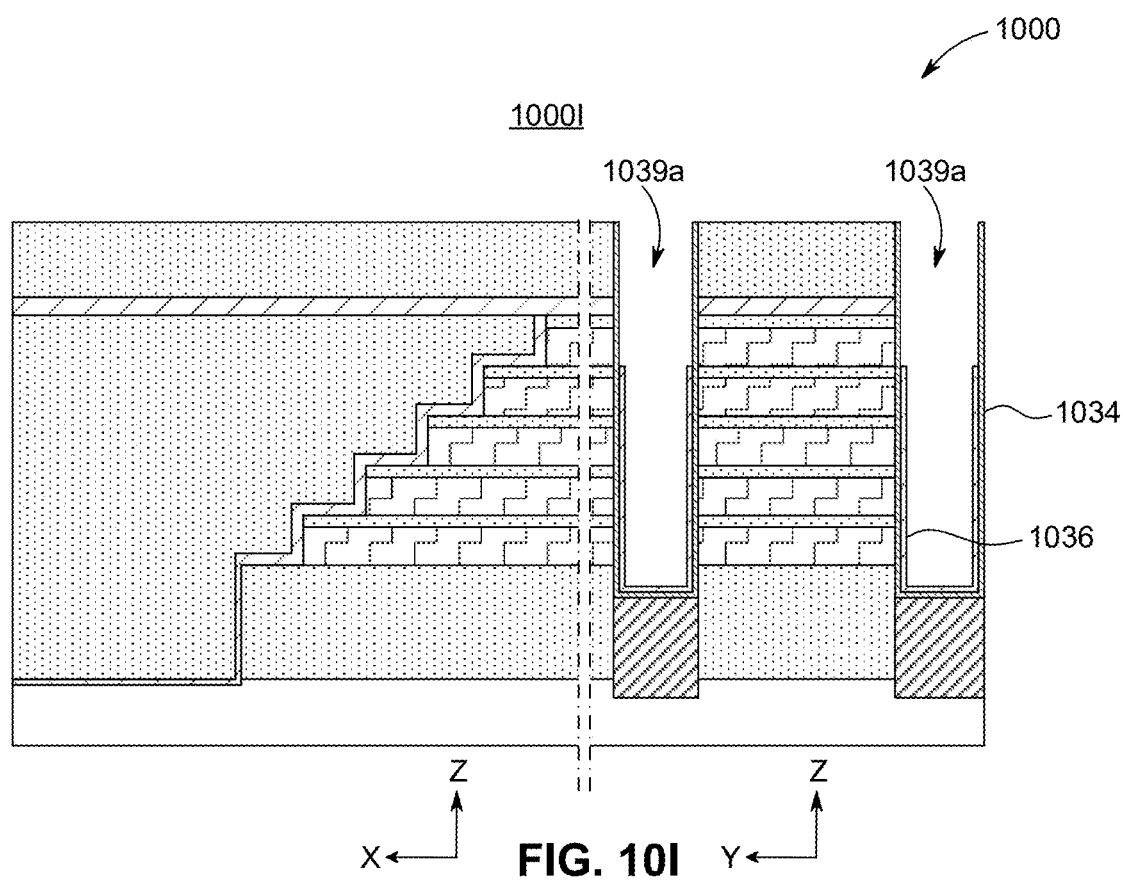
Figure 10J:
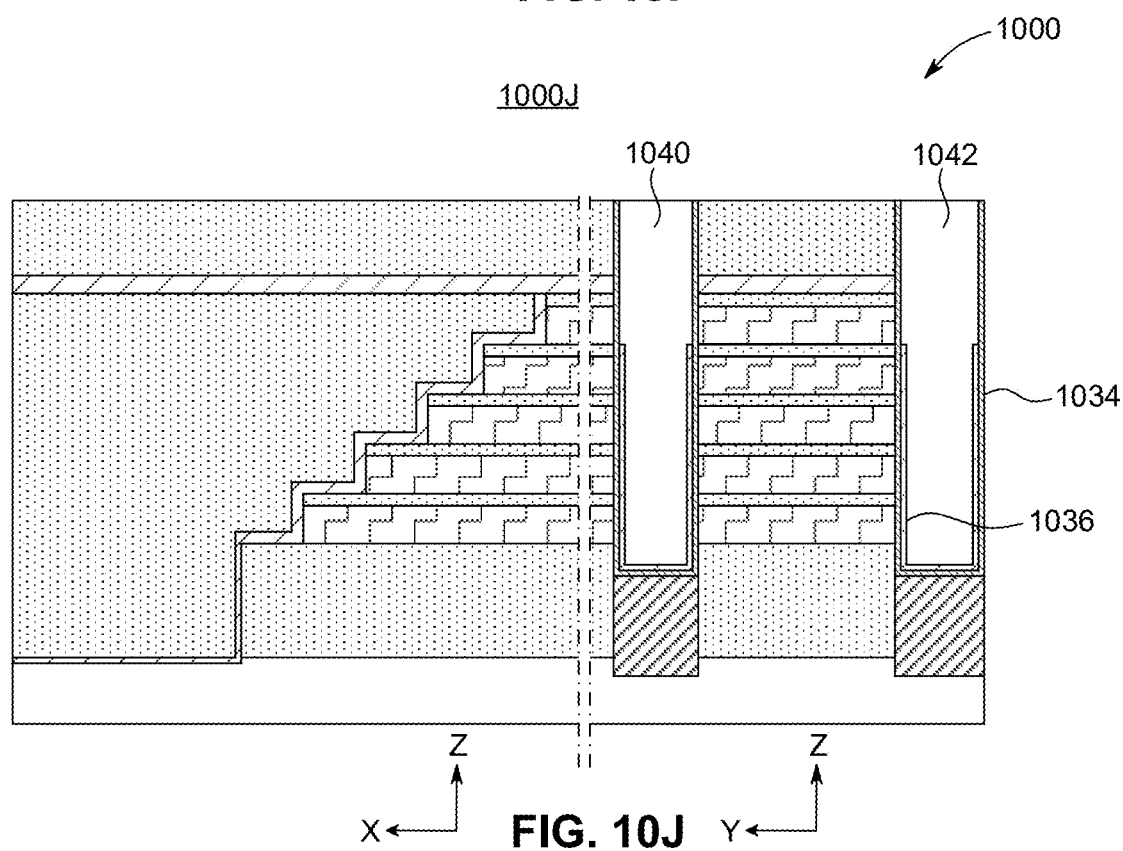
Figure 10K:
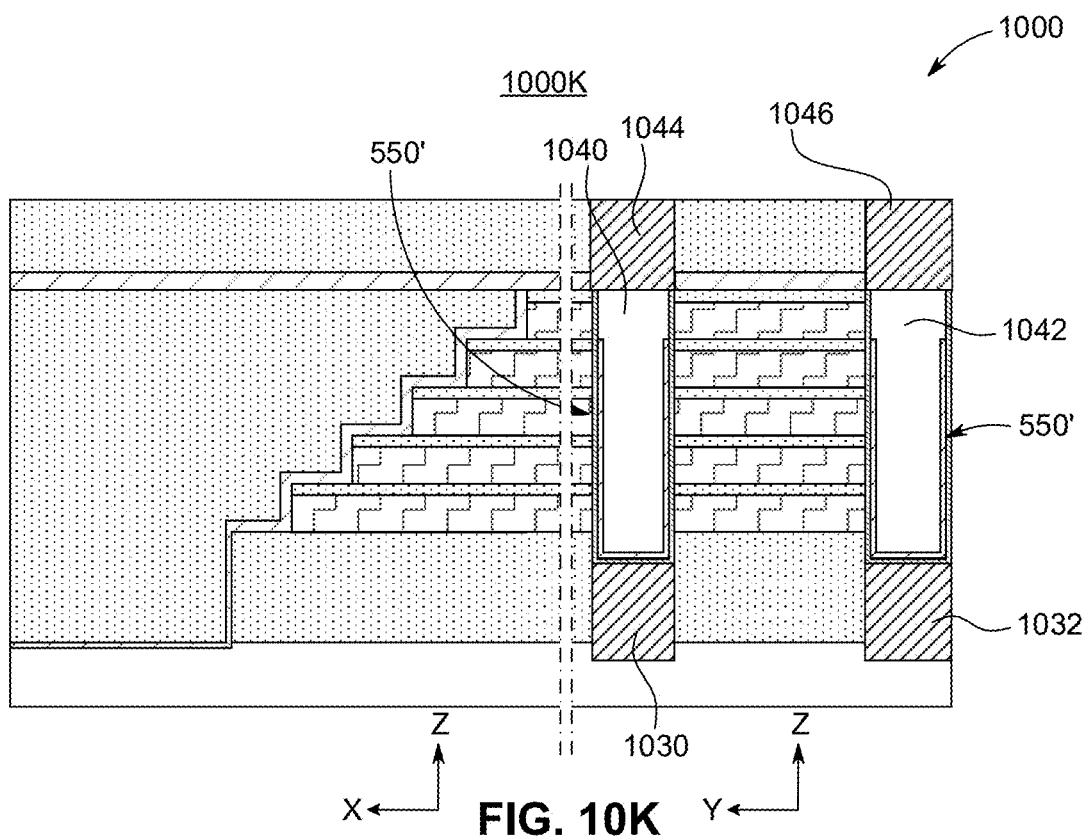
Figure 10L:
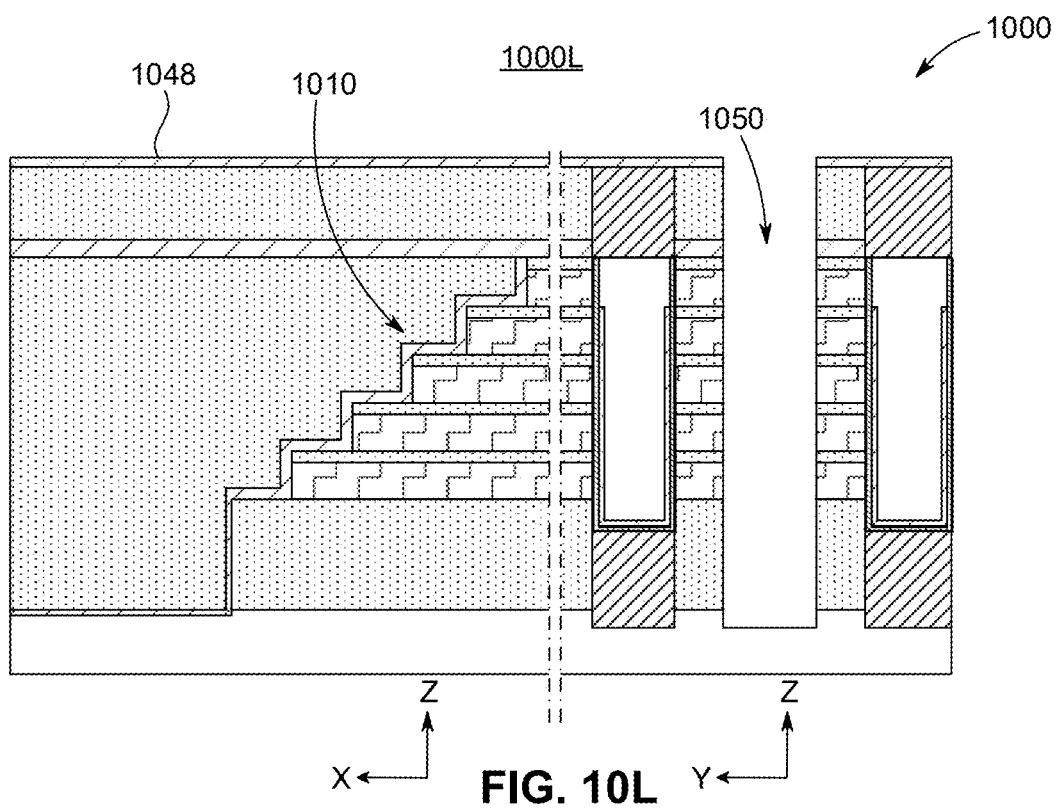
Figure 10M:
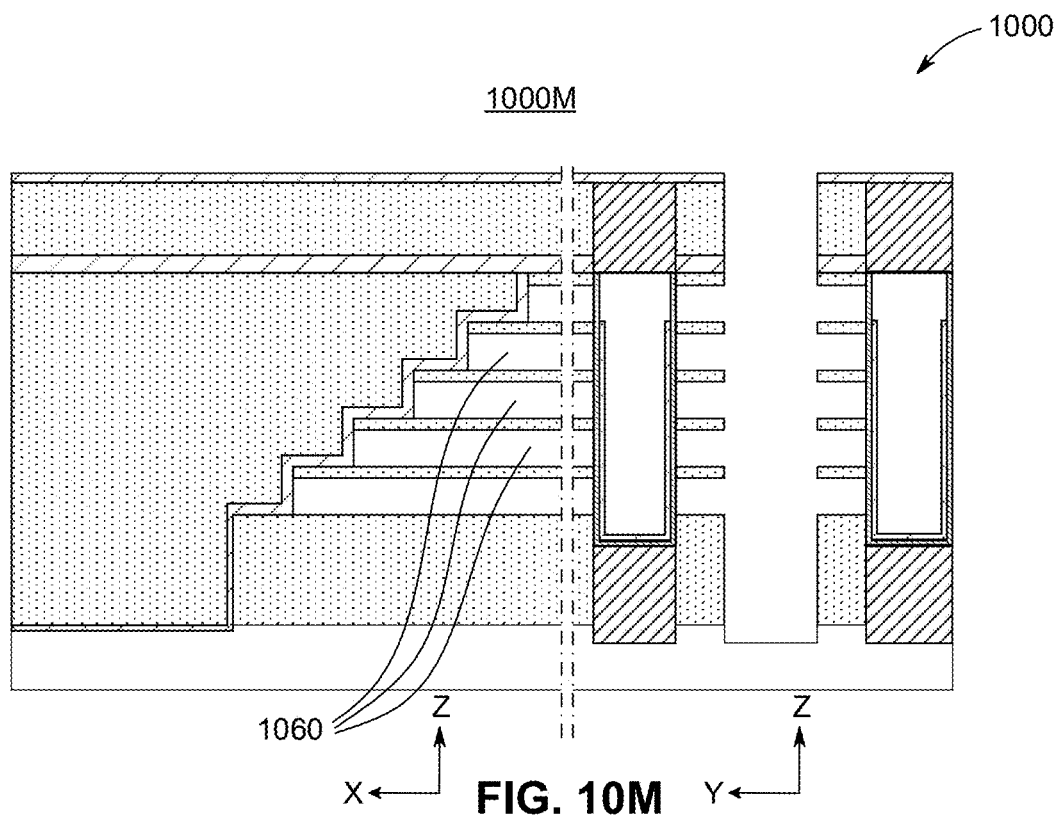
Figure 10N:
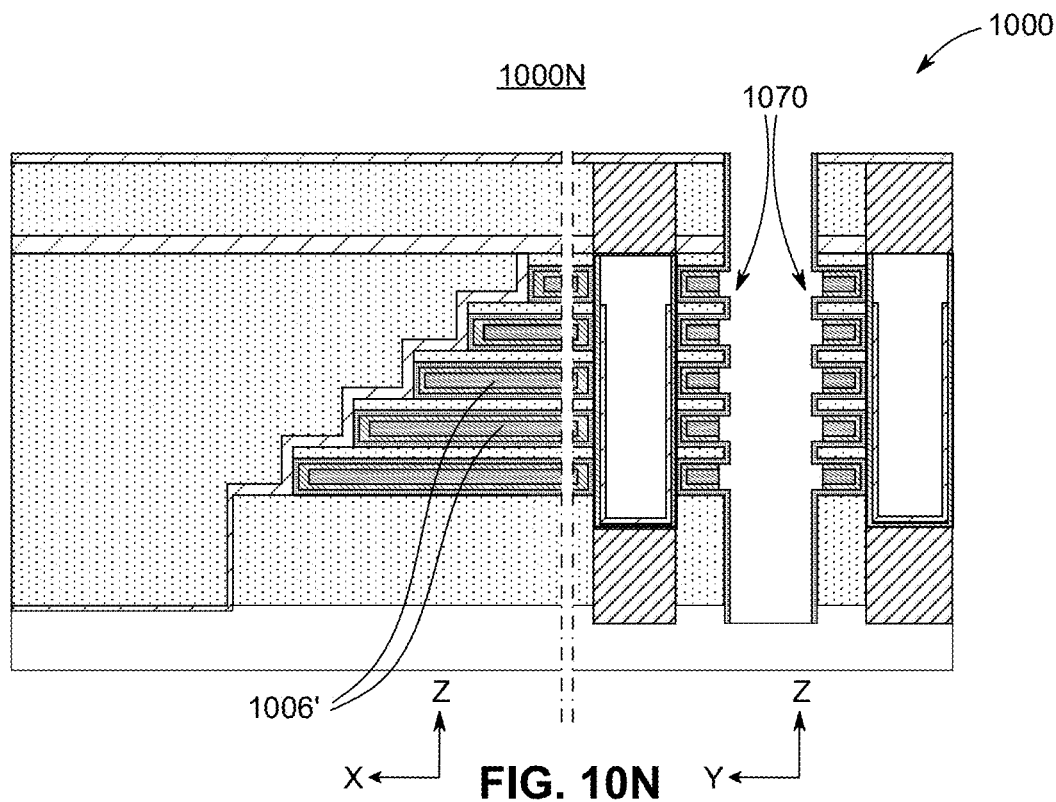
Figure 10O:
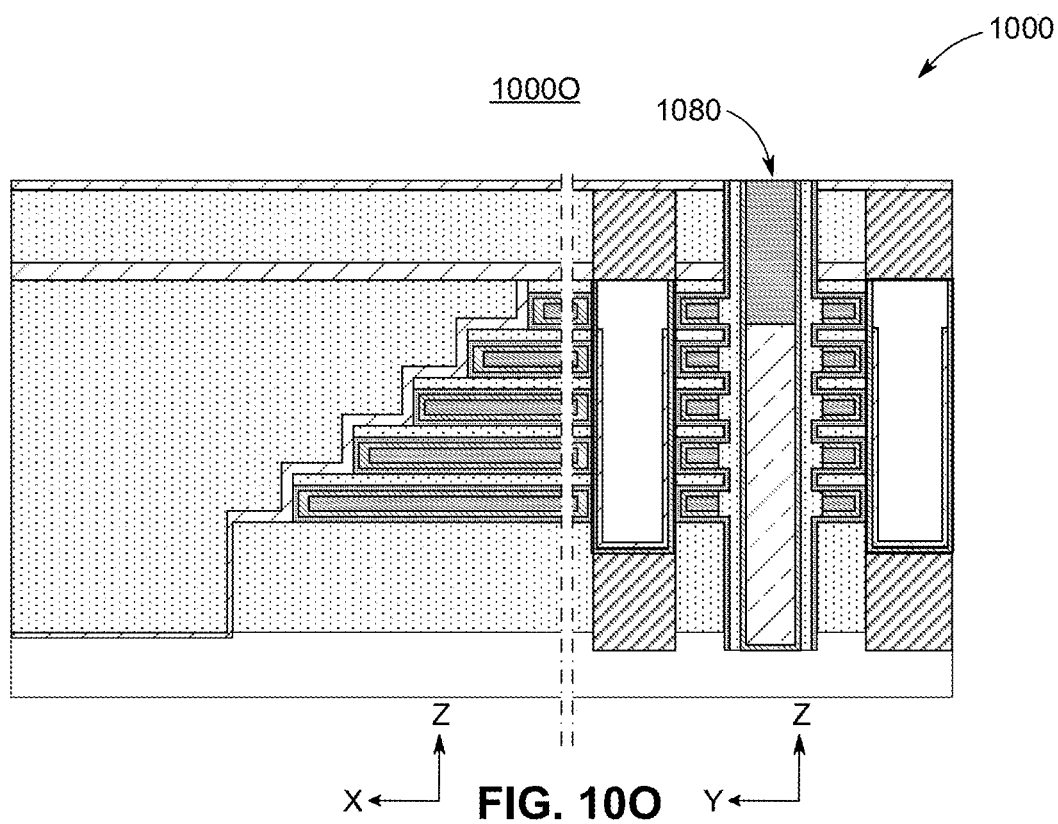
Figure 10P:
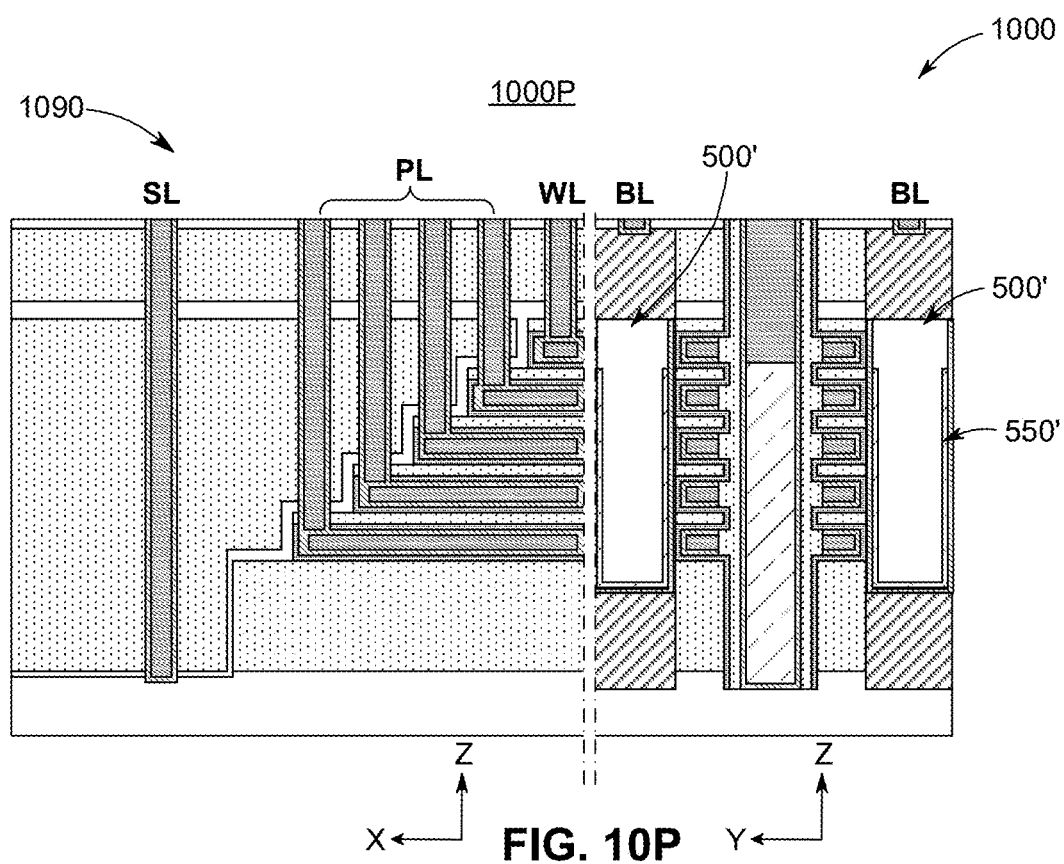

FIGS. 10A through 10P illustrate manufacturing method 1000 for forming retention DFM device 500' shown in FIG. 8A, according to exemplary aspects. It is to be appreciated that not all steps in FIGS. 10A through 10P are needed to perform the disclosure provided herein. Further, some of the steps may be performed simultaneously, sequentially, and/or in a different order than shown in FIGS. 10A through 10P. Manufacturing method 1000 shall be described with reference to FIGS. 10A through 10P. However, manufacturing method 1000 is not limited to those example aspects.

In step 1000A, as shown in the example of FIG. 10A, stack 1004 with staircase structure 1010 including first dielectric layer 1006 (e.g., silicon oxide), second dielectric layer 1008 (e.g., silicon nitride), bottom isolation layer 1012, and top isolation layer 1014 are formed as an alternating dielectric stack atop substrate 1002.

In step 1000B, as shown in the example of FIG. 10B, first channel trench 1020 and second channel trench 1022 are formed in the alternating dielectric stack (e.g., stack 1004). In some aspects, first and second channel trenches 1020, 1022 can be formed by etching in alternating dielectric stack, for example, anisotropic etching.

In step 1000C, as shown in the example of FIG. 10C, first bottom contact 1030 and second bottom contact 1032 are formed in first and second channel trenches 1020, 1022, respectively. In some aspects, forming first and second bottom contacts 1030, 1032 can include epitaxially growing first and second bottom contacts 1030, 1032, for example, by SEG.

In step 1000D, as shown in the example of FIG. 10D, channel 1034 is formed in first and second channel trenches 1020, 1022 atop first and second bottom contacts 1030, 1032, respectively. Further, U-shaped dielectric 1036 is formed in first and second channel trenches 1020, 1022 atop channel 1034.

In some aspects, channel 1034 can include a semiconductor material, for example, Si, doped Si, Ge, SiGe, GaAs, Group IV semiconductor, Group III-V semiconductor, Group II-VI semiconductor, graphene, sapphire, and/or any other semiconductor. In some aspects, channel 1034 can include a monocrystalline material (e.g., monocrystalline Si and/or any other single crystal material). In some aspects, channel 1034 can be doped (e.g., p-type). In some aspects, channel 1034 can have a doping concentration of about $1 \times 10^{16}$ cm$^{-3}$ to about $5 \times 10^{18}$ cm$^{-3}$. In some aspects, channel 1034 can have a radial thickness of about 1 nm to about 10 nm. For example, channel 1034 can have a radial thickness of about 3 nm.

In some aspects, U-shaped dielectric 1036 can include a dielectric material, for example, oxide, nitride, oxynitride, ceramic, glass, SOG, polymer, plastic, thermoplastic, resin, laminate, high-k dielectric, a combination thereof, and/or any other electrically insulating material. For example, U-shaped dielectric 1036 can be a high-k dielectric. In some aspects, U-shaped dielectric 1036 can have a radial thickness of about 1 nm to about 30 nm. For example, U-shaped dielectric 1036 can have a radial thickness of about 3 nm.

In step 1000E, as shown in the example of FIG. 10E, protective layer 1037 is formed (e.g., deposited) atop U-shaped dielectric 1036. Protective layer 1037 can include a dielectric (e.g., ceramic, glass, SOG, polymer, plastic, thermoplastic, resin, laminate), a metal (e.g., aluminum, chromium, gold, platinum, titanium, tungsten, polysilicon), a semiconductor (e.g., silicon, germanium), a combination thereof, and/or any other material not reactive to silicon oxide and silicon nitride etchants.

In step 1000F, as shown in the example of FIG. 10F, protective layer 1037 is planarized to form planar layer 1038. In some aspects, protective layer 1037 can be planarized by chemical mechanical polishing (CMP).

In step 1000G, as shown in the example of FIG. 10G, protective layer 1037 is recessed to form recessed protective layer 1039. In some aspects, recessed protective layer 1039 can be formed by etching, for example, anisotropic etching. In some aspects, recessed protective layer 1039 exposes upper portions of U-shaped dielectric 1036 and channel 1034.

In step 1000H, as shown in the example of FIG. 10H, upper portions of U-shaped dielectric 1036 in first and second channel trenches 1020, 1022 above recessed protective layer 1039 are removed to expose channel 1034. In some aspects, upper portions of U-shaped dielectric 1036 can be removed by etching, for example, isotropic etching.

In step 1000I, as shown in the example of FIG. 10I, recessed protective layer 1039 is removed to expose U-shaped dielectric 1036 and channel 1034 and form recessed protective layer void 1039a. In some aspects, recessed protective layer 1039 can be removed by etching, for example, anisotropic etching.

In step 1000J, as shown in the example of FIG. 10J, first body 1040 and second body 1042 are formed within U-shaped dielectric 1036 and channel 1034 atop first and second bottom contacts 1030, 1032, respectively. In some aspects, forming first and second bodies 1040, 1042 can include epitaxially growing first and second bodies 1040, 1042 within U-shaped dielectric 1036 and channel 1034, for example, by SEG.

In step 1000K, as shown in the example of FIG. 10K, first top contact 1044 and second top contact 1046 are formed atop first and second bodies 1040, 1042, respectively. In some aspects, forming first and second top contacts 1044, 1046 can include doping upper portions of first and second bodies 1040, 1042 to form first and second top contacts 1044, 1046, for example, by ion implanting.

In some aspects, channel 1034, U-shaped dielectric 1036, and first and second bodies 1040, 1042 can form a DFM cell, for example, DFM cell 540 shown in FIG. 8A. In some aspects, channel 1034 and first and second bodies 1040, 1042 can form first and second pillars, for example, pillar 510 shown in FIG. 8A. In some aspects, U-shaped dielectric 1036 can form a U-shaped dielectric to increase charge retention in a DFM cell, for example, U-shaped dielectric 550' of DFM cell 540 shown in FIG. 8A.

In step 1000L, as shown in the example of FIG. 10L, gate line trench 1050 is formed in the alternating dielectric stack (e.g., stack 1004). FIG. 10L shows a cross-sectional view of gate line trench 1050 along the YZ-plane and a separate (orthogonal) cross-sectional view of staircase structure 1010 along the XZ-plane. Further, capping layer 1048 can be formed (e.g., deposited) atop top isolation layer 1014 to electrically isolate first and second top contacts 1044, 1046.

In step 1000M, as shown in the example of FIG. 10M, second dielectric layer 1008 (e.g., silicon nitride) of stack 1004 is removed to form dielectric layer void 1060. In some aspects, second dielectric layer 1008 can be removed by etching from a lateral edge of stack 1004, for example, isotropic etching.

In step 1000N, as shown in the example of FIGS. 10M and 10N, HKMG stack 1070 is formed with conductive layers 1006' in dielectric layer void 1060.

In step 1000O, as shown in the example of FIGS. 10L and 10O, GLS 1080 is formed (e.g., deposited) in gate line trench 1050.

In step 1000P, as shown in the example of FIGS. 8A, 10K, and 10P, interconnects 1090 are formed to first and second top contacts 1044, 1046 (e.g., BL 520 shown in FIG. 8A), first and second pillars (e.g., pillar 510 and DFM cell 540 shown in FIG. 8A), and first and second bottom contacts 1030, 1032 (e.g., SL 530 shown in FIG. 8A), respectively, to form one or more retention DFM devices 500' shown in FIG. 8A. In some aspects, manufacturing method 1000 can include forming a DFM device, for example, retention DFM device 500' shown in FIG. 8A. In some aspects, manufacturing method 1000 can include forming a NAND DFM device.

Exemplary Flow Diagrams

Figure 11:
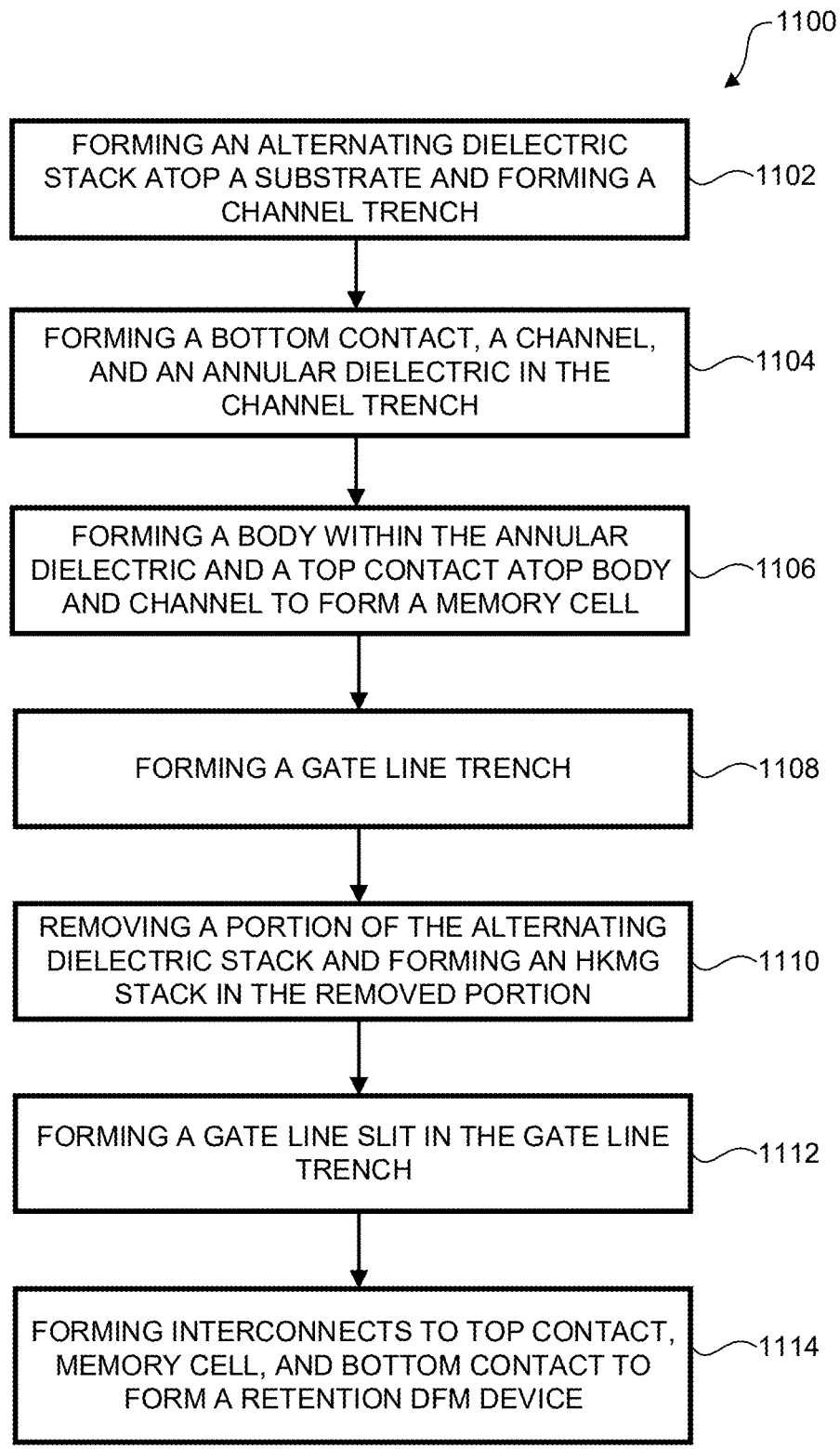
FIG. 11 illustrates a flow diagram for forming the retention DFM device shown in FIG. 5A, according to an exemplary aspect.

FIG. 11 illustrates flow diagram 1100 for forming retention DFM device 500 shown in FIG. 5A, according to exemplary aspects. It is to be appreciated that not all steps in FIG. 11 are needed to perform the disclosure provided herein. Further, some of the steps may be performed simultaneously, sequentially, and/or in a different order than shown in FIG. 11. Flow diagram 1100 shall be described with reference to FIGS. 5A and 7A through 7N. However, flow diagram 1100 is not limited to those example aspects.

In step 1102, as shown in the example of FIGS. 7A and 7B, stack 704 with staircase structure 710 including first dielectric layer 706 (e.g., silicon oxide), second dielectric layer 708 (e.g., silicon nitride), bottom isolation layer 712, and top isolation layer 714 are formed as an alternating dielectric stack atop substrate 702. Further, first channel trench 720 and second channel trench 722 are formed in the alternating dielectric stack (e.g., stack 704). In some aspects, first and second channel trenches 720, 722 can be formed by etching in alternating dielectric stack, for example, anisotropic etching.

In step 1104, as shown in the example of FIGS. 7C-7E, first bottom contact 730 and second bottom contact 732 are formed in first and second channel trenches 720, 722, respectively. In some aspects, forming first and second bottom contacts 730, 732 can include epitaxially growing first and second bottom contacts 730, 732, for example, by SEG. Further, channel 734 is formed in first and second channel trenches 720, 722 atop first and second bottom contacts 730, 732, respectively. Further, annular dielectric 736 is formed in first and second channel trenches 720, 722 atop channel 734. In some aspects, first dielectric trench 738 and second dielectric trench 739 can be formed in annular dielectric 736 and channel 734. In some aspects, first and second dielectric trenches 738, 739 can be formed by etching a central bottom portion of annular dielectric 736 and channel 734 to expose first and second bottom contacts 730, 732, for example, anisotropic etching.

In step 1106, as shown in the example of FIGS. 7F-7I, first body 740 and second body 742 are formed atop first and second bottom contacts 730, 732, respectively, within annular dielectric 736. In some aspects, forming first and second bodies 740, 742 can include epitaxially growing first and second bodies 740, 742 atop first and second bottom contacts 730, 732 within annular dielectric 736, for example, by SEG. Further, upper portions of annular dielectric 736 in first and second channel trenches 720, 722 above first and second bodies 740, 742 are removed to expose channel 734. In some aspects, upper portions of annular dielectric 736 can be removed by etching, for example, isotropic etching. Further, first additional body 740a and second additional body 742a are formed atop first and second bodies 740, 742, respectively, within upper portions of channel 734 in first and second channel trenches 720, 722. In some aspects, forming first and second additional bodies 740a, 742a can include epitaxially growing first and second additional bodies 740a, 742a atop first and second bodies 740, 742, for example, by SEG. Further, first top contact 744 and second top contact 746 are formed atop first and second additional bodies 740a, 742a, respectively. In some aspects, forming first and second top contacts 744, 746 can include doping upper portions of first and second additional bodies 740a, 742a to form first and second top contacts 744, 746, for example, by ion implanting.

In step 1108, as shown in the example of FIG. 7J, gate line trench 750 is formed in the alternating dielectric stack (e.g., stack 704). Further, capping layer 748 can be formed (e.g., deposited) atop top isolation layer 714 to electrically isolate first and second top contacts 744, 746.

In step 1110, as shown in the example of FIGS. 7K and 7L, second dielectric layer 708 (e.g., silicon nitride) of stack 704 is removed to form dielectric layer void 760. In some aspects, second dielectric layer 708 can be removed by etching from a lateral edge of stack 704, for example, isotropic etching. Further, HKMG stack 770 is formed with conductive layers 706' in dielectric layer void 760.

In step 1112, as shown in the example of FIG. 7M, GLS 780 is formed in gate line trench 750.

In step 1114, as shown in the example of FIGS. 5A and 7N, interconnects 790 are formed to first and second top contacts 744, 746 (e.g., BL 520 shown in FIG. 5A), first and second pillars (e.g., pillar 510 and DFM cell 540 shown in FIG. 5A), and first and second bottom contacts 730, 732 (e.g., SL 530 shown in FIG. 5A), respectively, to form one or more retention DFM devices 500 shown in FIG. 5A. In some aspects, flow diagram 1100 can include forming a DFM device, for example, retention DFM device 500 shown in FIG. 5A. In some aspects, flow diagram 1100 can include forming a NAND DFM device.

Figure 12:
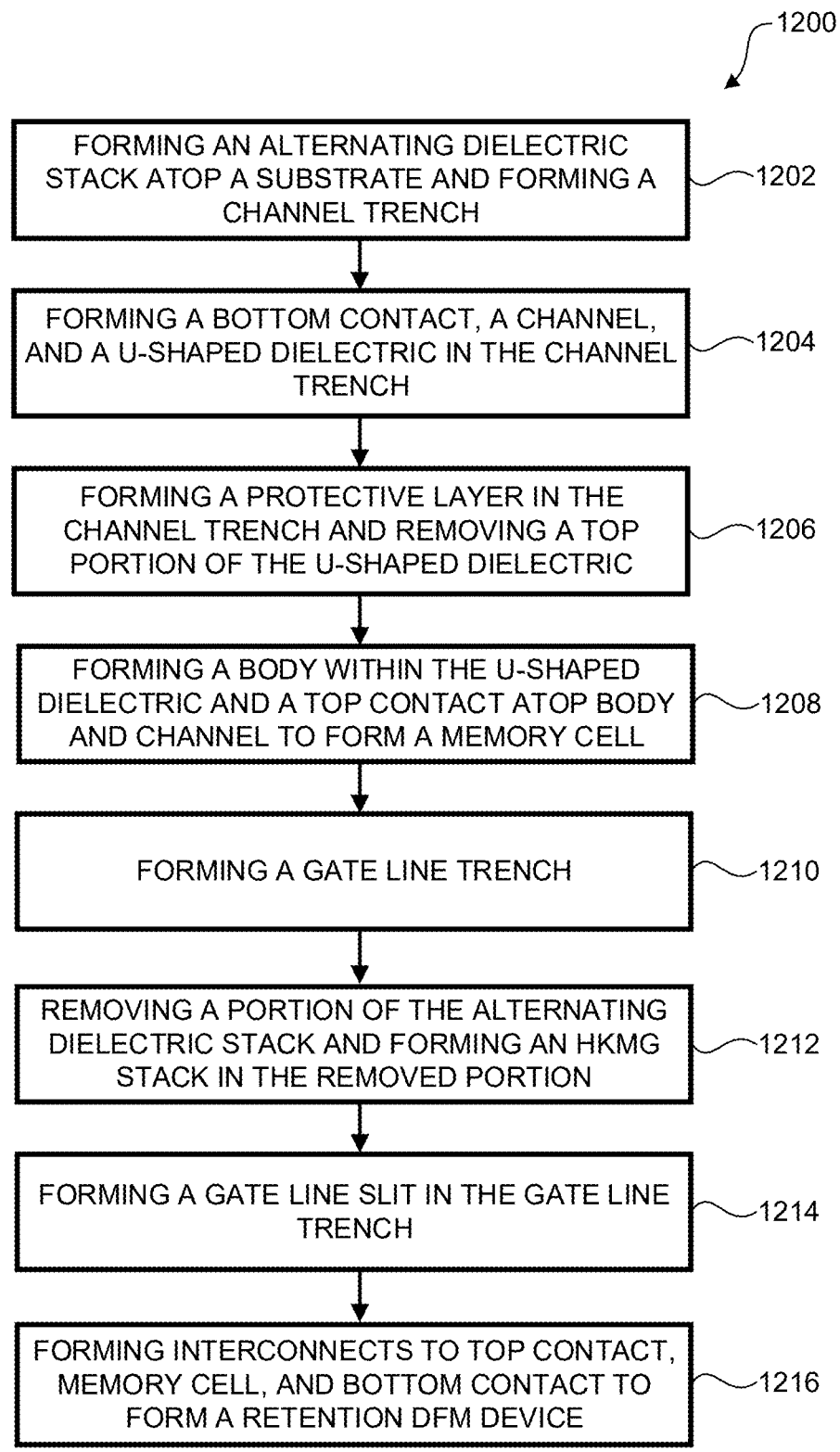
FIG. 12 illustrates a flow diagram for forming the retention DFM device shown in FIG. 8A, according to an exemplary aspect.

FIG. 12 illustrates flow diagram 1200 for forming retention DFM device 500' shown in FIG. 8A, according to exemplary aspects. It is to be appreciated that not all steps in FIG. 12 are needed to perform the disclosure provided herein. Further, some of the steps may be performed simultaneously, sequentially, and/or in a different order than shown in FIG. 12. Flow diagram 1200 shall be described with reference to FIGS. 8A and 10A through 10P. However, flow diagram 1200 is not limited to those example aspects.

In step 1202, as shown in the example of FIGS. 10A and 10B, stack 1004 with staircase structure 1010 including first dielectric layer 1006 (e.g., silicon oxide), second dielectric layer 1008 (e.g., silicon nitride), bottom isolation layer 1012, and top isolation layer 1014 are formed as an alternating dielectric stack atop substrate 1002. Further, first channel trench 1020 and second channel trench 1022 are formed in the alternating dielectric stack (e.g., stack 1004). In some aspects, first and second channel trenches 1020, 1022 can be formed by etching in alternating dielectric stack, for example, anisotropic etching.

In step 1204, as shown in the example of FIGS. 10C and 10D, first bottom contact 1030 and second bottom contact 1032 are formed in first and second channel trenches 1020, 1022, respectively. In some aspects, forming first and second bottom contacts 1030, 1032 can include epitaxially growing first and second bottom contacts 1030, 1032, for example, by SEG. Further, channel 1034 is formed in first and second channel trenches 1020, 1022 atop first and second bottom contacts 1030, 1032, respectively. Further, U-shaped dielectric 1036 is formed in first and second channel trenches 1020, 1022 atop channel 1034.

In step 1206, as shown in the example of FIGS. 10E-10I, protective layer 1037 is formed (e.g., deposited) atop U-shaped dielectric 1036. Protective layer 1037 can include a dielectric (e.g., ceramic, glass, SOG, polymer, plastic, thermoplastic, resin, laminate), a metal (e.g., aluminum, chromium, gold, platinum, titanium, tungsten, polysilicon), a semiconductor (e.g., silicon, germanium), a combination thereof, and/or any other material not reactive to silicon oxide and silicon nitride etchants. Further, protective layer 1037 is planarized to form planar layer 1038. In some aspects, protective layer 1037 can be planarized by CMP. Further, protective layer 1037 is recessed to form recessed protective layer 1039. In some aspects, recessed protective layer 1039 can be formed by etching, for example, anisotropic etching. In some aspects, recessed protective layer 1039 exposes upper portions of U-shaped dielectric 1036 and channel 1034. Further, upper portions of U-shaped dielectric 1036 in first and second channel trenches 1020, 1022 above recessed protective layer 1039 are removed to expose channel 1034. In some aspects, upper portions of U-shaped dielectric 1036 can be removed by etching, for example, isotropic etching. Further, recessed protective layer 1039 is removed to expose U-shaped dielectric 1036 and channel 1034 and form recessed protective layer void 1039a. In some aspects, recessed protective layer 1039 can be removed by etching, for example, anisotropic etching.

In step 1208, as shown in the example of FIGS. 10J and 10K, first body 1040 and second body 1042 are formed within U-shaped dielectric 1036 and channel 1034 atop first and second bottom contacts 1030, 1032, respectively. In some aspects, forming first and second bodies 1040, 1042 can include epitaxially growing first and second bodies 1040, 1042 within U-shaped dielectric 1036 and channel 1034, for example, by SEG. Further, first top contact 1044 and second top contact 1046 are formed atop first and second bodies 1040, 1042, respectively. In some aspects, forming first and second top contacts 1044, 1046 can include doping upper portions of first and second bodies 1040, 1042 to form first and second top contacts 1044, 1046, for example, by ion implanting.

In step 1210, as shown in the example of FIG. 10L, gate line trench 1050 is formed in the alternating dielectric stack (e.g., stack 1004). Further, capping layer 1048 can be formed (e.g., deposited) atop top isolation layer 1014 to electrically isolate first and second top contacts 1044, 1046.

In step 1212, as shown in the example of FIGS. 10M and 10N, second dielectric layer 1008 (e.g., silicon nitride) of stack 1004 is removed to form dielectric layer void 1060. In some aspects, second dielectric layer 1008 can be removed by etching from a lateral edge of stack 1004, for example, isotropic etching. Further, HKMG stack 1070 is formed with conductive layers 1006' in dielectric layer void 1060.

In step 1214, as shown in the example of FIG. 10O, GLS 1080 is formed (e.g., deposited) in gate line trench 1050.

In step 1216, as shown in the example of FIGS. 8A and 10P, interconnects 1090 are formed to first and second top contacts 1044, 1046 (e.g., BL 520 shown in FIG. 8A), first and second pillars (e.g., pillar 510 and DFM cell 540 shown in FIG. 8A), and first and second bottom contacts 1030, 1032 (e.g., SL 530 shown in FIG. 8A), respectively, to form one or more retention DFM devices 500' shown in FIG. 8A. In some aspects, manufacturing method 1000 can include forming a DFM device, for example, retention DFM device 500' shown in FIG. 8A. In some aspects, manufacturing method 1000 can include forming a NAND DFM device.

It is to be understood that the phraseology or terminology herein is for the purpose of description and not of limitation, such that the terminology or phraseology of the present specification is to be interpreted by those skilled in relevant art(s) in light of the teachings herein.

The term "substrate" as used herein describes a material onto which material layers are added. In some aspects, the substrate itself may be patterned and materials added on top of it may also be patterned, or may remain without patterning.

The following examples are illustrative, but not limiting, of the aspects of this disclosure. Other suitable modifications and adaptations of the variety of conditions and parameters normally encountered in the field, and which would be apparent to those skilled in the relevant art(s), are within the spirit and scope of the disclosure.

While specific aspects have been described above, it will be appreciated that the aspects may be practiced otherwise than as described. The description is not intended to limit the scope of the claims.

It is to be appreciated that the Detailed Description section, and not the Summary and Abstract sections, is intended to be used to interpret the claims. The Summary and Abstract sections may set forth one or more but not all exemplary aspects as contemplated by the inventor(s), and thus, are not intended to limit the aspects and the appended claims in any way.

The aspects have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the aspects that others can, by applying knowledge within the skill of the art, readily modify and/or adapt for various applications such specific aspects, without undue experimentation, without departing from the general concept of the aspects. Therefore, such adaptations and modifications are intended to be within the meaning and range of equivalents of the disclosed aspects, based on the teaching and guidance presented herein.

The breadth and scope of the aspects should not be limited by any of the above-described exemplary aspects, but should be defined only in accordance with the following claims and their equivalents.

What is claimed is:

1. A three-dimensional memory device comprising:
   a memory cell comprising:
   a pillar;
   an insulating layer surrounding the pillar;
   a first gate contact surrounding a first portion of the insulating layer, the first gate contact coupled to a word line configured to address and non-destructively read the pillar;
   a second gate contact surrounding a second portion of the insulating layer, the second gate contact coupled to a plate line configured to program the pillar; and
   an annular dielectric layer radially separating the pillar into a channel and a body, the body to store an electrical charge, the annular dielectric layer between the body of the pillar and the insulating layer.

2. The memory device of claim 1, wherein the annular dielectric layer comprises a high-k dielectric, an oxide, a nitride, or a combination thereof.

3. The memory device of claim 1, wherein:
   the annular dielectric layer is configured to increase a retention time in the pillar, and the retention time of storing the electrical charge is greater than about 100 ms.

4. The memory device of claim 1, wherein the channel includes an inversion layer in the pillar.

5. The memory device of claim 1, wherein the body of the pillar and the channel of the pillar have different doping concentrations to increase a floating body effect of the memory cell.

6. The memory device of claim 5, wherein the body of the pillar has a doping concentration of about $5\times10^{18}$ cm$^{-3}$ and the channel of the pillar has a doping concentration of about $1\times10^{16}$ cm$^{-3}$ to about $1\times10^{17}$ cm$^{-3}$.

7. The memory device of claim 1, wherein the annular dielectric layer isolates the body of the pillar thereby increasing a charge density in the body of the pillar.

8. The memory device of claim 7, wherein the charge density is greater than about $1\times10^{18}$ cm$^{-3}$.

9. The memory device of claim 1, wherein the annular dielectric layer comprises an annulus extending axially along the pillar from a top end of the second gate contact to a bottom contact.

10. The memory device of claim 1, wherein the pillar is a monocrystalline material.

* * * * *